(12) United States Patent
Verheyden et al.

(10) Patent No.: US 12,189,189 B2
(45) Date of Patent: Jan. 7, 2025

(54) FIBER OPTIC ALIGNMENT DEVICES; SYSTEMS; AND METHODS

(71) Applicant: COMMSCOPE TECHNOLOGIES LLC, Hickory, NC (US)

(72) Inventors: Danny Willy August Verheyden, Gelrode (BE); Jozef Christiaan Mathieu Versleegers, Bree (BE); Michael Maris, Paal (BE); Alfons Rudi Hermans, Sint-Truiden (BE); Walter Mattheus, Wijgmaal (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 887 days.

(21) Appl. No.: 17/298,434

(22) PCT Filed: Nov. 25, 2019

(86) PCT No.: PCT/US2019/063026
§ 371 (c)(1),
(2) Date: May 28, 2021

(87) PCT Pub. No.: WO2020/112645
PCT Pub. Date: Jun. 4, 2020

(65) Prior Publication Data
US 2022/0026640 A1    Jan. 27, 2022

Related U.S. Application Data

(60) Provisional application No. 62/773,642, filed on Nov. 30, 2018, provisional application No. 62/834,855, (Continued)

(51) Int. Cl.
*G02B 6/36* (2006.01)
*G02B 6/38* (2006.01)

(52) U.S. Cl.
CPC ......... *G02B 6/3652* (2013.01); *G02B 6/3656* (2013.01); *G02B 6/3806* (2013.01); *G02B 6/3821* (2013.01); *G02B 6/3825* (2013.01)

(58) Field of Classification Search
CPC ....................................................... G02B 6/38
(Continued)

(56) References Cited

U.S. PATENT DOCUMENTS 4,198,122 A * 4/1980 Prunier .................... G02B 6/25
264/1.25
4,350,867 A * 9/1982 Kinoshita ............ G02B 6/2551
219/121.75
(Continued)

FOREIGN PATENT DOCUMENTS

CN    101082689 A    12/2007
CN    101158735 A    4/2008
(Continued)

OTHER PUBLICATIONS

Extended European Search Report for European Patent Application No. 19891600.9 mailed Jun. 29, 2022, 7 pages.
(Continued)

*Primary Examiner* — Kaveh C Kianni
(74) *Attorney, Agent, or Firm* — Merchant & Gould P.C.

(57) ABSTRACT

The present disclosure relates to methods, devices and systems for co-axially aligning first and second optical fibers to provide an optical coupling between the first and second optical fibers. A fiber engagement element is used to force the first and second optical fibers into an alignment groove.

31 Claims, 46 Drawing Sheets

Related U.S. Application Data filed on Apr. 16, 2019, provisional application No. 62/844,011, filed on May 6, 2019, provisional application No. 62/909,367, filed on Oct. 2, 2019.

(58) Field of Classification Search
USPC .......................................................... 385/137
See application file for complete search history.

(56) References Cited

U.S. PATENT DOCUMENTS

| | | | | |
|---|---|---|---|---|
| 4,807,960 | A * | 2/1989 | Oppenlander | G02B 6/2551 |
| | | | | 385/59 |
| 5,309,538 | A | 5/1994 | Larson | |
| 5,832,149 | A | 11/1998 | Omizu et al. | |
| 6,144,782 | A * | 11/2000 | Takahashi | G02B 6/3502 |
| | | | | 385/20 |
| 6,266,461 | B1 * | 7/2001 | Takahashi | G02B 6/3502 |
| | | | | 385/20 |
| 6,377,743 | B1 | 4/2002 | Ueda et al. | |
| 8,870,466 | B2 | 10/2014 | Lu | |
| 8,985,864 | B2 * | 3/2015 | Ott | G02B 6/3862 |
| | | | | 385/72 |
| 9,575,263 | B2 * | 2/2017 | Gurreri | G02B 6/3806 |
| 9,575,272 | B2 * | 2/2017 | Ott | G02B 6/4403 |
| 9,933,578 | B1 | 4/2018 | Chen | |
| 10,514,506 | B2 * | 12/2019 | Brusberg | G02B 6/2852 |
| 2004/0071407 | A1 | 4/2004 | Vergeest | |

FOREIGN PATENT DOCUMENTS

| | | | | |
|---|---|---|---|---|
| CN | 107995953 | A | 5/2018 | |
| EP | 2 549 313 | A1 | 1/2013 | |
| EP | 2 549 314 | A1 | 1/2013 | |
| JP | S57-139716 | A | 8/1982 | |
| JP | H08-5869 | A | 1/1996 | |
| JP | 2000-241664 | A | 9/2000 | |
| JP | 4094407 | B2 * | 6/2008 | ........... G02B 6/3508 |
| KR | 10-0308680 | B1 | 11/2001 | |
| KR | 10-0748560 | B1 | 8/2007 | |
| WO | 92/06396 | A1 | 4/1992 | |
| WO | 2012/112344 | A1 | 8/2012 | |
| WO | 2013/117598 | A2 | 8/2013 | |
| WO | 2016/043922 | A1 | 3/2016 | |
| WO | 2016/100384 | A1 | 6/2016 | |
| WO | 2017/081306 | A1 | 5/2017 | |
| WO | 2018/020022 | A1 | 2/2018 | |
| WO | 2018/144128 | A1 | 8/2018 | |
| WO | 2019/079326 | A1 | 4/2019 | |
| WO | 2020/046709 | A1 | 3/2020 | |
| WO | 2020112645 | A1 | 6/2020 | |

OTHER PUBLICATIONS

International Search Report and Written Opinion of the International Searching Authority for International Patent Application No. PCT/US2019/063026 mailed Mar. 20, 2020, 9 pages.

Office Action for Chinese Patent Application No. 201980078461.1 mailed Mar. 28, 2022, 28 pages.

* cited by examiner

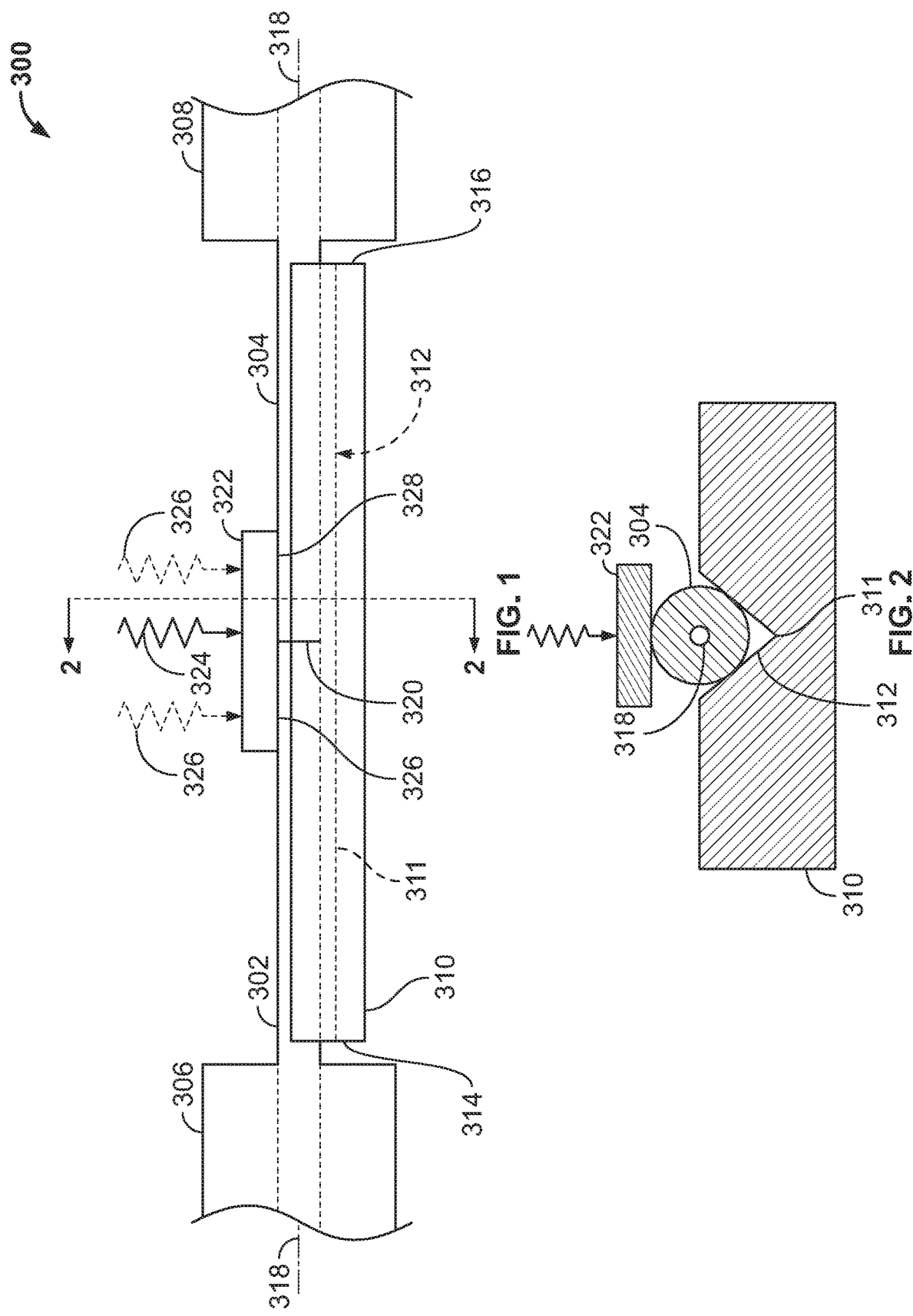

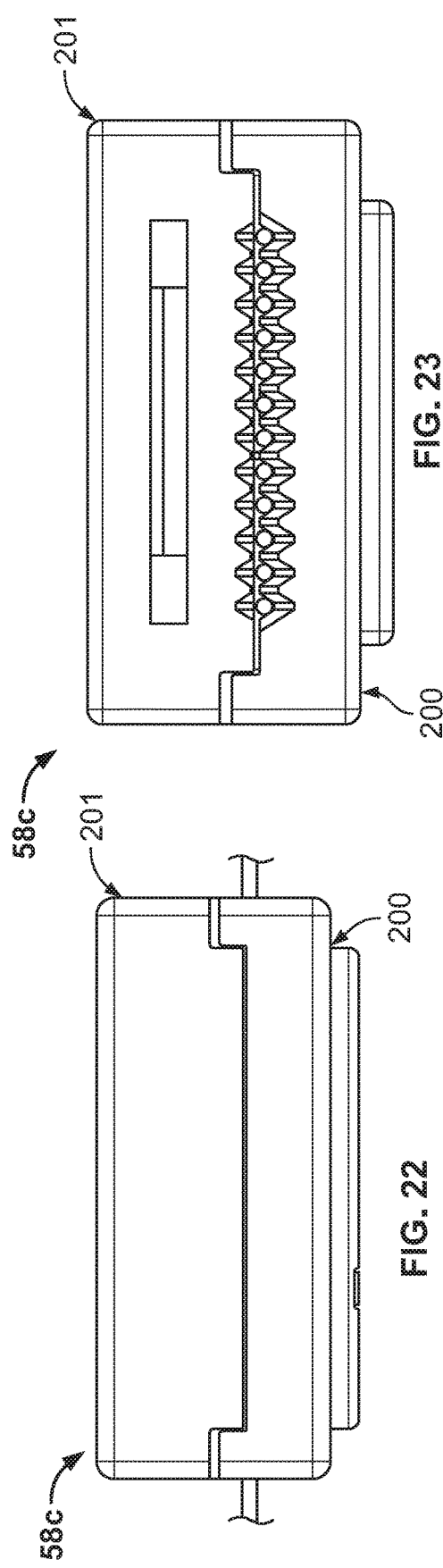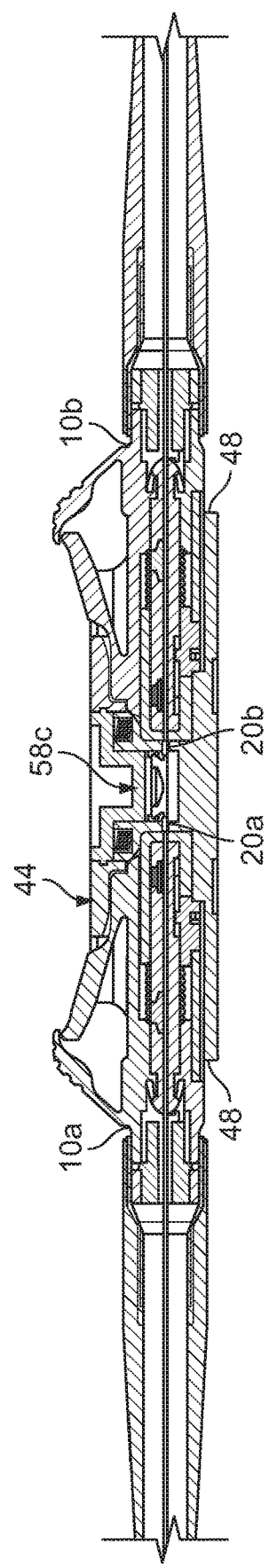

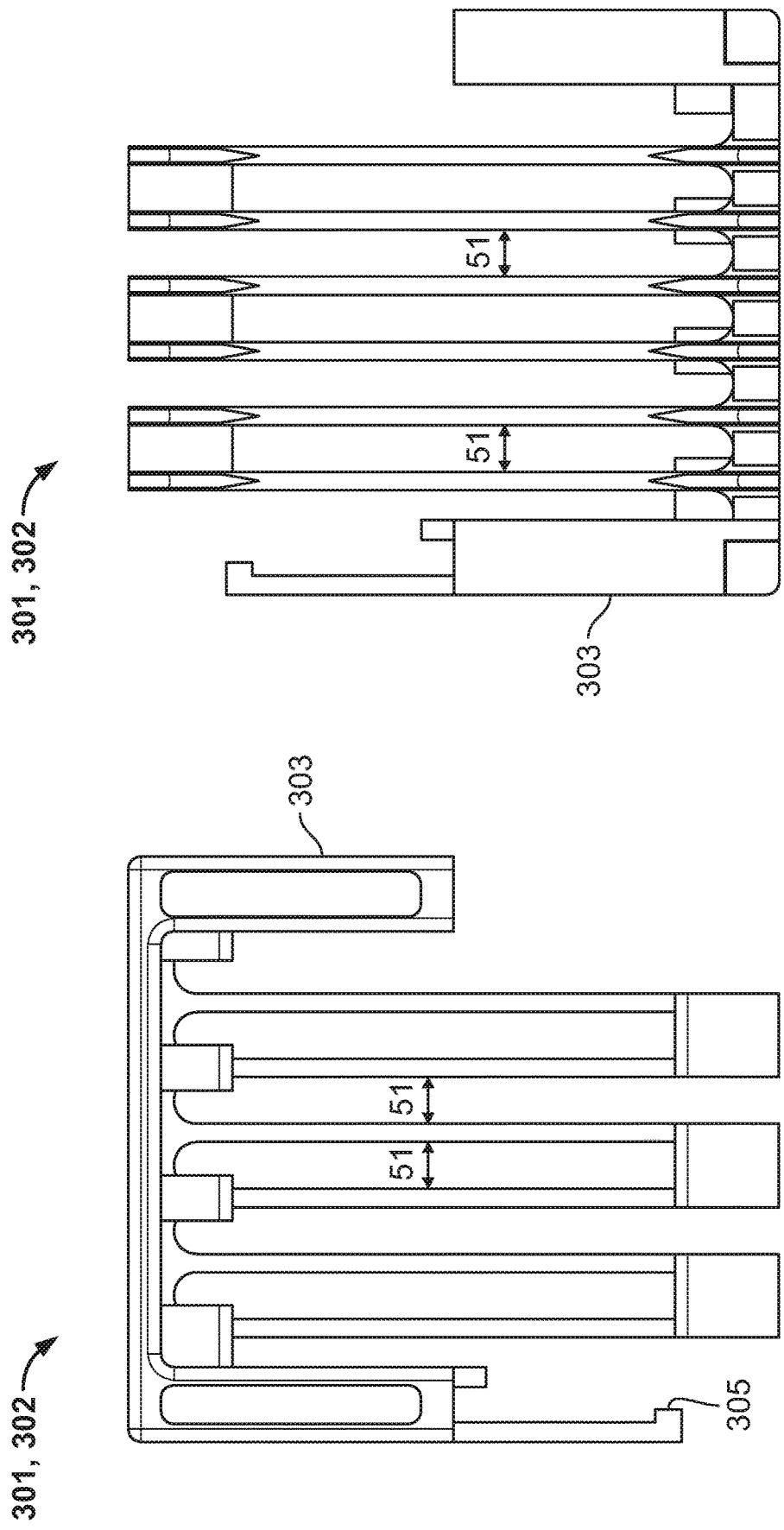

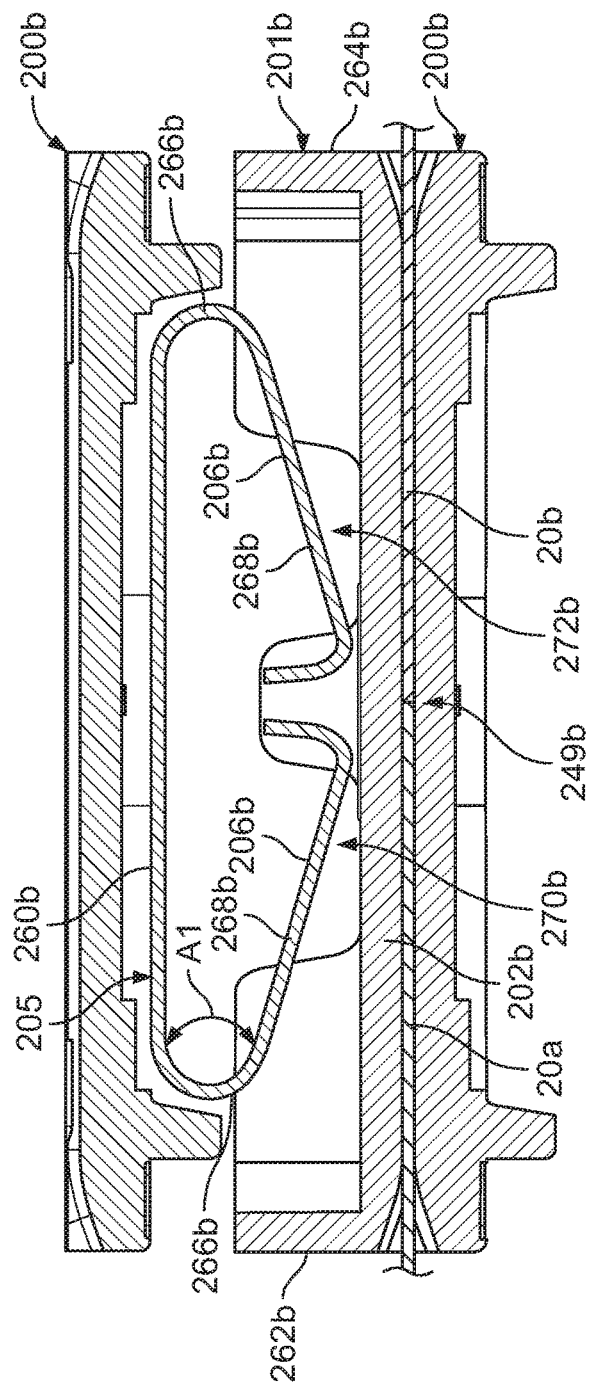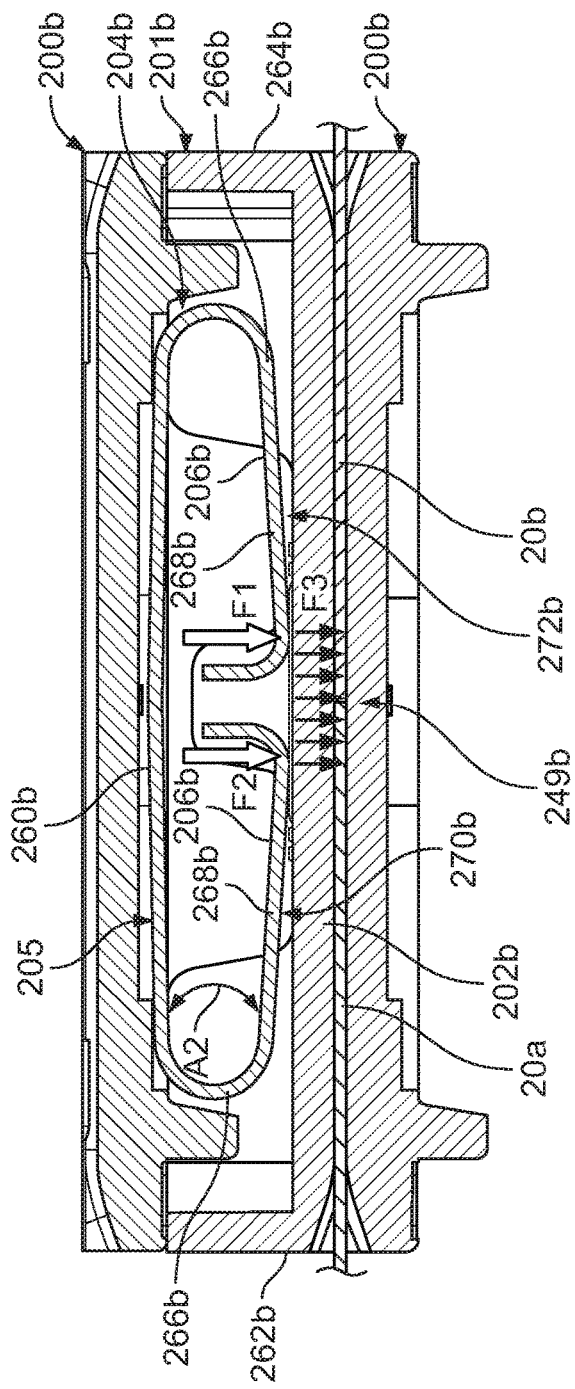

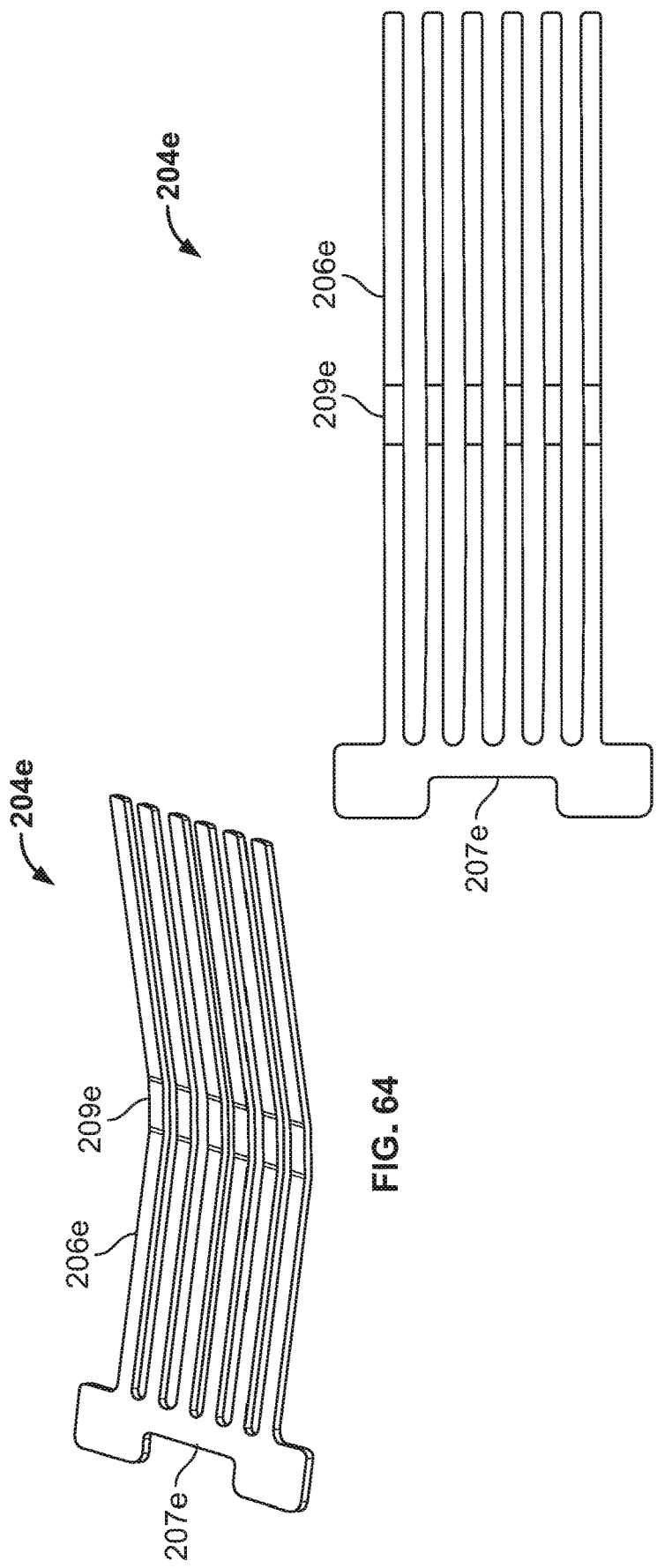

FIBER OPTIC ALIGNMENT DEVICES; SYSTEMS; AND METHODS

CROSS-REFERENCE TO RELATED APPLICATIONS

This application is a National Stage Application of PCT/US2019/063026, filed on Nov. 25, 2019, which claims the benefit of U.S. Patent Application Ser. No. 62/773,642, filed on Nov. 30, 2018, and claims the benefit of U.S. Patent Application Ser. No. 62/834,855, filed on Apr. 16, 2019, and claims the benefit of U.S. Patent Application Ser. No. 62/844,011, filed on May 6, 2019, and claims the benefit of U.S. Patent Application Ser. No. 62/909,367, filed on Oct. 2, 2019, the disclosures of which are incorporated herein by reference in their entireties. To the extent appropriate, a claim of priority is made to each of the above disclosed applications.

TECHNICAL FIELD

The present disclosure relates generally to fiber optic connection components such as fiber optic adapters. More particularly, the present disclosure relates to ferrule-less fiber optic connection components, systems and methods.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Example ferrule-less fiber optic connectors and/or fiber optic adapters are disclosed by PCT Publication Nos. WO 2012/112344; WO 2013/117598; WO 2017/081306; WO 2016/100384; WO 2016/043922; and U.S. Pat. Nos. 8,870,466 and 9,575,272.

Fiber optical adapters are used to optically couple together optical fiber tips of optical connectors. Fiber optical adapters can include specialized fiber alignment devices to receive bare optical fibers and align the fiber tips to enable the transfer of optical signals therebetween. Optical connectors can be secured to the optical adapters when received at the ports of the optical adapters.

Improvements are needed in the area of fiber alignment for multi-fiber fiber optic connectors and single fiber optic connectors.

SUMMARY

Aspects of the present disclosure relates to fiber alignment systems, apparatuses/devices, and methods for aligning optical fibers of ferrule-less fiber optic connectors.

Aspects of the present disclosure also relate to fiber alignment systems, apparatuses/devices, and methods for enhancing insertion loss performance relating to optical connection locations/interface between optical fibers. In certain examples, features in accordance with the principles of the present disclosure allow insertion loss to become more stable along the entire alignment system.

In certain examples, the fiber alignment systems of the ferrule-less fiber optic connectors can be configured to accommodate any number of optical fibers. In certain examples, the fiber alignment systems can be configured to accommodate fiber optic connectors including at least one, two, four, eight, twelve, sixteen, twenty-four, thirty-two, forty-eight, or more optical fibers. While aspects of the present disclosure are particularly useful for systems for aligning sets of multiple optical fibers (e.g., systems for aligning the optical fibers of multi-fiber optical connectors) because of the ability to provide high optical connection densities, the features and advantages of the present disclosure are also applicable to systems for aligning single pairs of optical fibers (e.g., systems for aligning the optical fibers of single fiber optical connectors).

One aspect of the present disclosure relates to an alignment system for aligning optical fibers of ferrule-less fiber optic connectors that allow contact pressure to be applied directly at or close to fiber end tips of the optical fibers of the fiber optic connector to help prevent the fiber end tips from flexing upwardly from a corresponding alignment structure (e.g., an alignment groove) and causing insertion loss. As such, the contact pressure is generally not offset from an optical interface location where the fiber end tips oppose each other to provide an optical connection between the optical fibers.

Another aspect of the present disclosure relates to an alignment system for aligning optical fibers of ferrule-less fiber optic connectors (e.g., fiber optic connectors having fibers not supported by a ferrule). The alignment system includes a contact member adapted to press optical fibers desired to be optically coupled together into an alignment groove when the optical fibers are inserted therein. The contact member can have a contact surface that contacts the optical fibers desired to be optically coupled together directly at or in very close proximity to the fiber end tips to press the optical fibers within the alignment groove. The contact member preferably extends across an optical interface location between the optical fibers desired to be optically coupled together so as to contact both of the optical fibers with a single contact member. The use of the single contact member for contacting both of the optical fibers desired to be aligned enables the optical fibers to be contacted directly at or in very close proximity to the fiber tips. The contact member can include a contact surface that contacts the optical fibers desired to be aligned and traverses the location where end faces of the tips of the optical fibers oppose each other.

Another aspect of the present disclosure relates to an alignment system for aligning optical fibers of ferrule-less or bare fiber optic connectors that includes an intermediate force transfer member (e.g., intermediate engagement member or element). The intermediate force transfer member allows a spring load from a spring or springs to be transferred through the intermediate force transfer member to optical fibers positioned in an alignment structure such as an alignment groove. The intermediate force transfer member preferably engages first and second optical fibers desired to be aligned and optically coupled together. The intermediate force transfer member preferably extends across an optical interface location where end faces of the tips of the optical fibers oppose each other. Thus, the intermediate force transfer member bridges the location where the end faces of the first and second optical fibers oppose each other and contacts both of the first and second optical fibers to bias both of the optical fibers into the alignment groove. The intermediate force transfer member assists in stabilizing insertion loss along the alignment system, particularly in the region adjacent the tips of the optical fibers. In an example where the alignment system uses two separate springs on opposite sides of the optical interface location that apply spring load through the intermediate force transfer member to the optical fibers in the alignment structure, the intermediate force transfer member enhances insertion loss performance in the region between the springs as compared to if the springs were configured to each directly engage a corresponding one of the optical fibers being aligned.

Another aspect of the present disclosure relates to an alignment system for aligning optical fibers of ferrule-less fiber optic connectors that includes a spring that transfers spring load through an intermediate transfer member to spring bias fiber end tips of optically coupled optical fibers into an alignment structure such as a groove. In one optional example, the spring includes at least one spring or a plurality of springs. In one optional example, the spring or springs includes one or multiple cantilever type springs. In other examples, the spring or springs includes one or more non-cantilever type springs (e.g., coil spring or springs, beam-type springs having opposite fixed ends, elastomeric materials such as elastomeric polymers or rubbers, etc.).

In one optional example, the intermediate transfer member includes a member that is flexed by a spring or springs toward the alignment structure. In one example, the intermediate transfer member is pre-flexed by the spring or springs toward the alignment structure prior to insertion of optical fibers in the alignment structure. In one optional example, the intermediate transfer member includes a beam that is fixed or supported at opposite ends of the beam, and the beam is flexed by the spring or springs toward the alignment structure at a region between the fixed/supported ends of the beam. In one optional example, the intermediate transfer member is positioned relative to the fiber alignment structure such that when optical fibers are inserted into the fiber alignment structure the optical fibers engage the intermediate transfer member thereby causing the intermediate transfer member to move (e.g., flex) away from the alignment structure against the bias of a spring or springs which apply spring load through the intermediate transfer member. In another example, the intermediate transfer member is not pre-flexed by the spring or springs toward the fiber alignment structure, but is positioned sufficiently close to the fiber alignment structure such that when optical fibers are inserted into the fiber alignment structure the optical fibers engage the intermediate transfer member thereby causing the intermediate transfer member to move (e.g., flex) away from the alignment structure against the bias of the spring or springs such that the spring or springs apply spring load through the intermediate transfer member.

Another aspect of the present disclosure relates to a method for co-axially aligning first and second optical fibers to provide an optical coupling between the first and second optical fibers. The method includes the steps of: 1) positioning the first and second optical fibers in an alignment groove with end faces of the first and second optical fibers opposing each other at an optical interface; and 2) spring biasing the first and second optical fibers into the alignment groove via a pressing member that includes a first portion that engages the first optical fiber, a second portion that engages the second optical fiber, and a third portion that extends across the optical interface and is located directly between the first and second portions.

Another aspect of the present disclosure relates to an apparatus for co-axially aligning first and second optical fibers to provide an optical coupling between the first and second optical fibers. The apparatus includes structure that defines a fiber alignment groove for receiving the first and second optical fibers. The fiber alignment groove can define a fiber insertion axis along which the first and second fibers are moved when inserted into the fiber alignment groove. The apparatus includes an optical coupling reference location at which end faces of the first and second optical fibers will oppose one another when the first and second optical fibers are optically coupled together. The optical coupling reference location can be positioned along the fiber alignment groove. The apparatus can further include a pressing member that has a fiber contact side that opposes an open side of the fiber alignment groove and extends across the optical coupling reference location such that the fiber contact side is adapted to engage both the first and second optical fibers when the first and second optical fibers are optically coupled together in the fiber alignment groove. The pressing member can apply a spring force to each of the first and second optical fibers to press the first and second optical fibers into the fiber alignment groove when the first and second optical fibers are optically coupled together within the fiber alignment groove.

Another aspect of the present disclosure relates to an apparatus for co-axially aligning first and second optical fibers to provide an optical coupling between the first and second optical fibers. The apparatus includes structure that defines a fiber alignment groove for receiving the first and second optical fibers. The fiber alignment groove defines a fiber insertion axis along which the first and second fibers are moved when inserted into the fiber alignment groove. The apparatus can include an optical coupling reference location at which end faces of the first and second optical fibers will oppose one another when the first and second optical fibers are optically coupled together. The optical coupling reference location can be positioned along the fiber alignment groove. The apparatus can further include a single beam that has a fiber contact side that opposes an open side of the fiber alignment groove and extends across the optical coupling reference location such that the fiber contact side is adapted to engage both the first and second optical fibers when the first and second optical fibers are optically coupled together in the fiber alignment groove. The single beam flexes when the first and second optical fibers are inserted into the fiber alignment groove.

Another aspect of the present disclosure relates to an apparatus for co-axially aligning sets of first and second optical fibers to provide an optical coupling between the sets of first and second optical fibers. The apparatus can include structure that defines a plurality of parallel fiber alignment grooves each configured for receiving one of the sets of the first and second optical fibers. The fiber alignment grooves define fiber insertion axes along which the first and second fibers are moved when inserted into the fiber alignment grooves. The apparatus includes optical coupling reference locations at which end faces of the first and second optical fibers will oppose one another when the first and second optical fibers are optically coupled together. The optical coupling reference locations can be positioned along the fiber alignment groove. The apparatus can further include a plurality of independently moveable beams each having a fiber contact side that opposes an open side of one of the fiber alignment grooves and that extends across the respective optical coupling reference locations such that the fiber contact side is adapted to engage both the first and second optical fibers when the first and second optical fibers are optically coupled together in the fiber alignment groove. The beams independently flex when the first and second optical fibers are inserted into their respective fiber alignment grooves.

Another aspect of the present disclosure relates to a fiber alignment system. The fiber alignment system includes a base member that has a first end and an opposite, second end. The base member defines a groove-type alignment structure that extends along a fiber insertion axis between the first and second ends. The groove-type alignment structure can be configured to receive a first optical fiber at the first end and a second optical fiber at the second end such that fiber tip ends of respective first and second optical fibers meet at an optical mating plane in the base member. The fiber alignment system can also include a fiber engagement member that corresponds with the groove-type alignment structure. The fiber engagement member can be configured to extend along a first length of the first optical fiber and along a second length of the second optical fiber when the first and second optical fibers are inserted in the groove-type alignment structure. The fiber engagement member further extends across the optical mating plane. The fiber alignment system can further include a deflection member adapted to spring bias the fiber engagement member in a downward direction toward the fiber tip ends of the respective first and second optical fibers into the groove-type alignment structure when the first and second optical fibers are inserted in the groove-type alignment structure.

Another aspect of the present disclosure relates to a fiber alignment device for optically coupling first and second optical fibers. The fiber alignment device can have a first end, an opposite second end, and an optical mating plane located between the first and second ends. The fiber alignment device can include a first piece that defines a groove-type alignment structure. The groove-type alignment structure extends along a fiber insertion axis between the first and second ends. The groove-type alignment structure can be configured to receive the first optical fiber at the first end and the second optical fiber at the second end. The fiber alignment device includes a second piece that includes a pressure member. The pressure member extends above the groove-type alignment structure. The pressure member can be spring biased by a cantilevered beam such that the pressure member directly engages optical fiber ends of the first and second optical fibers to press the optical fiber ends within the groove-type alignment structure to improve mating contact of the optical fiber ends positioned at the optical mating plane of the fiber alignment device.

A further aspect of the present disclosure relates to a multi-fiber alignment device for optically coupling first and second optical fibers. The fiber alignment device has a first end, an opposite second end, and an optical mating plane located between the first and second ends. The multi-fiber alignment device includes a first alignment piece that defines a plurality of groove-type alignment structures that extend along a fiber insertion axis between the first and second ends. Each one of the plurality of groove-type alignment structures can be configured to receive a respective first optical fiber at the first end and a respective second optical fiber at the second end such that fiber tip ends of the respective first and second optical fibers meet at the optical mating plane. The multi-fiber alignment device can also include a second alignment piece including a plurality of fiber engagement members that extend above a respective one of the plurality of groove-type alignment structures. The plurality of fiber engagement members can each be configured to extend along a first length of a respective one of the first optical fibers and along a second length of a respective one of the second optical fibers when the respective first and second optical fibers are inserted in a respective one of the plurality of groove-type alignment structures. The plurality of fiber engagement members further extending across the optical mating plane. The multi-fiber alignment device can include a third alignment piece that includes a plurality of deflection members adapted to spring bias a respective one of the plurality of fiber engagement members such that the respective one of the plurality of deflection members directly engage a respective one of the optical fiber ends of the first and second optical fibers to press the optical fiber ends within the respective one of the plurality of groove-type alignment structures to improve mating contact of the respective one of the optical fiber ends positioned at the optical mating plane of the multi-fiber alignment device.

Another aspect of the present disclosure relates to an apparatus for co-axially aligning sets of first and second optical fibers to provide an optical coupling between the sets of first and second optical fibers. The apparatus includes structure defining a plurality of parallel fiber alignment grooves each configured for receiving one of the sets of the first and second optical fibers. The fiber alignment grooves define fiber insertion axes along which the first and second fibers are moved when inserted into the fiber alignment grooves. The apparatus is configured such that the end faces of the first and second optical fibers will oppose one another when the first and second optical fibers are optically coupled together. The apparatus also includes a plurality of independently moveable beams each having a fiber contact side that opposes an open side of no more than two of the fiber alignment grooves and that is adapted to engage both the first and second optical fibers of at least one of the sets of first and second optical fibers when the first and second optical fibers are optically coupled together by the apparatus.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1 is a schematic view depicting a optical fiber alignment device (e.g., system) in accordance with the principles of the present disclosure, first and second ferruleless fiber optic connectors including bare optical fibers having perpendicular end faces are shown inserted within the optical fiber alignment device;

FIG. 2 is a cross-sectional view taken along section line 2-2 of FIG. 1;

FIG. 22 is a side view of the optical fiber alignment device of FIG. 20;

FIG. 23 is an end view of the optical fiber alignment device of FIG. 20;

FIG. 24 is a cross-sectional view showing the optical fiber alignment device of FIG. 20 incorporated into a fiber optic adapter;

FIG. 35 is a top view of one of the half-pieces of the pressing structure of FIG. 32;

FIG. 36 is a bottom view of one of the half-pieces of the pressing structure of FIG. 32;

FIG. 50 is a cross-sectional view of the optical fiber alignment device of FIG. 46 prior to assembly, the cross-section is taken generally along section line 49-49 of FIG. 46;

FIG. 51 is a cross-sectional view of the optical fiber alignment device of FIG. 46 after assembly of the device, the cross-section is taken generally along cross-section line 49-49;

FIG. 64 is a perspective view of a spring set of a type incorporated within the optical fiber alignment device of FIG. 63;

FIG. 65 is a top view of the spring set of FIG. 64;

FIG. 66 is a side view of the spring set of FIG. 64;

DETAILED DESCRIPTION

Figure 3:
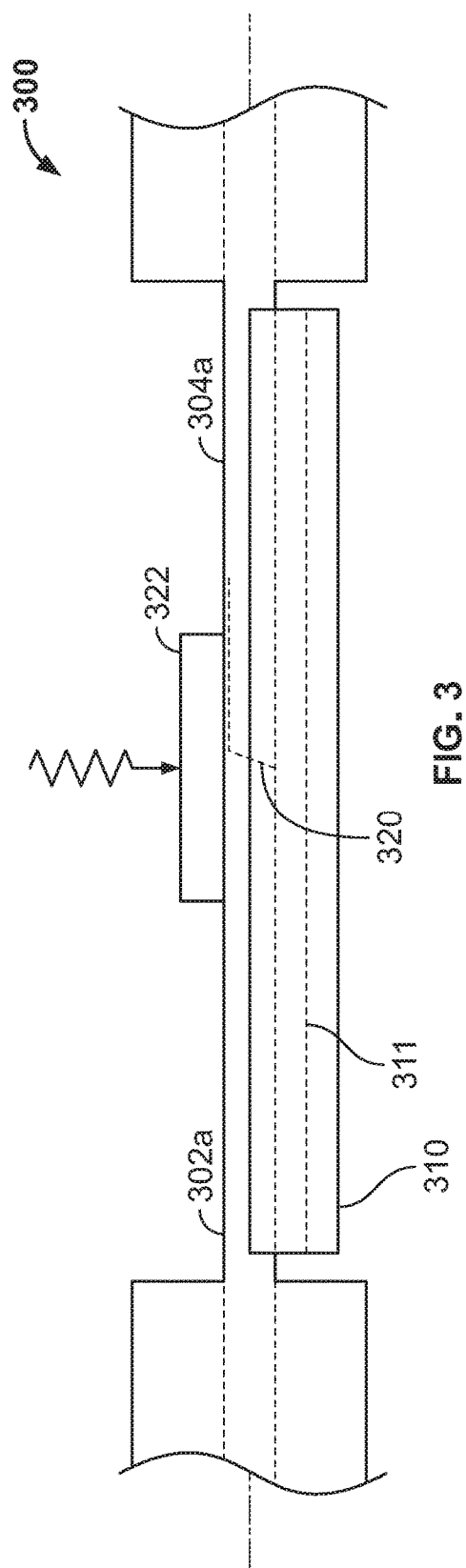
FIG. 3 is a schematic view depicting the optical fiber alignment device of FIG. 1 being used to align a pair of first and second optical fibers having angled end faces.
Figure 4:
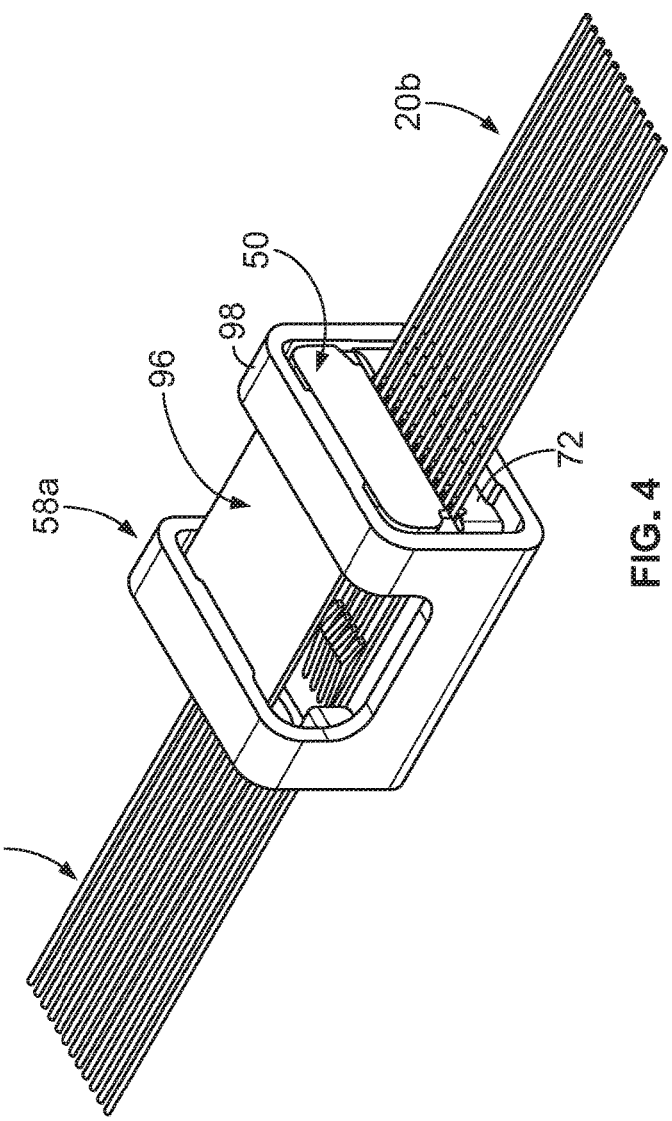
FIG. 4 is a perspective view depicting another optical fiber alignment device in accordance with the present disclosure, two sets of optical fibers are shown inserted into the optical fiber alignment device.
Figure 5:
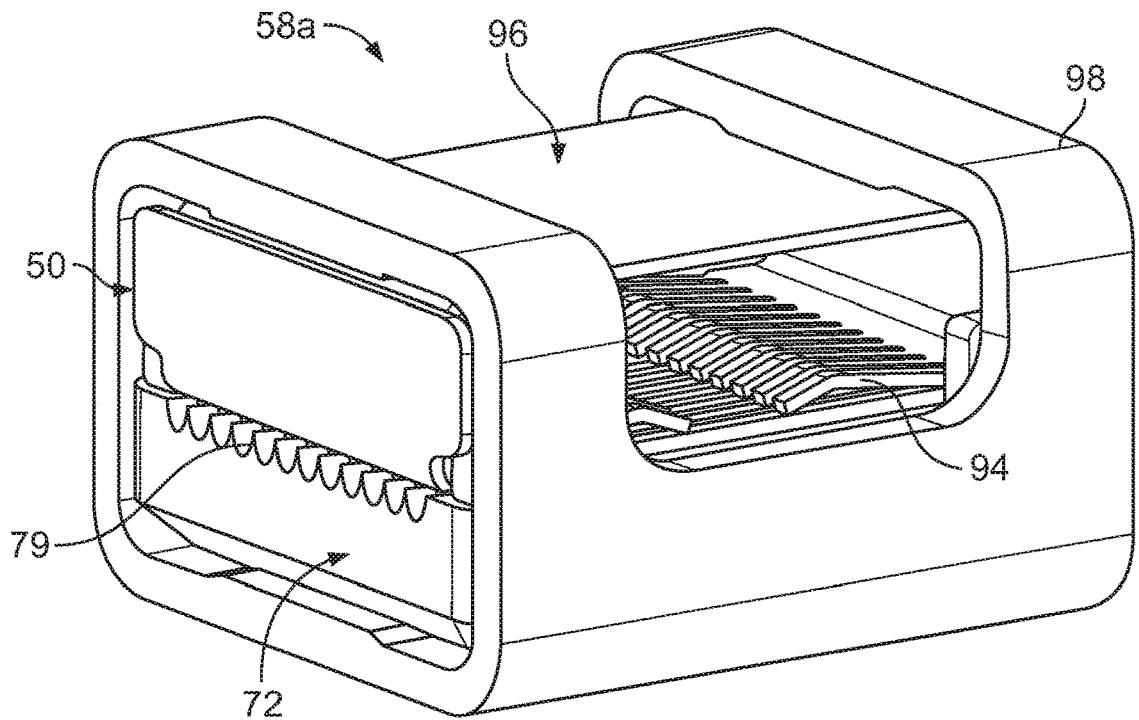
FIG. 5 is a perspective view of the optical fiber alignment device of FIG. 4 with the optical fibers removed.

Aspects of the present disclosure relates to alignment systems for aligning optical fibers of ferrule-less (e.g., bare fiber) fiber optic connectors to provide optical connections between the optical fibers of the fiber optic connectors. The aspects apply to the alignment of optical fibers of single fiber optical connectors and multi-fiber optical connectors.

Alignment systems in accordance with the principles of the present disclosure can include alignment structures for co-axially aligning optical fibers to provide optical connections between the aligned optical fibers. The alignment structures can define alignment grooves for receiving an aligning the optical fibers. The alignment grooves can be defined by structures such as substrates which may each define one or more grooves. The substrates can include members such as plates which may have a ceramic construction, a metal construction, a plastic construction or other constructions. The alignment grooves can include grooves having v-shaped cross-sections (e.g., v-grooves) grooves having u-shaped cross-sections, grooves having through-shaped cross-sections, grooves having half-circle shaped cross-sections or grooves having other shapes. In other examples, alignment grooves in accordance with the principles of the present disclosure can be defined by parallel cylindrical rods oriented in a side-by-side relationship. Various alignment structures defining grooves are disclosed by PCT International Publication Number WO 2018/020022, which is hereby incorporated by reference in its entirety. In certain examples, index matching gel can be used between opposing ends of optical fibers aligned within the alignment structures.

Alignment systems in accordance with the principles of the present disclosure can also include contact or pressing elements (i.e., contact members, contact components, contact features, pressing members, pressing components, pressing features, etc.) that function to bias optical fibers into the alignment structures to ensure effective co-axial alignment of the optical fibers at the optical interface where end faces of the optical fibers oppose one another. Each contact or pressing element can include an element that is moveable relative to the alignment structure and that is configured to press first and second optical fibers within the alignment structure. A single one of the contact elements is preferably configured to press both of its corresponding first and second optical fibers into an alignment groove. The contact element preferably engages each of the first and second optical fibers directly at or in close proximity to tips of the optical fibers. In this way, the contact element can bias the optical fibers directly at or in close proximity to the optical interface location between the optical fibers to ensure effective alignment of the opposed end faces of the optical fibers. The contact element includes a first contact region adapted to press the first optical fiber into the fiber alignment structure and a second contact region adapted to press the second optical fiber into the fiber alignment structure. Extending along the contact element in one direction directly from the first contact region to the second contact region, the contact element traverses an optical interface reference location between the first and second optical fibers. The optical interface reference location is the location within the fiber alignment structure where the end faces of the first and second optical fibers oppose each other when the first and second optical fibers are fully inserted within the fiber alignment structure. The contact element is adapted to spring bias the first and second optical fibers into the fiber alignment structure. The spring biasing force can be derived from the inherent resiliency (i.e., spring-like characteristics) of the contact element, or by the resiliency of a spring or springs that apply spring load through the contact element, or by both the inherent resiliency of the contact element and by the resiliency of a spring or springs that apply spring load through the contact element. The diameters of the optical fibers are larger than a spacing/clearance between the contact element and the alignment structure such that when the optical fibers are inserted into the alignment structure, the contact element is required to be forced away from the alignment structure by the optical fibers to allow the optical fibers to be received/accommodated within the alignment structures. It will be appreciated that during fiber insertion, the optical fibers move the contact element away from the alignment structure against the spring biasing force which resists such movement. In this way, the spring biasing force for pressing the optical fibers into the alignment structure is applied by the contact element to the optical fibers.

FIGS. 1 and 2 schematically depict a fiber alignment system 300 in accordance with the principles of the present disclosure shown optically coupling together first and second optical fibers 302, 304 corresponding to first and second ferrule-less fiber optic connectors 306, 308. The fiber alignment system 300 includes a fiber alignment structure 310 which defines a fiber alignment groove 312 (e.g., a v-groove) in which the fibers 302, 304 are positioned to co-axially align the optical fibers 302, 304. A bottom 311 of the fiber alignment groove 312 is shown in hidden line and the portions of the optical fibers 302, 304 recessed within the fiber alignment groove 312 are shown in hidden line as well. The fiber alignment groove 312 includes opposite ends 314, 316 into which the optical fibers 302, 304 are respectively inserted. The optical fibers 302, 304 can be inserted into the alignment groove 312 along a fiber insertion axis 318 that extends along the alignment groove 312. When the fiber optic connectors 306, 308 are fully inserted/loaded into the fiber alignment system 300, the optical fibers 302, 304 are received within the opposite ends 314, 316 of the alignment groove 312 and end faces of the optical fibers 302, 304 oppose one another at an optical interface reference location 320. The optical interface reference location 320 is the location where an optical interface (i.e., optical connection) is made between the optical fibers 302, 304 when the optical fibers are aligned within the alignment groove 312. It will be appreciated that the end faces of the optical fibers 302, 304 are located at tips of the optical fibers 302, 304. With the optical fibers 302, 304 inserted within the alignment groove 312, the end faces of the optical fibers are aligned (e.g., co-axially aligned) and preferably oppose one another. In one example, the end faces can physically contact one another at the optical interface reference location 320. In another example, a space can exist between the end faces at the optical interface. If such space is present, it is preferably filled with an index matching gel to enhance optical performance. The optical fibers 302, 304 depicted have end faces that are perpendicular with respect the axes of the optical fibers 302, 304. It will be appreciated that alignment systems in accordance with the principles of the present disclosure can also be used to optically connect optical fibers having end faces that are oriented at non-perpendicular angles relative to axes of the optical fibers (e.g., see optical fibers 302a, 304a depicted at FIG. 3 being optically coupled together by the fiber alignment system 300).

The portions of the first and second optical fibers 302, 304 received within the alignment groove 312 are preferably bare fibers. As used herein, a bare fiber is a section of optical fiber that does not include any coating. Instead, the bare fiber includes a core surrounded by a cladding layer. The optical fiber is "bare" because the cladding layer is exposed and not covered by a supplemental coating layer such as acrylate.

It is desirable for the first and second optical fibers 302, 304 to be precisely co-axially aligned at the optical interface between the optical fibers 302, 304. To ensure precise alignment at the optical interface, the fiber alignment system 300 includes a pressing member 322 that presses the optical fibers 302, 304 into the alignment groove 312 (e.g., via a spring bias force 324) at the optical interface between the optical fibers 302, 304. The pressing member 322 includes a first portion or region 326 for engaging and pressing the first optical fiber 302 into the groove 312 and a second portion or region 328 for engaging and pressing the second optical fiber 304 into the groove 312. Extending along the pressing member 322 in one direction directly from the first region 326 to the second region 328, the pressing member 322 traverses (e.g., bridges) the optical interface reference location 320 where the optical interface between the fibers 302, 304 occurs. It will be appreciated that the pressing member 322 can flex, pivot, bend or otherwise move to maintain contact with both of the optical fibers 302, 304. The spring biasing force 324 is distributed between the first and second optical fibers 302, 304 by the pressing member 322. The pressing member 322 is spaced a small enough distance from the alignment structure 310 that the optical fibers 302, 304 are required to contact the pressing member 322 (e.g., a bottom side of the pressing member 322) upon insertion of the optical fibers 302, 304 into the alignment groove 312. During the insertion process, contact between the optical fibers 302, 304 and the pressing member 322 forces the pressing member 322 to bend, flex, translate or otherwise move away from the alignment structure 310 against the spring biasing force 324. As so moved, the spring biasing force is applied from the pressing member 322 to the inserted optical fibers 302, 304. The spring biasing force can be generated by the internal inherent resiliency of the pressing member itself, can be generated by another spring or springs in engagement with the pressing member, or can be generated by a combination of both.

As depicted at FIG. 1, the spring biasing force 324 is shown in solid line as being generated by a single centrally located spring. In other examples, the spring biasing force can be generated by two or more springs 326 (see in phantom line) that engage the pressing member 322. The springs 326 can be positioned on opposite sides of the optical interface reference location 320 and can be respectively positioned to align with or be positioned over each of the optical fibers 302, 304. The spring biasing force can be transferred from the spring or springs to the pressing member 322, and can be distributed and applied to the optical fibers 302, 304 by the pressing member 322. Thus, the spring loading can be transferred through the pressing member 322 to the optical fibers 302. Therefore, the pressing member 322 is an intermediate member between the spring biasing structure and the optical fibers 302, 304, and allows spring load from the spring or springs to be applied to the fibers 302, 304 indirectly by the pressing member rather than directly by the springs.

It will be appreciated that fiber optic alignment systems in accordance with the principles of the present disclosure can be incorporated into fiber optic adapters having ports for receiving fiber optic connectors. While the fiber optic connectors 306, 308 have been depicted schematically, example configurations for the fiber optic connectors as well as example configurations for adapter housings in which alignment systems in accordance with the principles of the present disclosure can be incorporated are disclosed by U.S. Provisional Patent Application Ser. No. 62/724,356, which is hereby incorporated by reference in its entirety.

Figure 6:
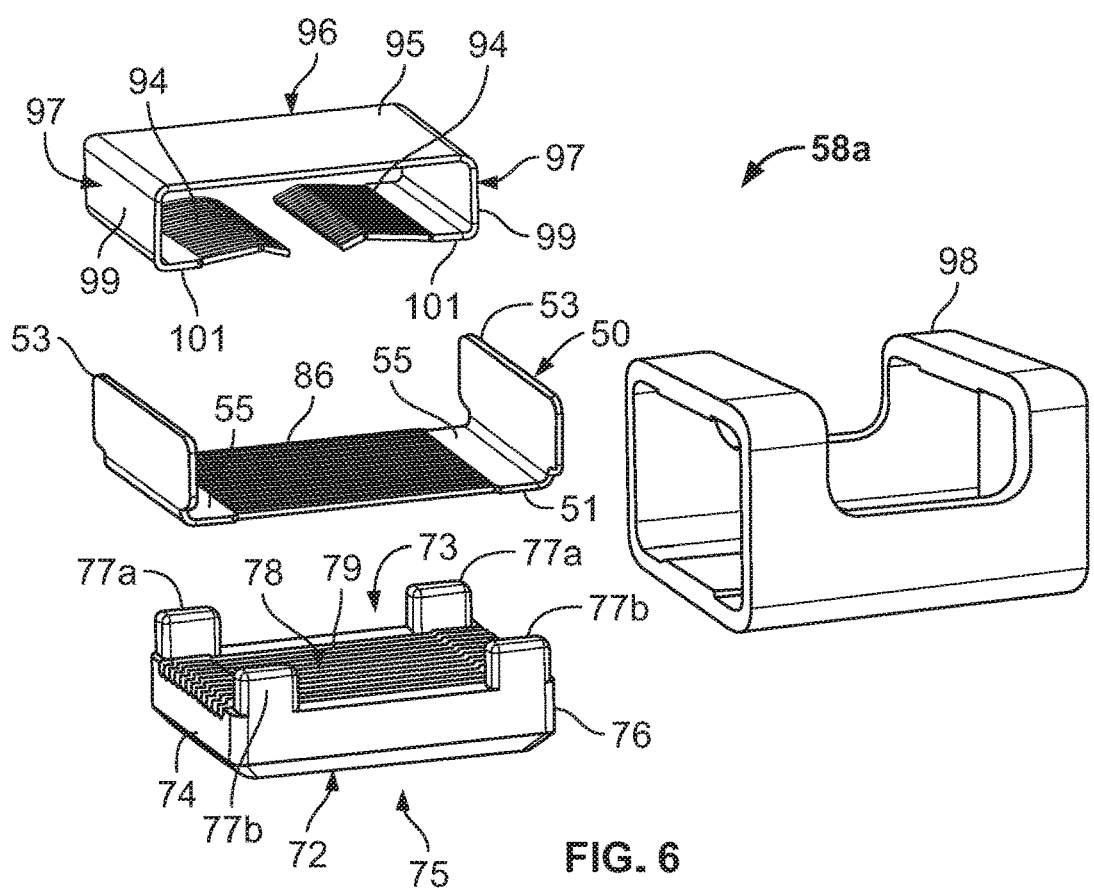
FIG. 6 is an exploded view of the optical fiber alignment device of FIG. 5.

Turning to FIGS. 4-10, an example configuration of a fiber alignment structure 58a (e.g., apparatus) in accordance with the principles of the present disclosure is depicted. The fiber alignment structure 58a is adapted for aligning and optically coupling a first set of optical fibers 20a to a second set of optical fibers 20b. It will be appreciated that the first set of optical fibers 20a can correspond to a first multi-fiber ferrule-less fiber optic connector and the second set of optical fibers 20b can correspond to a second multi-fiber ferrule-less fiber optic connector. Referring to FIG. 6, the depicted fiber alignment structure 58a can include a base member 72 (e.g., structure, first piece, member, element, substrate) that has a first end 74 and an opposite, second end 76. The base member 72 can define a groove-type alignment structure 78 including a plurality of parallel grooves 79 (see FIG. 8) each configured for aligning one of the optical fibers of the first set of optical fibers 20a with one of the optical fibers of the second set of optical fibers 20b. The grooves 79 are depicted as being parallel and are shown extending from the first end 74 to the second end 76 of the base member 72. The first set of optical fibers 20a can be inserted into the grooves 79 of the alignment structure 78 from the first end 74 and the second set of optical fibers 20b can be inserted to the grooves 79 of the alignment structure 78 from the second end 76. The first and second sets of optical fibers 20a, 20b are preferably inserted in opposite direction along the grooves 79 of the alignment structure 78 until the tips/end faces of the optical fibers 20a, 20b oppose one another and optionally abut one another at an optical interface reference location 84 (see FIG. 10) located generally a mid-region between the opposite ends 74, 76.

As used herein, the term, "groove," is defined generally as an elongate structure that can receive and support an optical fiber. In one example, the elongate structure can have two surfaces that are angled such that when an optical fiber lies within the groove, the optical fiber makes line contact with the two surfaces. The elongate structure can be defined by one component (e.g., a groove in a substrate such as a plate) or multiple components (e.g., a groove defined by two parallel rods). Generally a groove will have an open side and a closed side in which an optical fiber sits. In one example, the groove may include a v-groove that has angled surfaces. In such an example, the v-groove will have a structure that preferably provides two lines of contact with an optical fiber inserted therein. In this way, the line/point contact with the v-groove assists in providing accurate alignment of the optical fibers.

Referring to FIG. 6, the base member 72 includes a main body having opposite first and second major sides 73, 75 (e.g., upper and lower major sides). The grooves 79 are defined at the first major side 73. Alignment posts 77 project outwardly (e.g., upwardly) from the first major side 73 are located adjacent corners of the base member 72. The posts 77 include sets of two posts 77a, 77b adjacent each of the first and second ends 74, 76 of the base 72. The posts 77a, 77b of each set of posts are positioned on opposite sides of the plurality of grooves 79. The base member 72 can be referred to as a groove-defining structure, can be constructed of plastic, metal, ceramic or other materials, and can be manufactured by molding, casting, machining, etching or other process.

Figure 9:
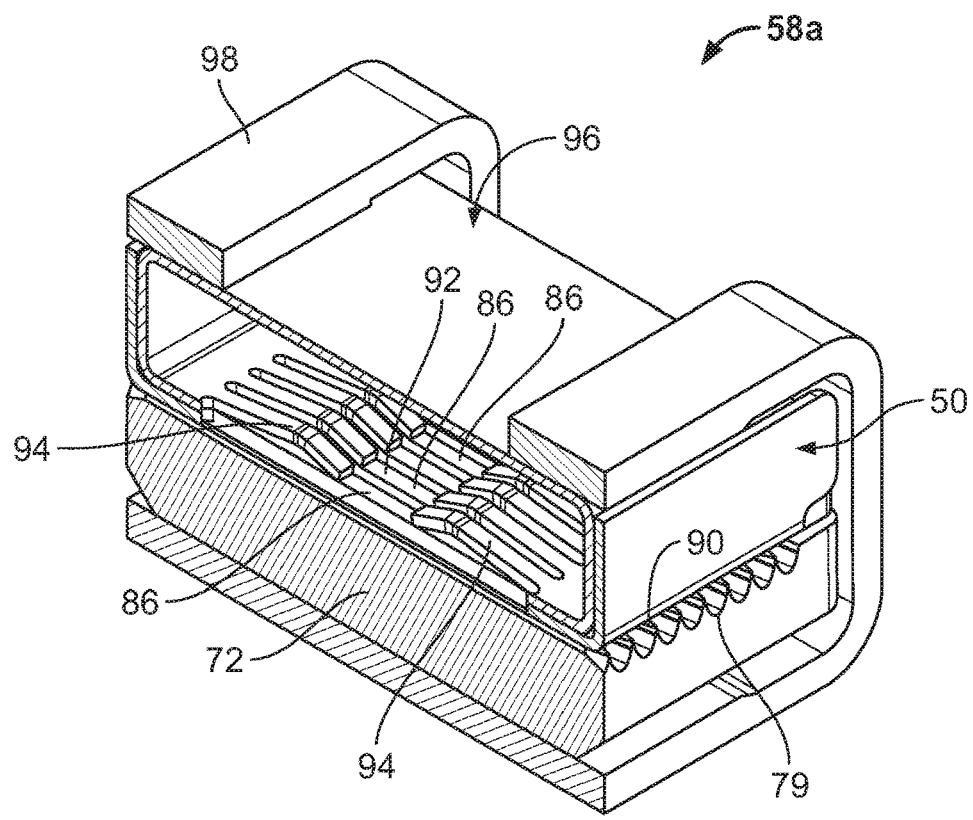
FIG. 9 is a perspective, cross-sectional view of the optical fiber alignment device of FIG. 5.
Figure 10:
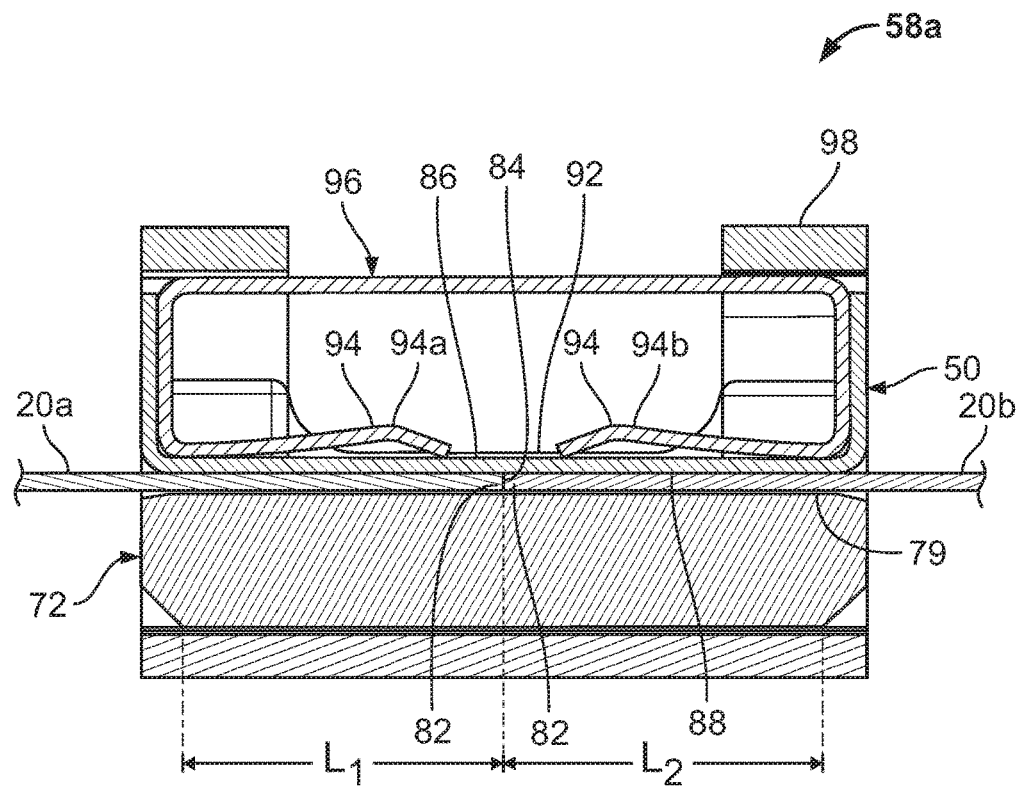
FIG. 10 is a cross-sectional view of the fiber alignment device of FIG. 5.
Figure 11:
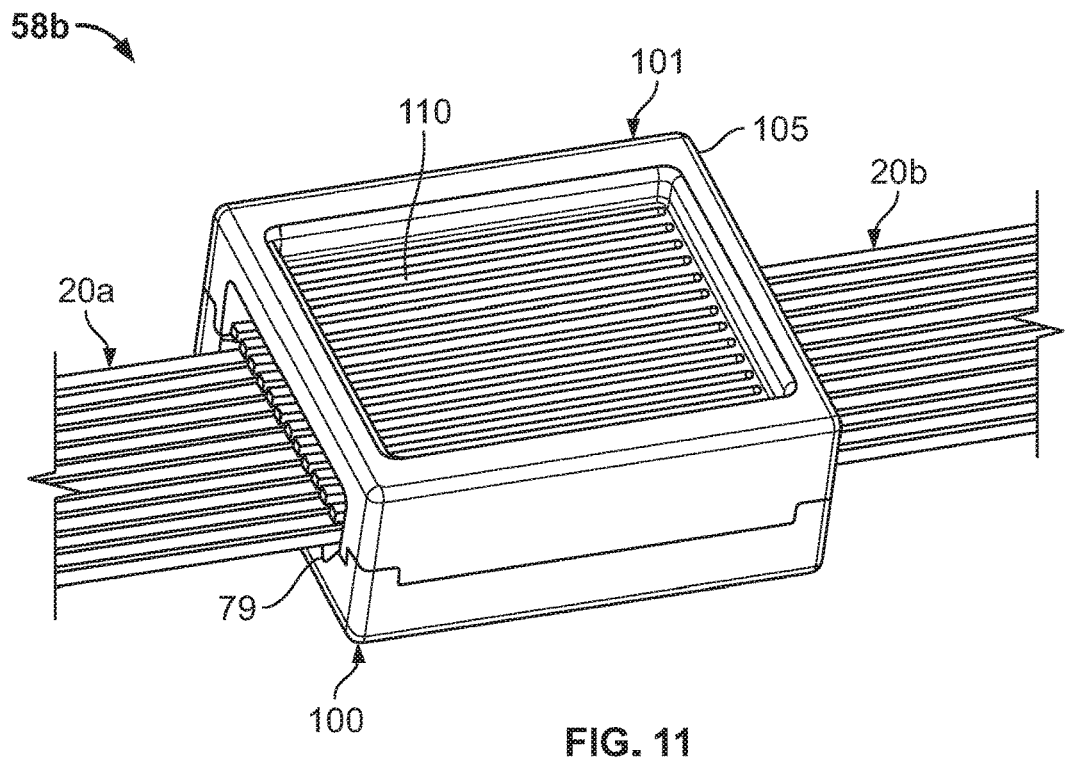
FIG. 11 is a perspective view depicting a further optical fiber alignment device in accordance with the present disclosure, two sets of optical fibers are shown inserted into the optical fiber alignment device.

Turning to FIGS. 9 and 10, the fiber alignment structure 58a can further include independently moveable fiber engagement members 86 (e.g., pressing member, pressing element, contact member, contact element, second piece) that corresponds with each of the grooves 79 of the groove-type alignment structure 78. The fiber engagement members 86 may be flexible and may be configured to flex or otherwise move when optical fibers are inserted into their corresponding grooves. The fiber engagement members 86 have fiber contact sides 88 that oppose open sides 90 (see FIG. 8) of the grooves of the groove-type alignment structure 78. The fiber engagement members 86 can be arranged and configured to engage both the first and second optical fibers 20a, 20b within their corresponding grooves directly at the fiber tip ends 82 of the first and second optical fibers 20a, 20b (see FIG. 10). In certain examples, the fiber engagement members 86 each extend across the optical mating interface 84 of their corresponding optical fibers 20a, 20b such that the fiber contact side 88 is adapted to engage both the first and second optical fibers 20a, 20b when the first and second optical fibers 20a, 20b are optically coupled together in the groove-type alignment structure 78. The fiber engagement members 86 may include spring contact sides 92 (e.g., spring engagement side) (see FIG. 11) positioned opposite from the fiber contact sides 88.

In certain examples, the fiber engagement members 86 can be configured to extend along a first length $L_1$ of the first optical fiber 20a and along a second length $L_2$ of the second optical fiber 20b when the first and second optical fibers 20a, 20b are inserted in the groove-type alignment structure 78. In certain examples, the fiber engagement members 86 may be arranged and configured to apply a spring force to each of the first and second optical fibers 20a, 20b to press the first and second optical fibers 20a, 20b into the groove-type alignment structure 78 when the first and second optical fibers 20a, 20b are optically coupled together within the groove-type alignment structure 78. That is, the fiber engagement members 86 can press the first and second optical fibers 20a, 20b into the groove-type alignment structure 78 to help prevent the fiber tip ends 82 of the respective first and second optical fibers 20a, 20 from flexing in an upwardly direction.

In certain examples, the fiber engagement members 86 may be integrated as part of a combined unitary component 50 (e.g., a unitary fiber engagement component). It will be appreciated that the combined unitary component 50 can be constructed of plastic, metal, ceramic or other materials and can be manufactured by molding, casting, machining, etching or other process. In one example, the fiber engagement members 86 can be configured as independently flexible or moveable beams having opposite ends fixed relative to a main body or frame of the unitary component 50. The beams can be separated along their lengths by slots to allow the beams to flex between the fixed ends independently with respect to one another. Each beam can correspond to (e.g., extend directly over and parallel to) one of the grooves of the alignment structure 78. The beams can each include one of the contact sides 88 that opposes the open side 90 of a corresponding one of the grooves of the alignment structure 78 and that extends across the respective optical mating plane 84 such that the fiber contact side 88 is adapted to engage both the first and second optical fibers 20a, 20b when the first and second optical fibers 20a, 20b are optically coupled together in the groove-type alignment structure 78. The plurality of independently moveable beams independently flex when the first and second optical fibers 20a, 20b are inserted into their respective grooves of the groove-type alignment structure 78. In certain examples, as indicated above, the plurality of independently moveable beams are separated by slots defined in the component 50 to remove interference from neighboring beams.

As indicated above, it will be appreciated that the fiber engagement members 86 can be incorporated into or as part of a combined fiber engagement structure, arrangement, component or unit such as the combined unitary component 50. As indicated above it is preferred for each of the fiber engagement members 86 of the fiber engagement structure to be independently moveable relative to each other and for each of the fiber engagement members 86 to correspond to only one of the fiber alignment grooves 79. However, in other examples, fiber engagement members 86 can be used that each correspond to more than one fiber alignment groove 79.

Figure 7:
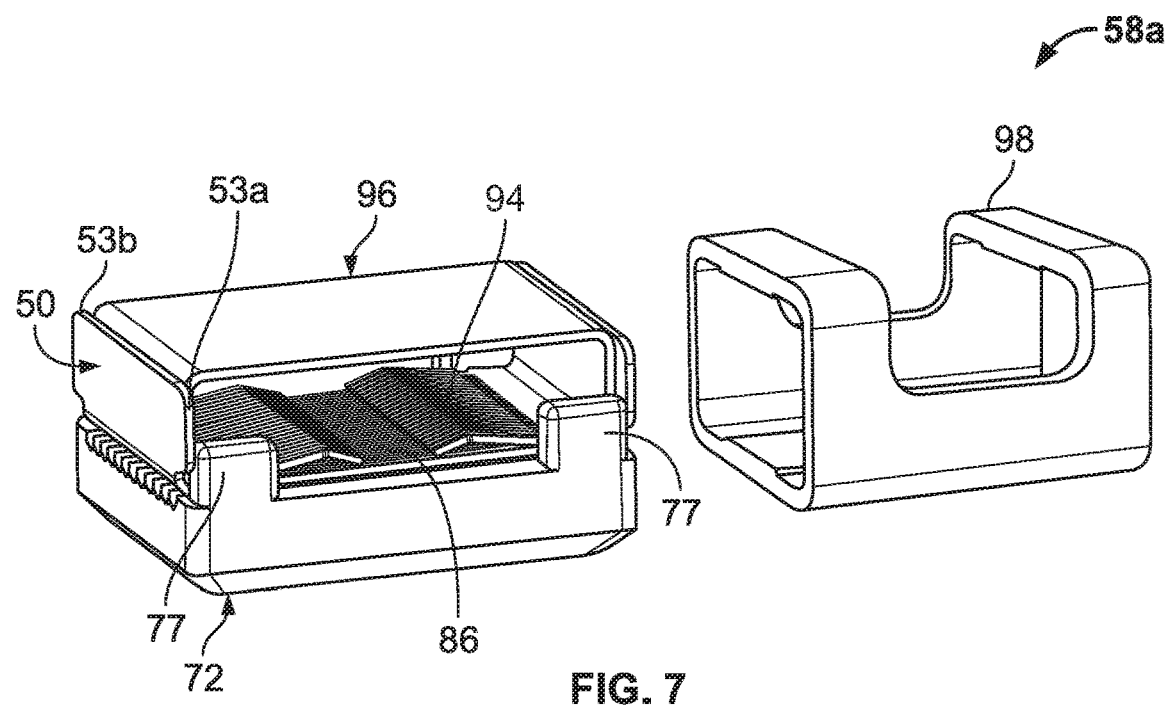
FIG. 7 is a partially exploded view of the optical fiber alignment device of FIG. 5.
Figure 8:
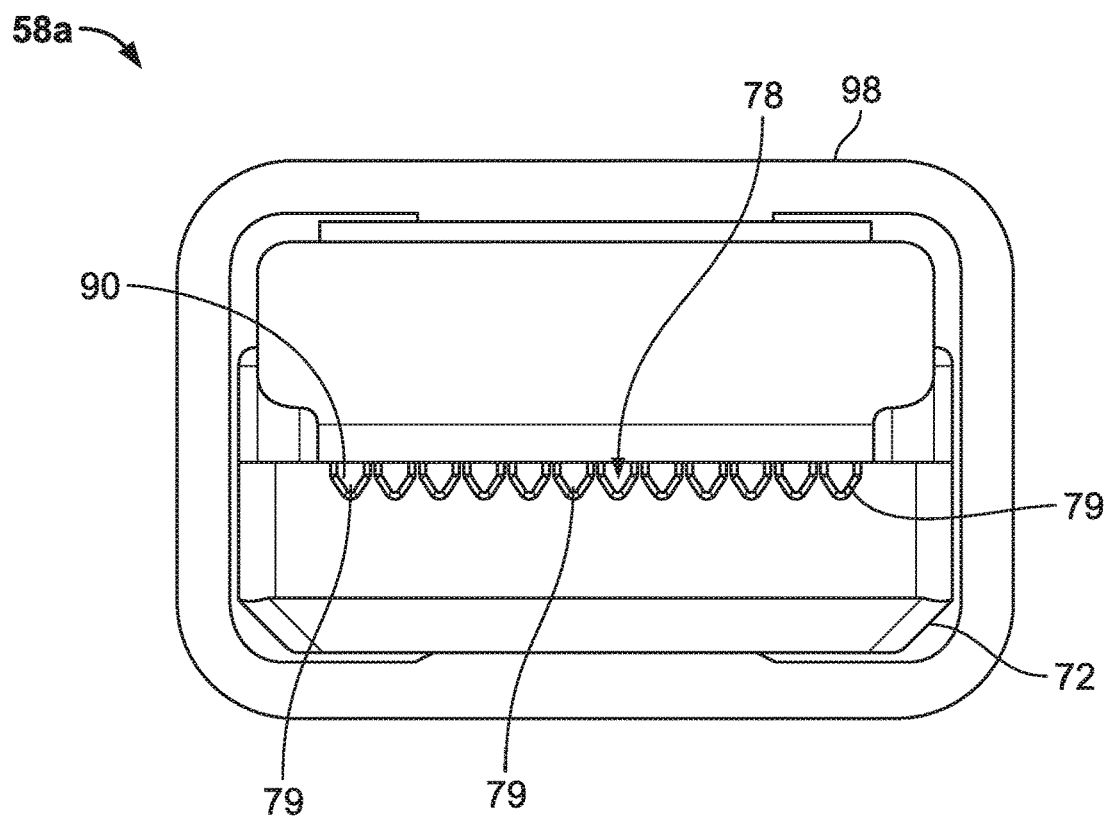
FIG. 8 is an end view of the optical fiber alignment device of FIG. 5.

Referring to FIG. 6, the unitary component 50 can include a main plate 51 and opposite end flanges 53 that project outwardly (e.g., upwardly) from opposite ends of the main plate 51. The fiber engagement members 86 can be integrated into a central region of the main plate 51 (e.g., the central region of the main plate can define a plurality of parallel through-slots that separate and define the individual fiber engagement members 86). The fiber engagement members 86 can include beam-like constructions with each beam having opposite ends unitarily formed with non-slotted end portions 55 of the main plate 51. The end flanges 53 are shown projecting perpendicularly from the ends of the main plate 51. As shown at FIGS. 6 and 7, when the fiber alignment structure 58a is assembled, the main plate 51 of the unitary component 50 fits between the posts 77a, 77b such that the posts 77a, 77b restrict lateral movement of the main plate 51 relative to the base 72. Preferably, the posts 77a, 77b retain the unitary component 50 in a lateral position relative to the base 72 in which the fiber engagement members 86 align with (e.g., are positioned directly over) corresponding ones of the grooves 79 of the base 72. The end flanges 53 are wider than the main plate 51 and include retaining portions 53a, 53b that overlap axial end faces of the posts 77a, 77b when the unitary component 50 is positioned on the base 72 to limit (e.g., prevent or restrict) axial movement of the unitary component 50 relative to the base 72.

The fiber alignment structure 58a can further include a biasing structure, arrangement or component that may optionally include a plurality of biasing members 94 (e.g., spring or springs, biasing member or members, biasing beam or beams, biasing cantilevered beam or beams, biasing piece or pieces, etc.) adapted to spring bias the fiber engagement members 86 in a direction (e.g., a downward direction) toward the fiber tip ends 82 of the respective first and second optical fibers 20a, 20b such that the fiber tips 82 are forced/pressed/biased into the groove-type alignment structure 78 at least when the first and second optical fibers 20a, 20b are inserted in the groove-type alignment structure 78. It is preferred for the biasing structure to include a plurality of the biasing members 94 which are independently moveable relative to each other. Preferably, at least one of the biasing members 94 corresponds to each of the fiber engagement members 86 to enhance the independent operation of the fiber engagement members 86 (e.g., the biasing members 94 may each be configured to apply biasing force to only a corresponding one of the fiber engagement members 86). In certain examples, more than one (e.g., two or more) of the biasing members 94 can be provided for applying biasing spring load/force to a corresponding one of the fiber engagement members 86 for pressing optical fibers corresponding to the engagement members into corresponding fiber alignment grooves. In other examples, biasing members may be used that apply biasing spring force to more than one fiber engagement member. The fiber engagement members 86 can each function as an intermediate force transfer member configured for transferring the spring force from one or more biasing members 94 to both of the first and second optical fibers 20a, 20b being aligned in the alignment groove corresponding to the fiber engagement member 86. Thus, spring biasing forces generated by the biasing members 94 are transferred through the fiber engagement members to the corresponding optical fibers. The biasing members 94 therefore do not directly apply biasing forces to the optical fibers, but instead apply the biasing forces to the fiber engagement members 86 which transfer the biasing forces to the optical fibers. To this extent, indirect biasing forces are applied to the optical fibers.

In certain examples, the biasing members 94 contact and apply spring biasing forces to the spring contact sides 92 of the fiber engagement members 86 such that the spring forces are transferred through the fiber engagement members 86 from the spring contact sides 92 to the fiber contact sides 88. The spring forces can then be transferred from the fiber contact sides 88 to each of the corresponding first and second optical fibers 20a, 20b. The fiber engagement members 86 may be adapted to flex toward the biasing members 94 when the first and second optical fibers 20a, 20b are inserted into the groove-type alignment structure 78 thereby causing the biasing members to flex and apply spring biasing load to the fiber engagement members 86. The spring biasing load resists flexing of the engagement members 86 toward the biasing members 94 and is transferred through the fiber engagement members 86 to their corresponding optical fibers inserted within the fiber alignment structure. In some examples, the biasing members may pre-flex the fiber engagement members 86 toward the grooves 79 of the fiber alignment structure prior to insertion of the optical fibers 20a, 20b in the alignment grooves 79 such that fiber engagement members 86 are pre-loaded with the spring biasing force. In other examples, the biasing members 94 may be configured to apply biasing force only when the fiber engagement members 86 flex in response to optical fibers being inserted in their corresponding fiber alignment grooves 79 (i.e., when the fiber engagement members 86 flex to accommodate insertion optical fibers in their corresponding fiber alignment grooves 79).

In certain examples, the biasing members 94 include multiple biasing members for each fiber engagement members 86. For example, the biasing members 94 can include a first spring 94a positioned on one side of the optical mating interface 84 and a second spring 94b positioned on an opposite side of the optical mating interface 84 for each fiber engagement member 86. By way of example, the springs 94a, 94b are depicted as cantilever-type springs.

In certain examples, the biasing members 94 of the biasing structure or arrangement may be integrated into or as part of a single unitary biasing component 96 (see FIGS. 6 and 7). In certain examples, the component 96 can have a plastic, metal, ceramic or other construction and can be manufactured by a variety of manufacturing processes such as molding, casting, machining, etching or the like. The biasing component 96 can include a main plate 95 and end flanges 97 that project outwardly from the main plate 95 (e.g., in a downward direction) at opposite ends of the main plate 95. The flanges 97 can include end wall portions 99 that are transversely oriented relative to the main plate and non-slotted portions 101 that project from the wall portions 99 and are parallel to the main plate 95. The biasing members 94 are depicted as cantilever spring members having base ends unitary with the non-slotted portions 101 and free ends positioned opposite from the base ends. Separate sets of cantilever spring members are provided for each of the flanges 97. The cantilever members of each of the sets of cantilever members are separated from one another by slots that extend from the base ends to the free ends.

When the fiber alignment structure 58a is assembled, the non-slotted portions 101 are retained between the posts 77a, 77b to limit lateral movement of the biasing component and to maintain alignment between the biasing members 94 and their corresponding fiber engagement members. Also, the wall portions 99 are positioned inside and oppose the end flanges 53 of the unitary component 50 to limit axial movement between the biasing component 96 and the unitary fiber engagement component 50. When the fiber alignment structure 58a is assembled, the separate sets of cantilever spring members are positioned on opposite sides of the optical coupling interface location 84. Additionally, when the fiber alignment structure 58a is assembled, the main plate 95 of the biasing component 96 can be parallel to the main plate 51 of the fiber engagement component 50.

In certain examples, the fiber alignment structure 58a can include a housing 98 (e.g., outer body, holding member) (see FIGS. 4-10) for housing the base member 72, the intermediate component 50, and the biasing component 96. In certain examples, the housing 98 may be part of a fiber optic adapter housing, or may be received or mounted within a fiber optic adapter housing. In certain examples, the base member 72 defining the alignment grooves 79, the intermediate fiber engagement component 50 and the biasing component 96 can be compressed together within the housing 98, with the intermediate fiber engagement component 50 compressed positioned between the base member 72 and the biasing component 96.

In certain examples, the fiber engagement component 50 can be mounted above the base member 72 such that individual fiber engagement members 86 can align and extend above respective ones of the grooves 79. That is, the fiber engagement component 50 can mount adjacent to the base member 72 and the individual fiber engagement members 86 cover open sides 90 of individual grooves 79. In certain examples, the biasing component 96 can mount relative to the fiber engagement component 50 such that individual biasing members 94 align with and engage respective ones of the fiber engagement members 86 without engaging neighboring ones of the biasing members 94 and/or neighboring fiber engagement members 86.

Figure 17:
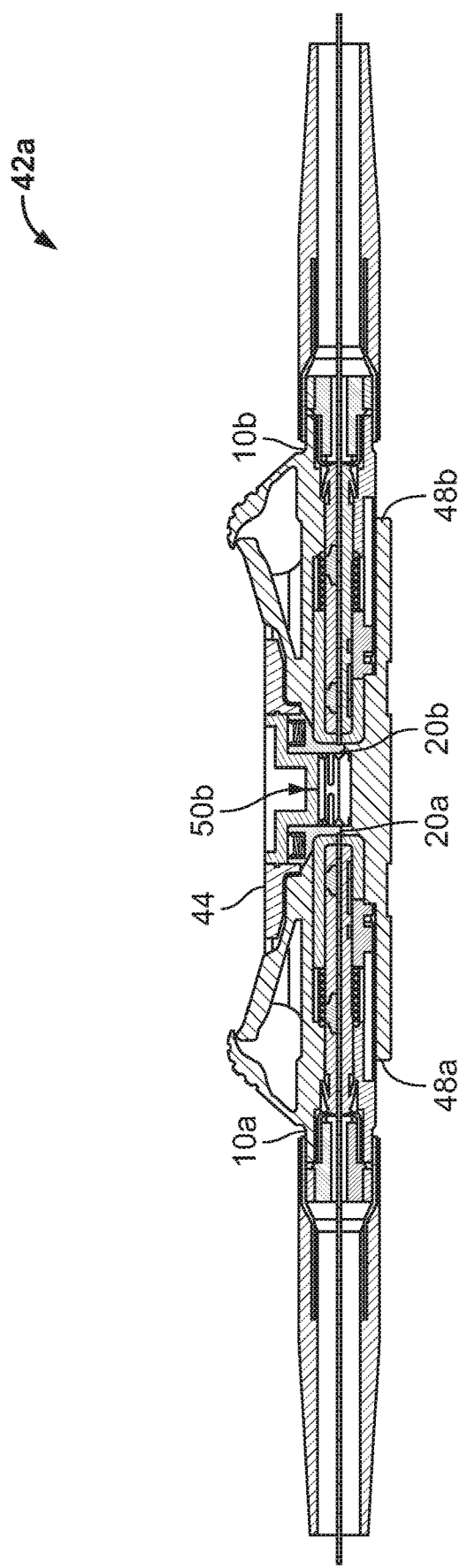
FIG. 17 shows the optical fiber alignment device of FIG. 11 integrated within a fiber optic adapter.

Turning to FIGS. 11-16, another example fiber alignment structure 58b in accordance with the principles of the present disclosure is depicted. As shown at FIG. 17, the fiber alignment structure 58b can be part of a fiber optic connection system 42a. The fiber optic connection system 42a can include a fiber optic adapter 44 defining opposite connector ports 48a, 48b between which the fiber alignment structure 58b is located. The connector ports 48 can be configured for receiving multi-fiber optical connectors 10a, 10b each including a respective set of optical fibers 20a, 20b. When the fiber optic connectors 10a, 10b are respectively inserted in the opposite connector ports 48a, 48b, their corresponding optical fibers 20a, 20b are co-axially aligned an optically connected to each other. The fiber alignment structure 58b can include a groove-defining structure 100 (e.g., a groove-defining component) and a pressing structure 101 (e.g., a pressing component, a pressing unit) for co-axially aligning first and second optical fibers 20a, 20b of the first and second optical fiber connectors 10a, 10b to provide an optical coupling between the first and second optical fibers 20a, 20b. The pressing structure 101 can include a plurality of independently moveably pressing member 102.

It will be appreciated that the pressing structure 101, described in greater detail below, incorporates both fiber contacting portions (e.g., elements such as pressing members 102) and biasing portions (e.g., spring elements for applying spring load through the fiber contacting portions) into one component. Similar to previous examples, the fiber contacting portions are each adapted to extend across the optical interface between two optical fibers desired to be optically coupled together, to contact and apply biasing force to both of the optical fibers to press the optical fibers into an alignment groove, and to be moveable relative to the optical fibers as the optical fibers are inserted into the fiber alignment device. In one example, the fiber contacting portions are defined by beams. In one example, the beams have free ends and are coupled to springs at intermediate locations along the lengths of the beams. In one example, the beams are connected to springs at central locations along the lengths of the beams.

The groove-defining structure 100 defines fiber alignment grooves 79 for receiving the first and second optical fibers 20a, 20b. In certain examples, each of the fiber alignment grooves 79 can be configured to receive one optical fiber 20a from the first fiber optic connector 10a and another optical fiber 20b from the second fiber optic connector 10b such that the received optical fibers 20a, 20b abut one another within the fiber alignment grooves 79 and are co-axially aligned. The fiber alignment grooves 79 can define the fiber insertion axes 318 along which the first and second optical fibers 20a, 20b are moved when inserted into the fiber alignment grooves 79. The groove-defining structure 100 can be made of a material and manufactured by a process of the type described with respect to the base 72 of the fiber alignment structure 58a.

The fiber alignment structure 58b further includes optical coupling reference locations 84 at which end faces of the first and second optical fibers 20a, 20b will oppose one another when the first and second optical fibers 20a, 20b are optically coupled together. The optical coupling reference locations 84 can be positioned along the fiber alignment grooves 79 (e.g., adjacent central locations along lengths of the grooves 79). The pressing members 102 are positioned to extend across the optical coupling reference locations.

Figure 14:
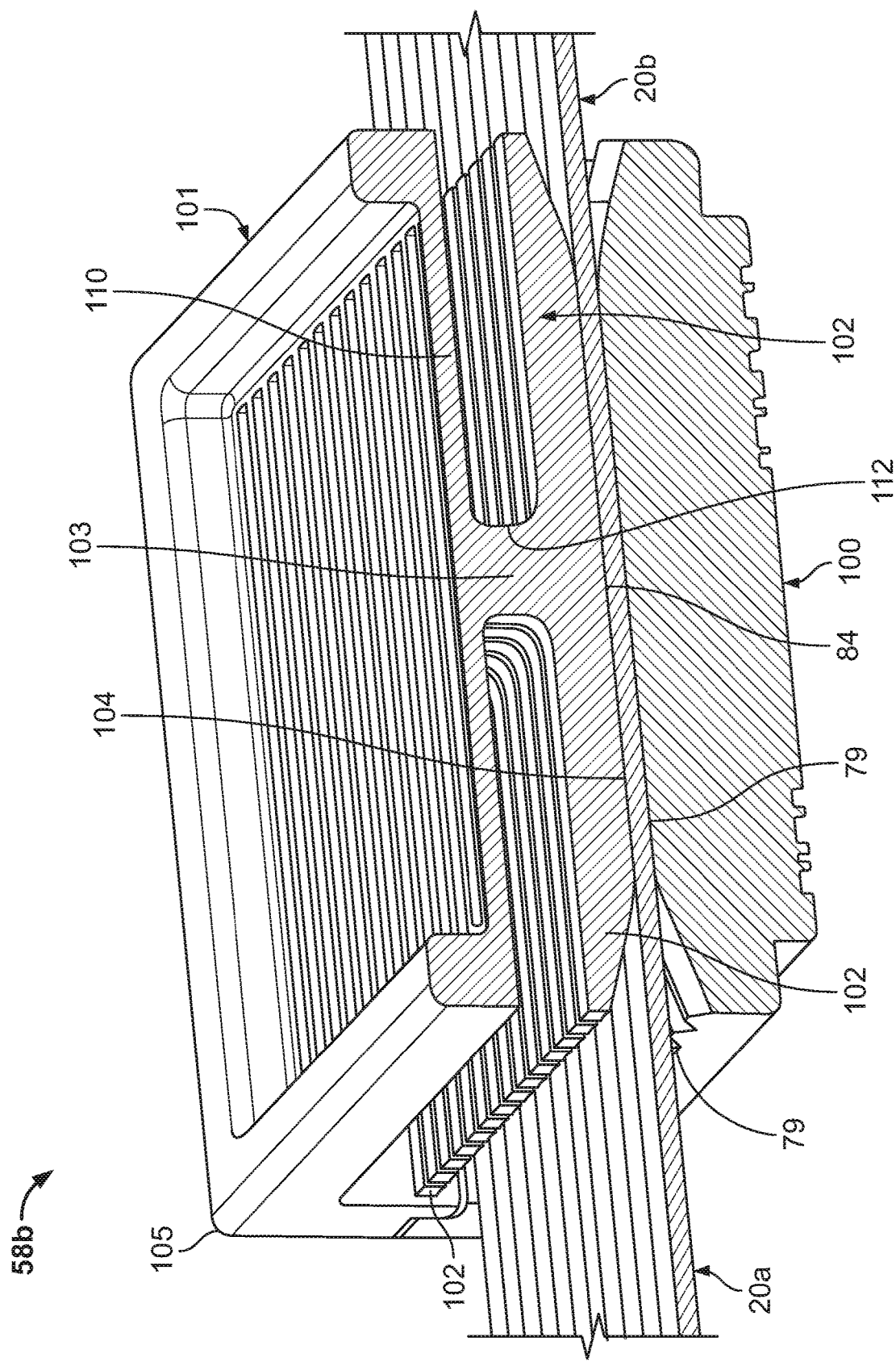
FIG. 14 is a perspective, cross-sectional view of the optical fiber alignment device of FIG. 11.
Figure 15:
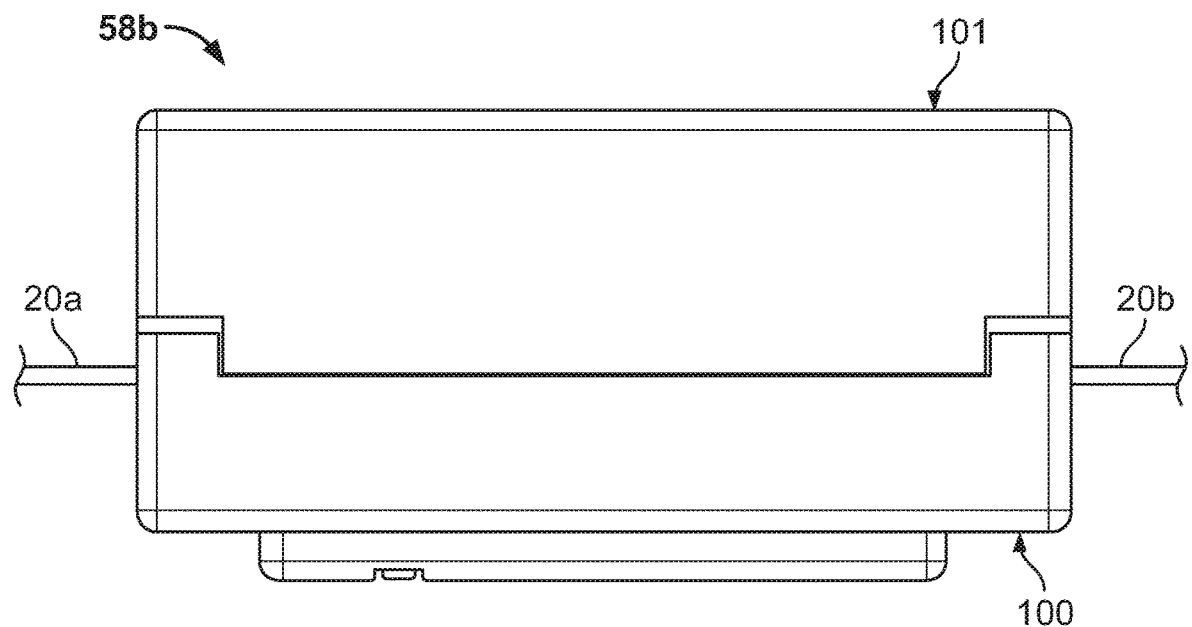
FIG. 15 is a side view of the optical fiber alignment device of FIG. 11.
Figure 16:
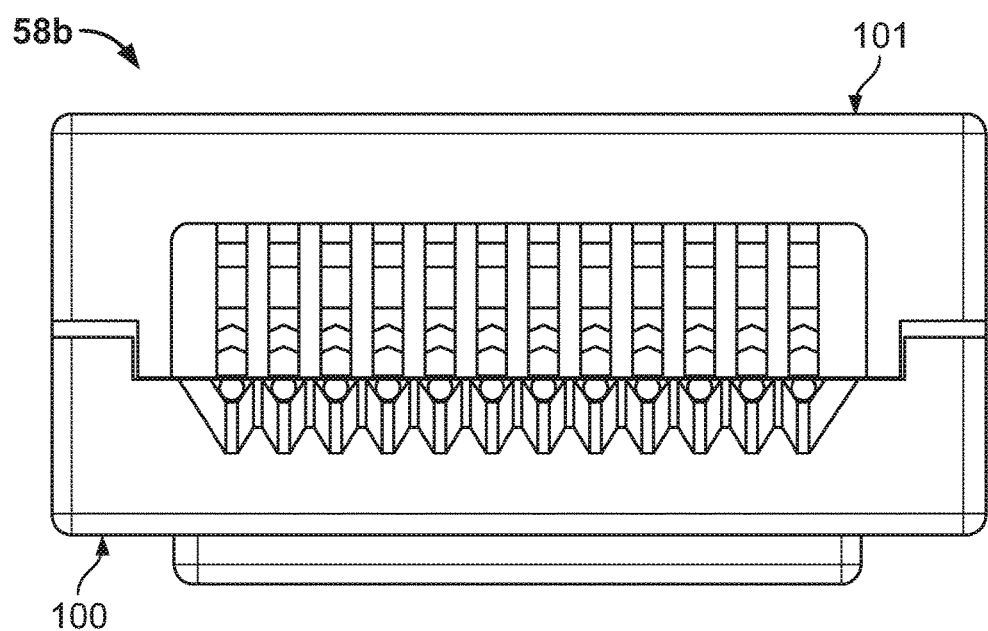
FIG. 16 is an end view of the optical fiber alignment device of FIG. 11.

Turning to FIG. 14, the pressing members 102 of the pressing structure 101 of the fiber alignment structure 58b each include a fiber contact side 104 that opposes an open side of a corresponding one of the fiber alignment groove 79. The fiber contact sides 104 preferably extend across the optical coupling reference locations 84 such that the fiber contact sides 104 are each adapted to engage both the first and second optical fibers 20a, 20b when the first and second optical fibers 20a, 20b are optically coupled together in the fiber alignment groove 79. In certain examples, the pressing members 102 can each apply a spring force to each of the corresponding first and second optical fibers 20a, 20b to press the first and second optical fibers 20a, 20b into the fiber alignment groove 79 when the first and second optical fibers 20a, 20b are optically coupled together within the fiber alignment groove 79. In the depicted example, each of the pressing members 102 is shown as a single beam having opposite ends that are free and having a length that extends along the length of the corresponding groove 79 which the single beam opposes.

Figure 21:
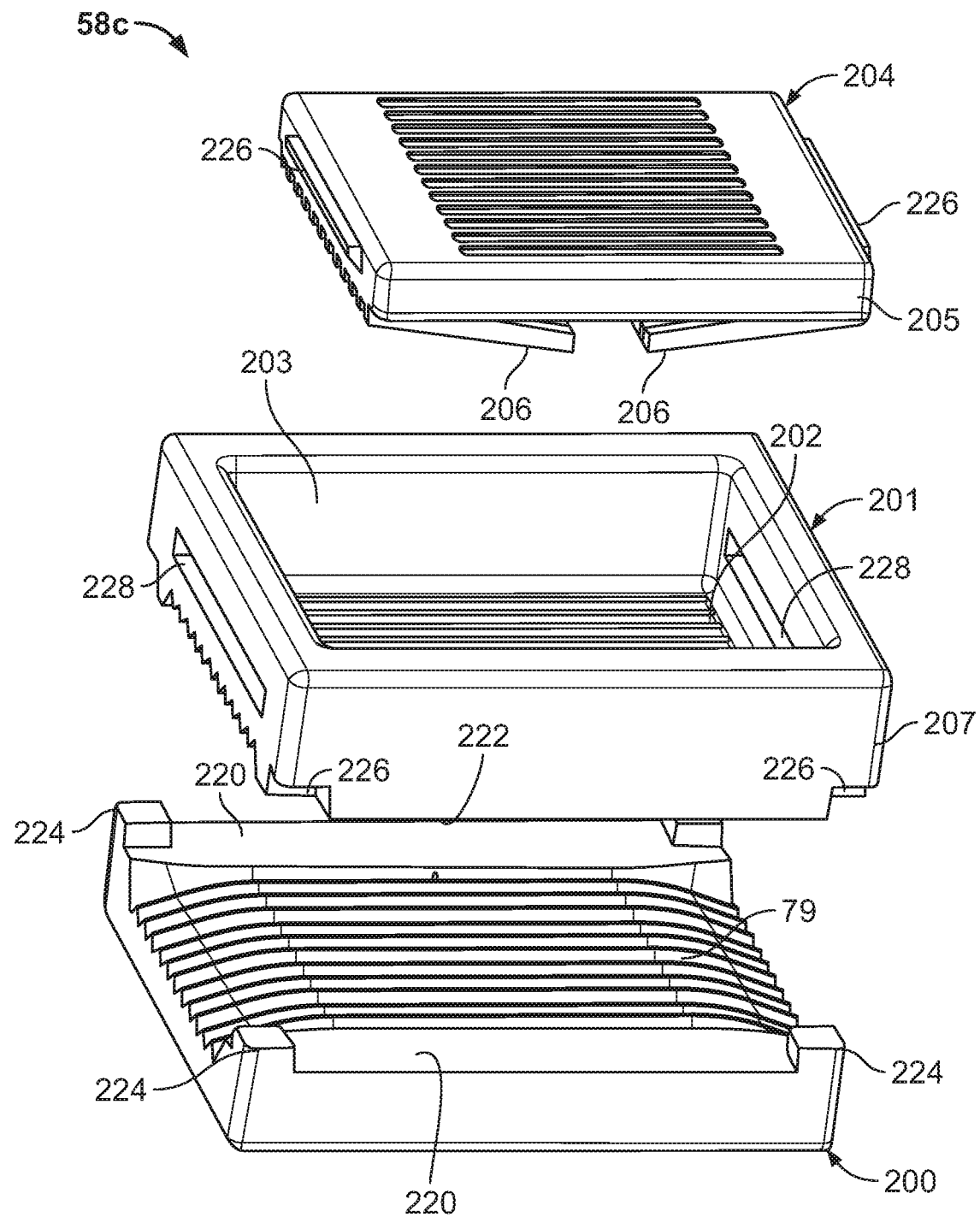
FIG. 21 is an exploded view of the optical fiber alignment device of FIG. 20.

As shown at FIG. 14, the pressing structure 101 can also include a plurality of springs 110 with each spring 110 of the plurality corresponding to one of the pressing members 102. The pressing members 102 can be mechanically coupled their corresponding springs 110 at coupling locations 112 coincident with (e.g., aligned with) the optical coupling reference locations 84. As such, the pressing members 102 can be integrally formed (e.g., unitary) with their corresponding springs 110. The springs 110 can provide spring force that is transferred through the pressing members 102 to the first and second optical fibers 20*a*, 20*b* to spring bias the first and second optical fibers 20*a*, 20*b* into the fiber alignment groove 79. The springs 110 can each be independently moveable relative to one another. In one example, each spring 110 is defined as a beam having fixed opposite ends. The beams forming the springs 110 can be separated by parallel slots. In certain examples, each pressing members 102 can pivot about an axis 103 (see FIG. 21) defined through the corresponding coupling location 112 to facilitate maintaining contact with both of the aligned optical fibers 20*a*, 20*b* intended to be engaged by the pressing member 102. Slots are defined between adjacent ones of the pressing members 102 and adjacent ones of the springs 110 to prevent interference between the adjacent pressing members 102 and the adjacent springs 110. The pressing structure 101 can be constructed of plastic, metal, ceramic or other materials, and can be manufactured by molding, casting, machining, etching or other process.

Figure 12:
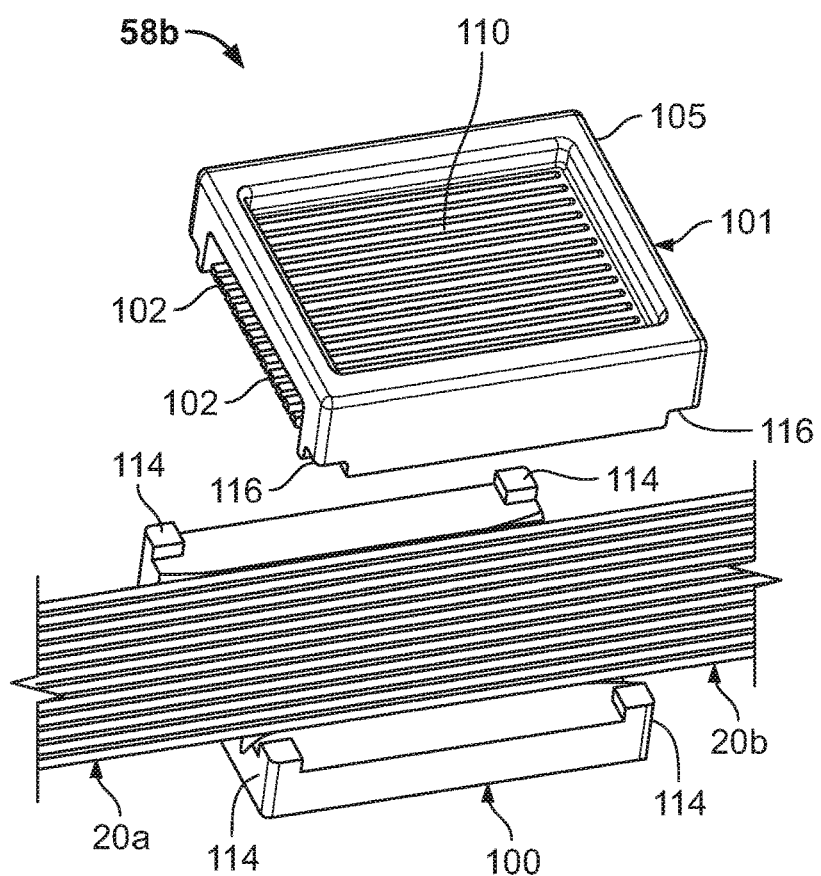
FIG. 12 is an exploded view of the optical fiber alignment device of FIG. 11.
Figure 13:
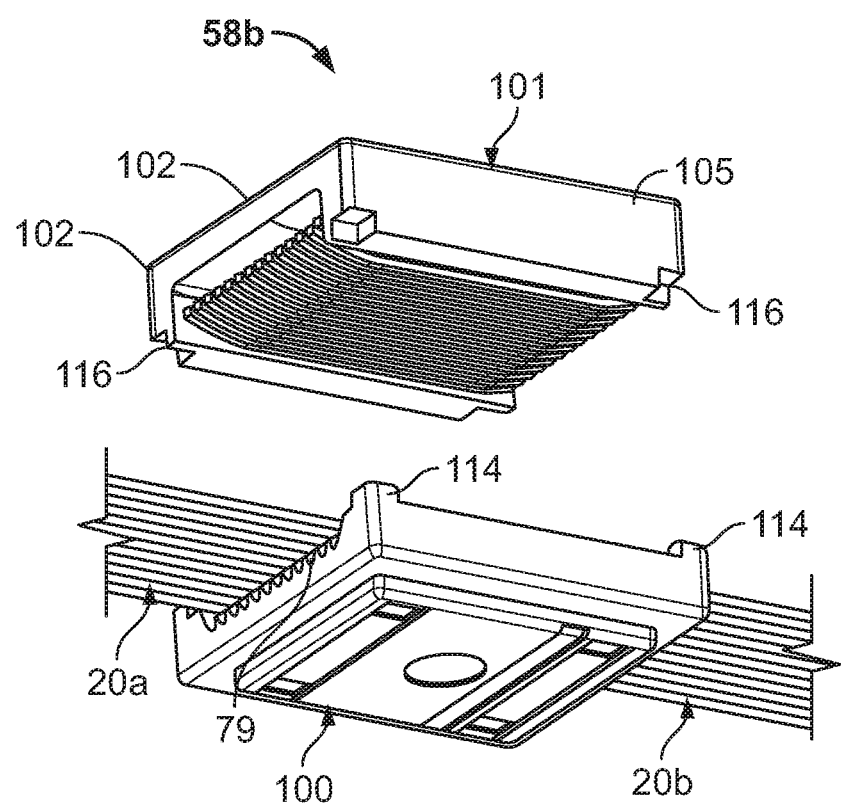
FIG. 13 is another exploded view of the optical fiber alignment device of FIG. 12.

In certain examples, the pressing structure 101 can include a frame 105 to which opposite ends of the springs 110 are fixed. As indicated above, the pressing members 102 are attached to the springs 110 by coupling locations 112 positioned adjacent mid-locations of the springs 110. The pressing structure 101 and the groove-defining structure 100 can be mounted together and preferably include structure for maintaining registry between the pressing structure 101 and the groove-defining structure 100. Example structures for maintaining registry include nesting interfaces, mating interfaces, overlapping interfaces and the like. As depicted at FIGS. 12 and 13, the groove-defining structure 100 includes leg members 114 (e.g., pegs, projections) that engage recesses 116 in the frame 105 of the pressing structure 101 to provide and maintain registry between the parts when the parts are connected together. In one example, groove-defining structure 100 and the pressing structure 101 can be optionally be secured together by a snap-fit connection interface. In other examples, the pieces can be clamped, pressed or otherwise held together.

It will be appreciated that fiber alignment structures such as the fiber alignment structure 58*b* are micro-components. It will be appreciated that a typical optical fiber ribbon has fibers with center-to-center spacings (i.e., pitch) of 250 microns or less. Thus, the pressing members 102 and the springs 110 preferably have a pitch of 250 microns or less and are separated from one another by spacings having widths less than 125 microns. To enhance the robustness and durability of tooling used to mold piece such as the pressing structure 101, there are advantages to designing the pressing structure 101 in a manner where the pressing structure 101 can be molded using tooling with larger features. For example, a modified pressing structure can have a configuration including multiple separately molded parts that are assembled together to complete the pressing structure. In certain examples, the parts can be connected together by a snap-fit connection, by adhesive, by welding, by fasteners, by clamps or the like. In certain examples, a plurality of the pressing members 102 and/or a plurality of the springs 110 can be integrated with each of the parts. For example, the pressing members 102 and/or the springs 110 can be consecutively alternated between first and second parts. By separating the pressing members 102 and/or springs 110 between separate parts, spacings between the pressing members and/or springs of the individual parts can be enlarged as compared to if the pressing structure were to be molded as a single part. In this way, tooling (e.g., molds having a negative shape as compared to the parts of the pressing structure) can be used which has larger features thereby making the tooling more robust and durable.

FIGS. 32-38 depict an example pressing structure 101*a* that includes first and second separately molded parts 301, 302 which are assembled together to make the pressing structure 101*a*. In the depicted example, the parts 301, 302 are optionally identical half-pieces of the pressing structure 101*a*. In one example, each of the parts 301, 302 include half of the pressing members 102 of the pressing structure 101*a*, half of the springs 110 of the pressing structure 101*a* and half of a perimeter frame 303 of the pressing structure 101*a*. The half-portions of the perimeter frame 303 can include features for coupling the parts 301, 302 by a snap-fit connection (e.g., latches 305 and latch catches 307). The springs 110 can include first ends unitarily formed with their corresponding frame half-portions and second ends including support tabs 309 that seat on support surfaces 311 of the opposite frame half-portion when the parts 301, 302 are interconnected. Alternating ones of the pressing members 102 and the springs 110 are integrated with the parts 301, 302 such that when the parts 301, 302 are interconnected, the pressing members 102 and springs 110 of the first part 301 interdigitate with the pressing members 102 and springs 110 of the second part 302. By providing alternating pressing members 102 and spring 110 on the separate parts 301, 301, spacings s1 (see FIGS. 35-38) between the pressing members 102 and springs 110 of each part 301, 301 are considerably larger than spacings s2 formed between the pressing members 102 and springs 110 when the parts 301, 302 are interconnected.

Figure 18:
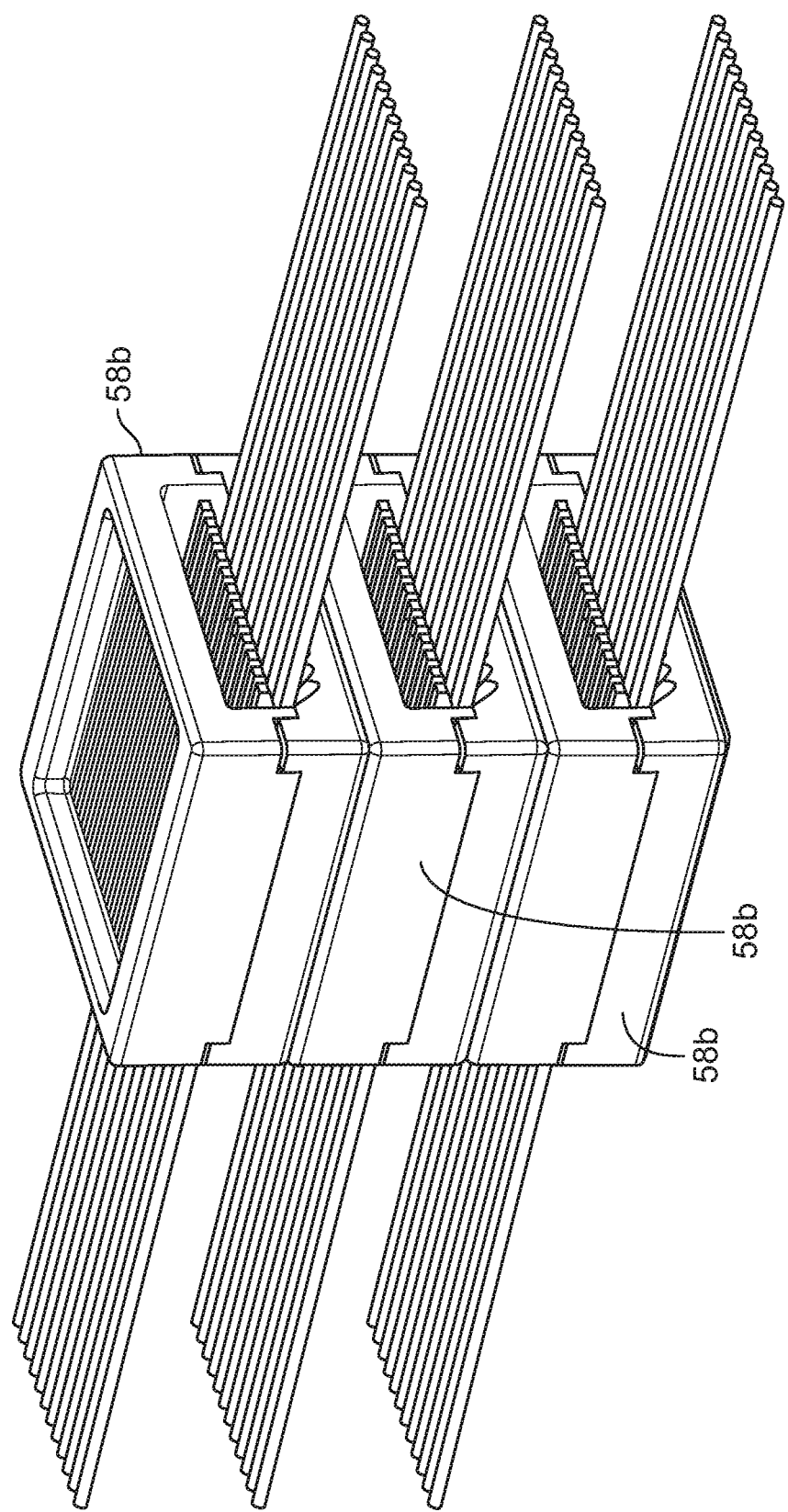
FIG. 18 is a perspective view showing a high-fiber count optical fiber alignment device formed by stacking together a plurality of optical fiber alignment devices of the type depicted at FIG. 11.
Figure 19:
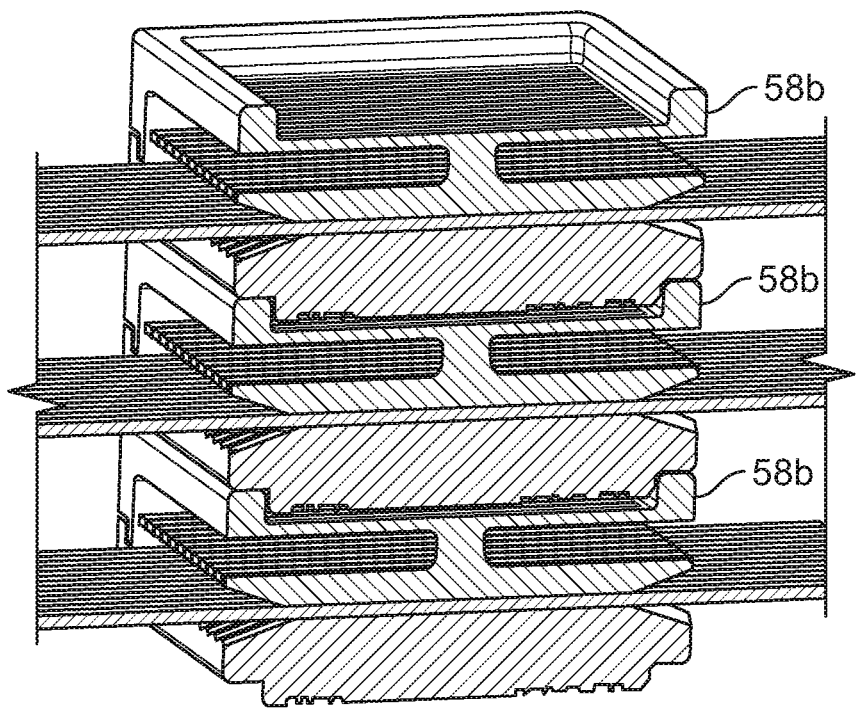
FIG. 19 is a cross-sectional view of the high-fiber count optical fiber alignment device of FIG. 18.
Figure 20:
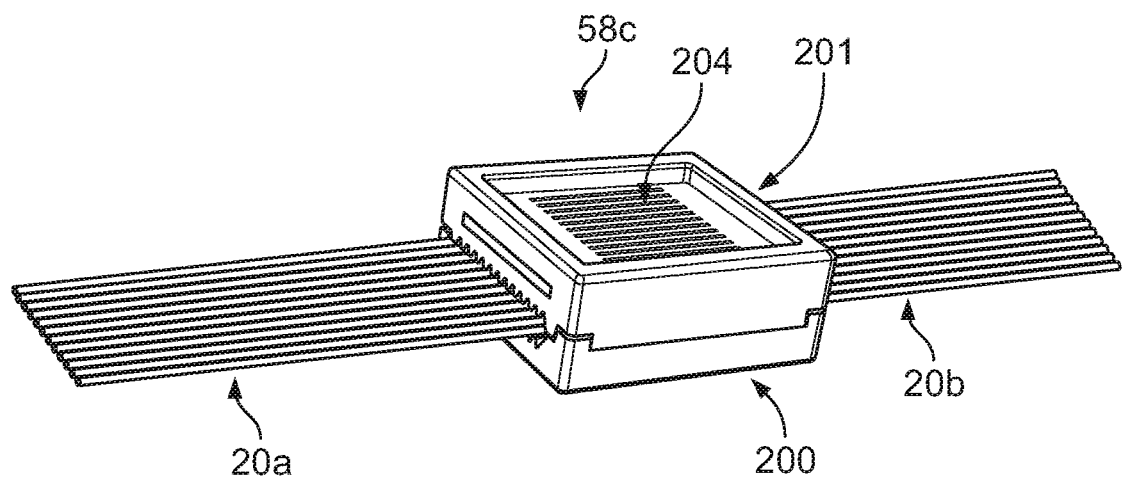
FIG. 20 is a perspective view depicting a further optical fiber alignment device in accordance with the present disclosure, two sets of optical fibers are shown inserted into the optical fiber alignment device.

Referring to FIGS. 18 and 19, the fiber alignment structure 58*b* can be arranged and configured such that two or more of the fiber alignment structures 58*b* can be stacked together to provide multiple parallel rows of fiber alignment and coupling locations. In this way, high density fiber coupling structures can be made. In certain examples, the fiber alignment structures 58*b* can be secured together by a snap-fit connection interface, a clamping or pressing arrangement, or other arrangements.

Figure 25:
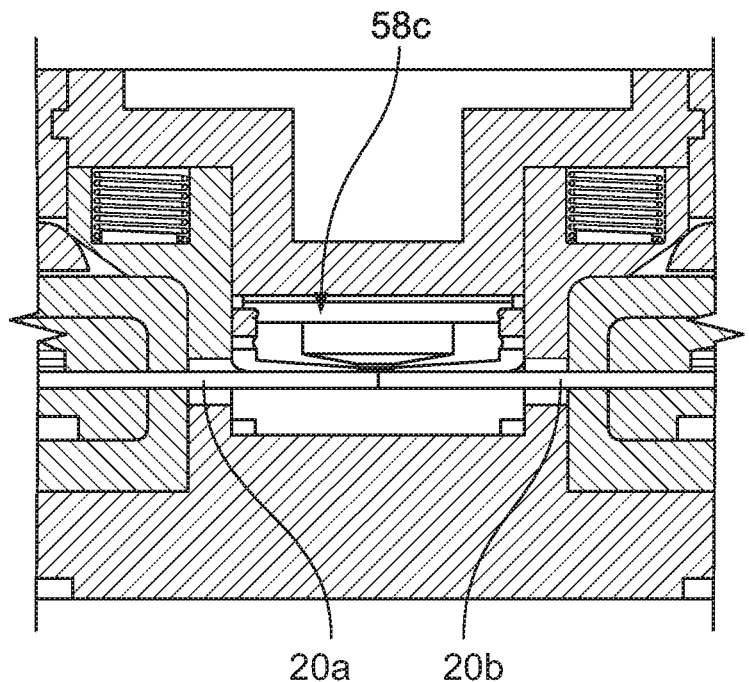
FIG. 25 is an enlarged view of a central portion of the cross-sectional view of FIG. 24.

FIGS. 20-27 depict another example fiber alignment structure 58*c* in accordance with the principles of the present disclosure. Similar to the previous embodiments, the fiber alignment structure can be mounted in a fiber optic adapter. For example, FIGS. 24 and 25 shows the fiber alignment structure 58*c* integrated between the connector ports 48 of fiber optic adapter 44. In this configuration, the fiber alignment structure 58*c* is adapted to optically connect two sets of optical fibers 20*a*, 20*b*. The optical fibers 20*a*, 20*b* can be integrated with ferrule-less (i.e., bare fiber) multi-fiber optical connectors 10*a*, 10*b* that can be inserted into the connector ports 48 to optically connect the optical fibers 20*a*, 20*b* together.

The fiber alignment structure 58*c* includes a groove-defining component 200 defining a plurality of fiber alignment grooves 79, a fiber engagement component 201 including a plurality of independently moveable fiber engagement elements 202 each configured for pressing a pair of optical fibers desired to be optically coupled together into a corresponding one of the fiber alignment grooves 79, and a fiber biasing component 204 including a plurality of spring biasing elements 206 for applying spring load to the fiber engagement elements 202 which is transferred through the fiber engagement elements to the optical fibers.

In one example, the fiber engagement elements 202 are formed by beams separated by slots. In a preferred example, the beams have opposite ends that are fixed relative to a frame 207 of the fiber engagement component 201. In a preferred example, each beam opposes an open side and extends along a length of a corresponding one of the fiber alignment grooves 79. In a preferred example, the beams extend across optical interface locations where the ends of fibers intended to be coupled together oppose one another. In a preferred example, the beams flex or otherwise move to accommodate insertion of optical fibers into the fiber alignment grooves 79.

In one example, the spring biasing elements 206 of the fiber biasing component 204 include at least one separate and independently moveably spring for each of the fiber engagement elements 202. In one example, the spring biasing elements 206 of the fiber biasing component 204 include at least two separate and independently moveably spring for each of the fiber engagement elements 202. In one example, the spring biasing elements 206 of the fiber biasing component 204 include at least two separate and independently moveably springs for each of the fiber engagement elements 202, wherein a first of the springs is positioned on a first side of the optical connection interface location and a second of the springs is positioned on an opposite second side of the optical connection interface location. In one example, each of the springs has a cantilevered beam configuration including a base end integrated with a frame 205 of the fiber biasing component 204 and a free end that engages and applies spring bias against a corresponding one of the fiber engagement elements 202 at least when an optical fiber is inserted into an alignment groove corresponding to the fiber engagement element 202.

In one example, the fiber biasing component 204 can snap-fit within the fiber engagement component 201. For example, the fiber engagement component 201 can include a receptacle 203 for receiving the fiber biasing component 204, and the fiber biasing component 204 can include tabs 226 that snap within openings 228 of the fiber engagement component 201 when the fiber biasing component 204 is loaded into the receptacle 203.

In one example, the grove-defining component 200 and/or the fiber engaging component 201 and/or the fiber biasing component 204 has a ceramic construction, although alternatives are possible. In certain examples, the grove-defining component 200 and/or the fiber engaging component 201 and/or the fiber biasing component 204 has a metallic construction, although alternatives are possible. In certain examples, the grove-defining component 200 and/or the fiber engaging component 201 and/or the fiber biasing component 204 has a plastic construction, although alternatives are possible. In certain examples, the grove-defining component 200 and/or the fiber engaging component 201 and/or the fiber biasing component 204 has a glass construction, although alternatives are possible.

In one example, the fiber engagement component 201 and the groove-defining component 200 include reference surfaces that positively engage one another when the components 201, 200 are assembled together to provide a precise spacing between fiber contact surfaces of the fiber engagement elements 202 and the grooves 79 of the groove-defining component 200. In one example, such reference surfaces include first reference surfaces 220 provided on opposite sides of the grooves 79 of the groove-defining component 200 and second reference surfaces 222 provided on opposite sides of the plurality of fiber engagement elements 202 of the fiber engagement component 201. In use, the groove-defining component 200 and the fiber engagement component 201 are secured together by a securement arrangement (e.g., wedge, clamp, etc.) that maintains forcible contact between the first and second reference surfaces 220, 222.

In certain example, the components 201, 202 can include mating features that maintain registry between the components 201, 200 when the components 201, 200 are coupled together. As depicted, the mating features can include registration posts 224 of the groove-defining component 200 that mate with post receptacles 226 of the fiber engaging component 201.

Figure 26:
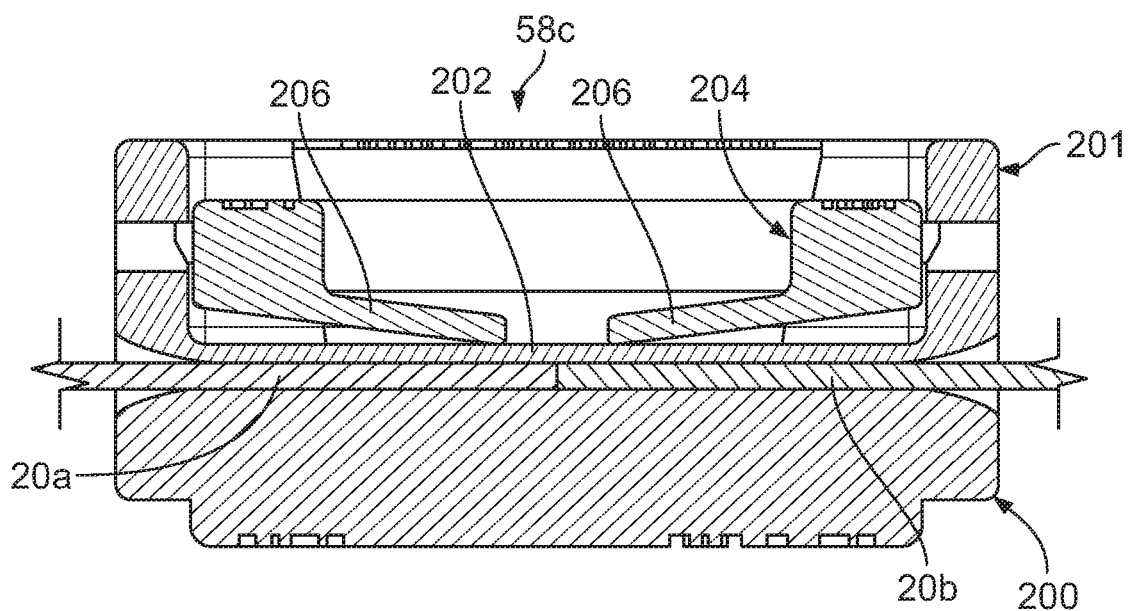
FIG. 26 is a longitudinal cross-sectional view taken through the optical fiber alignment device of FIG. 20.

Referring to FIGS. 25 and 26, the depicted fiber engagement element 202 and its corresponding spring biasing elements 206 are shown in unflexed states in which interference is present between the fiber engagement element 202, its corresponding spring biasing elements 206 and optical fibers inserted within the corresponding alignment groove 79. It will be appreciated that is actual practice, the fiber engagement element 202 and the spring biasing elements 206 will flex upwardly upon insertion of the optical fibers into the fiber alignment groove such that the fibers are accommodated and there is no interference/overlap between the parts.

Figure 27:
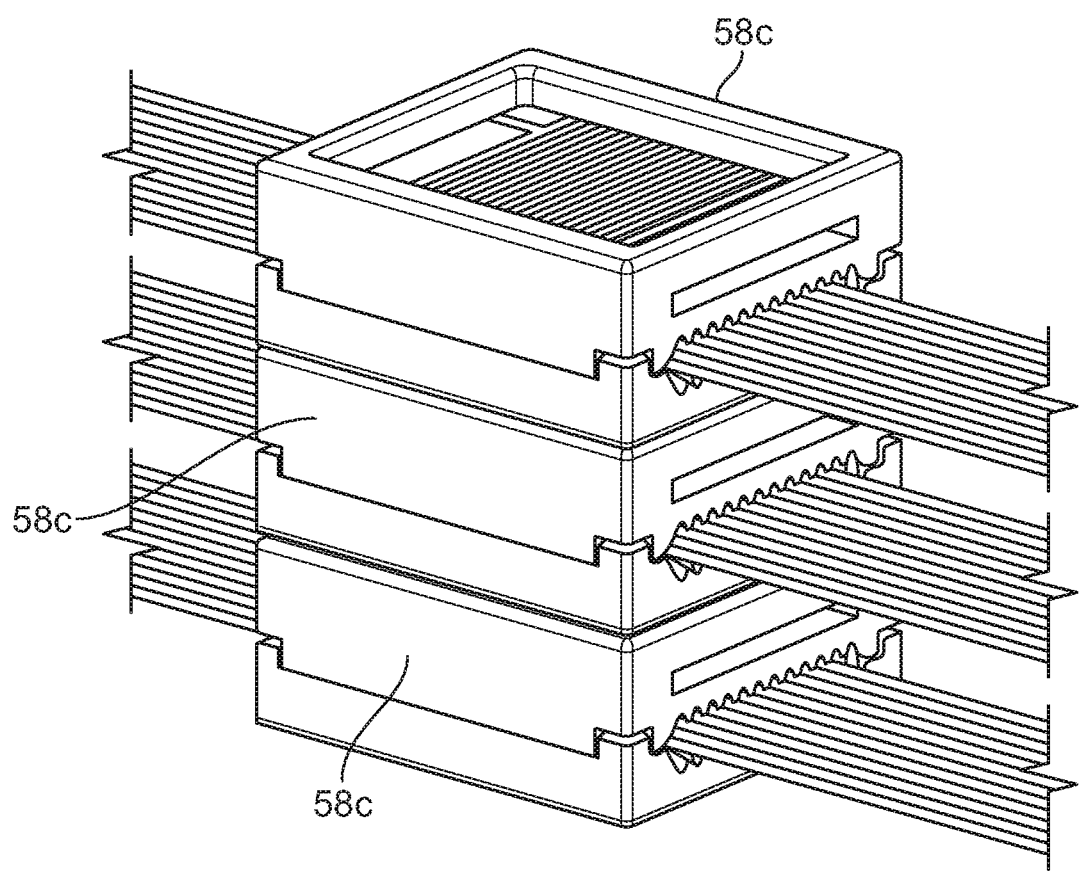
FIG. 27 is a perspective view depicting a high-fiber count optical fiber alignment device formed by stacking together a plurality of optical fiber alignment devices of the type depicted at FIG. 20.
Figure 28:
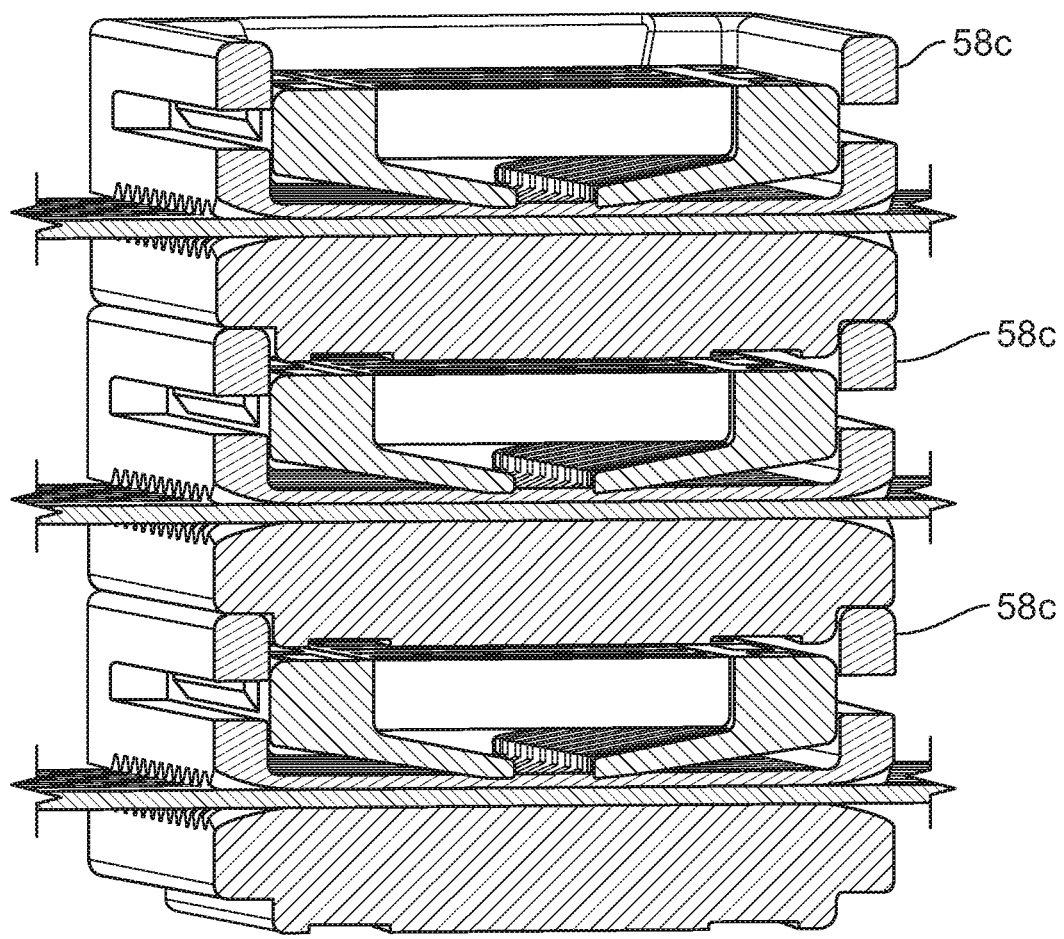
FIG. 28 is a cross-sectional view taken through the high-fiber count optical fiber alignment device of FIG. 27.

Referring to FIGS. 27 and 28, the fiber alignment structure 58c can be configured such that a plurality of the fiber alignment structures 58c can be stacked together to provide a higher fiber count alignment structure having multiple rows of parallel alignment fiber grooves to be stacked together. In certain examples, the fiber alignment structures 58c can be secured together by a snap-fit connection interface.

Figure 29:
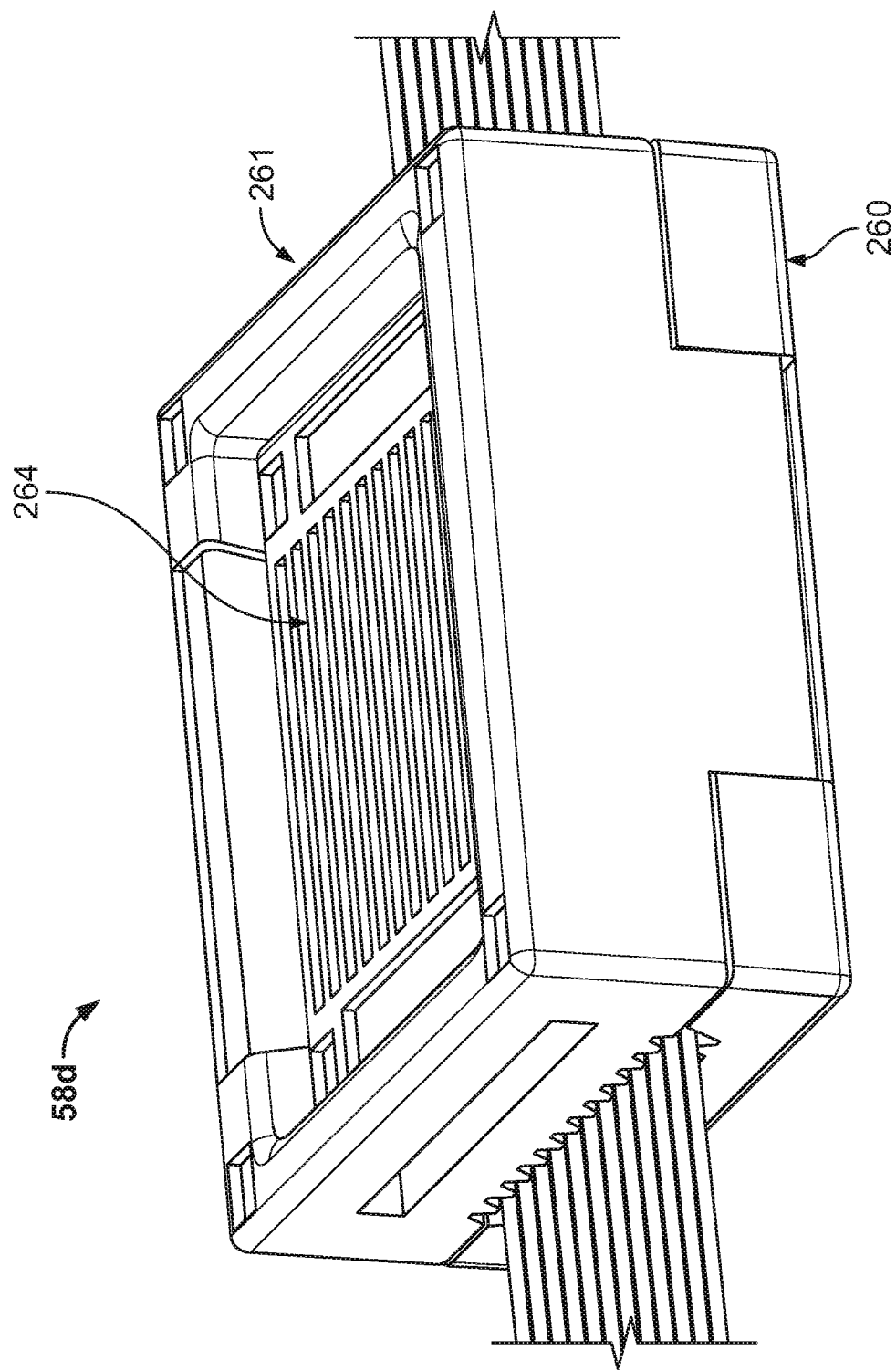
FIG. 29 is a perspective view depicting a further optical fiber alignment device in accordance with the present disclosure, two sets of optical fibers are shown inserted into the optical fiber alignment device.
Figure 30:
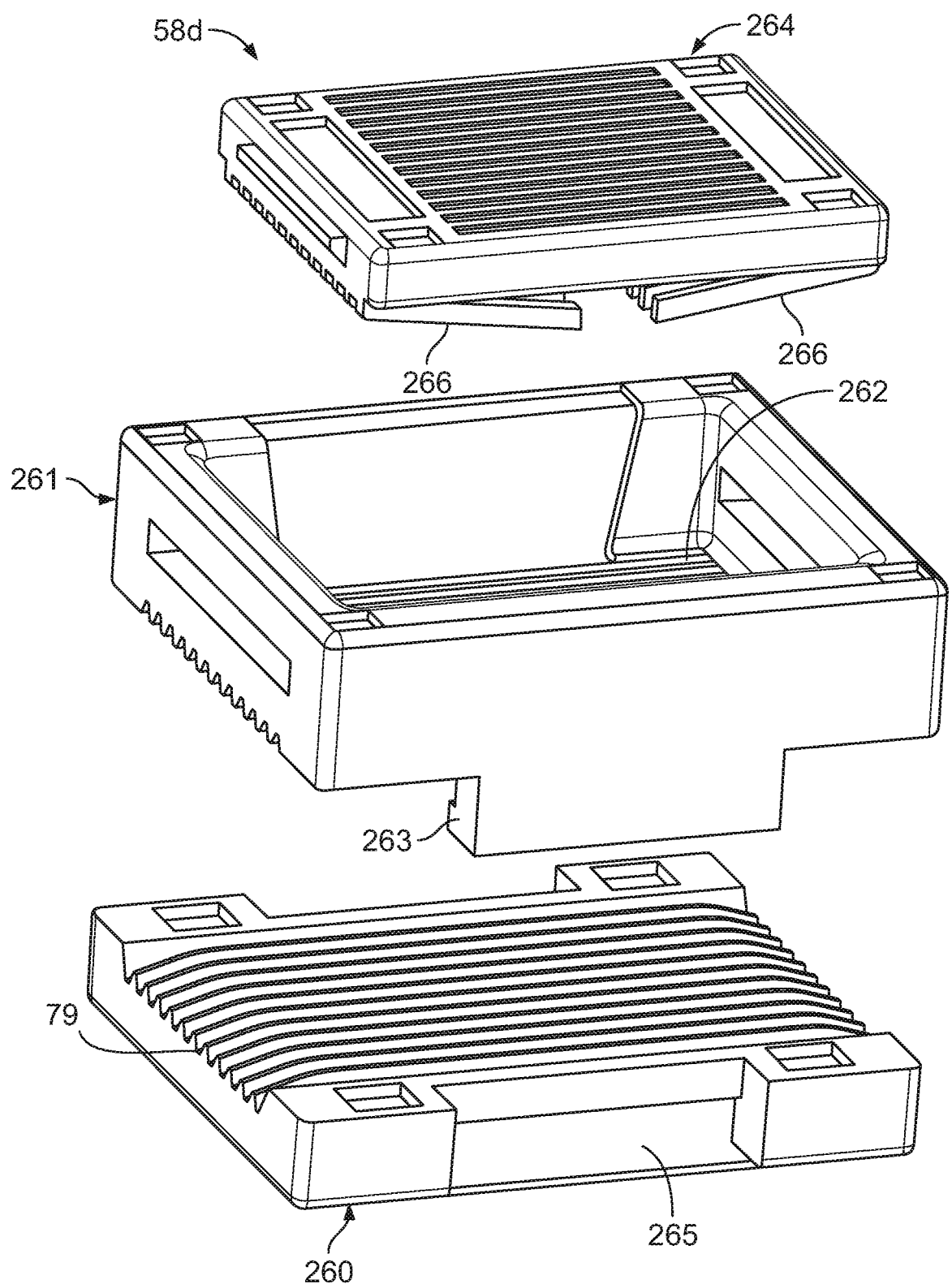
FIG. 30 is an exploded view of the optical fiber alignment device of FIG. 29.
Figure 31:
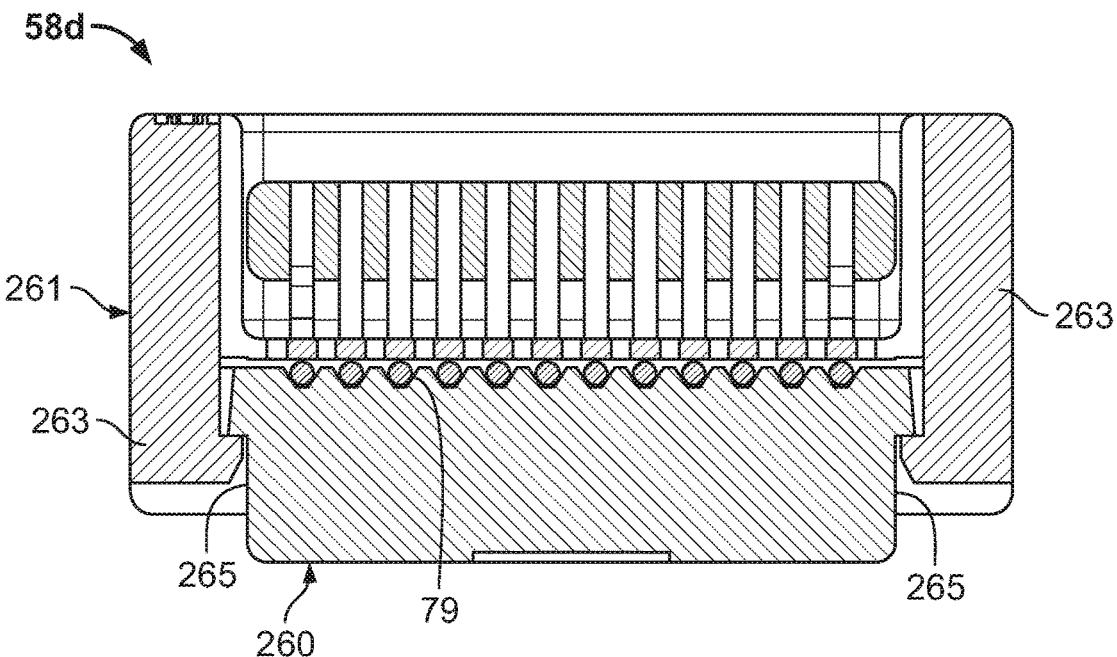
FIG. 31 is a transverse cross-sectional view taken through the optical fiber alignment device of FIG. 29.
Figure 32:
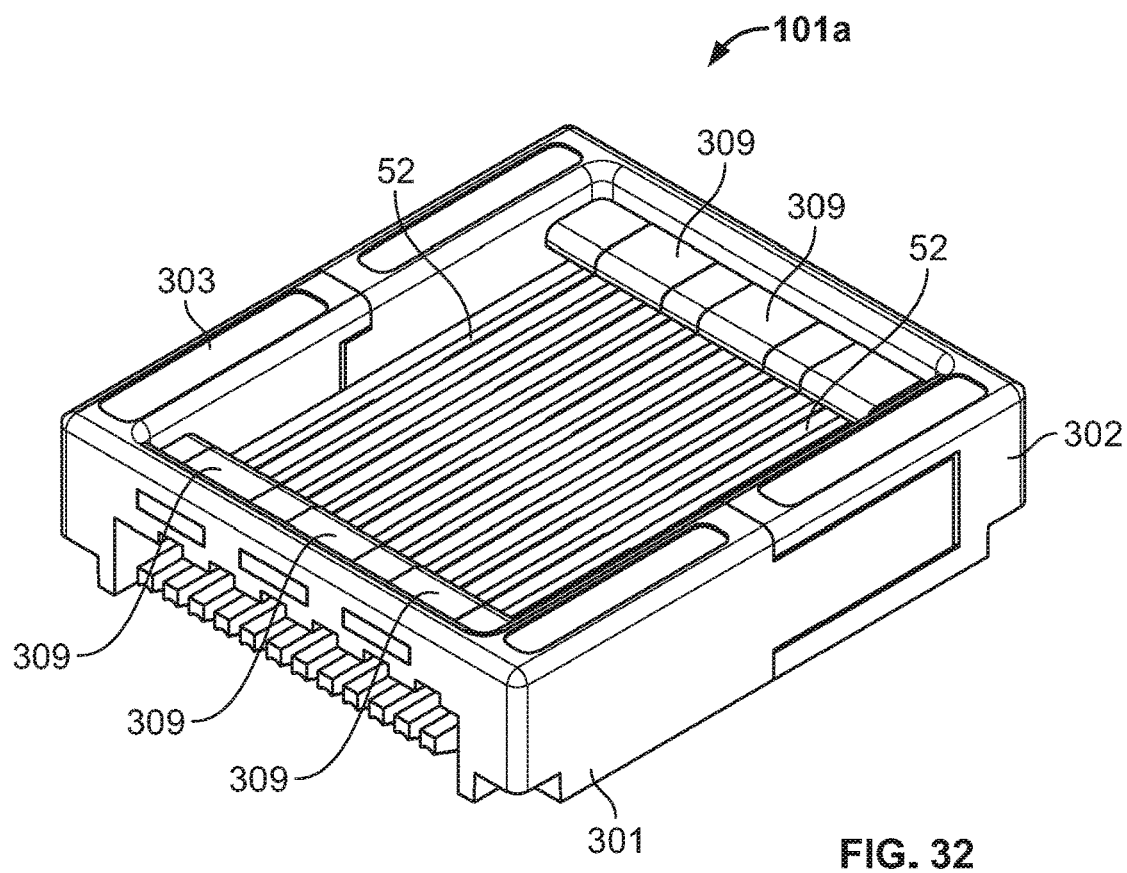
FIG. 32 depicts a multi-piece pressing structure in accordance with the principles of the present disclosure.
Figure 33:
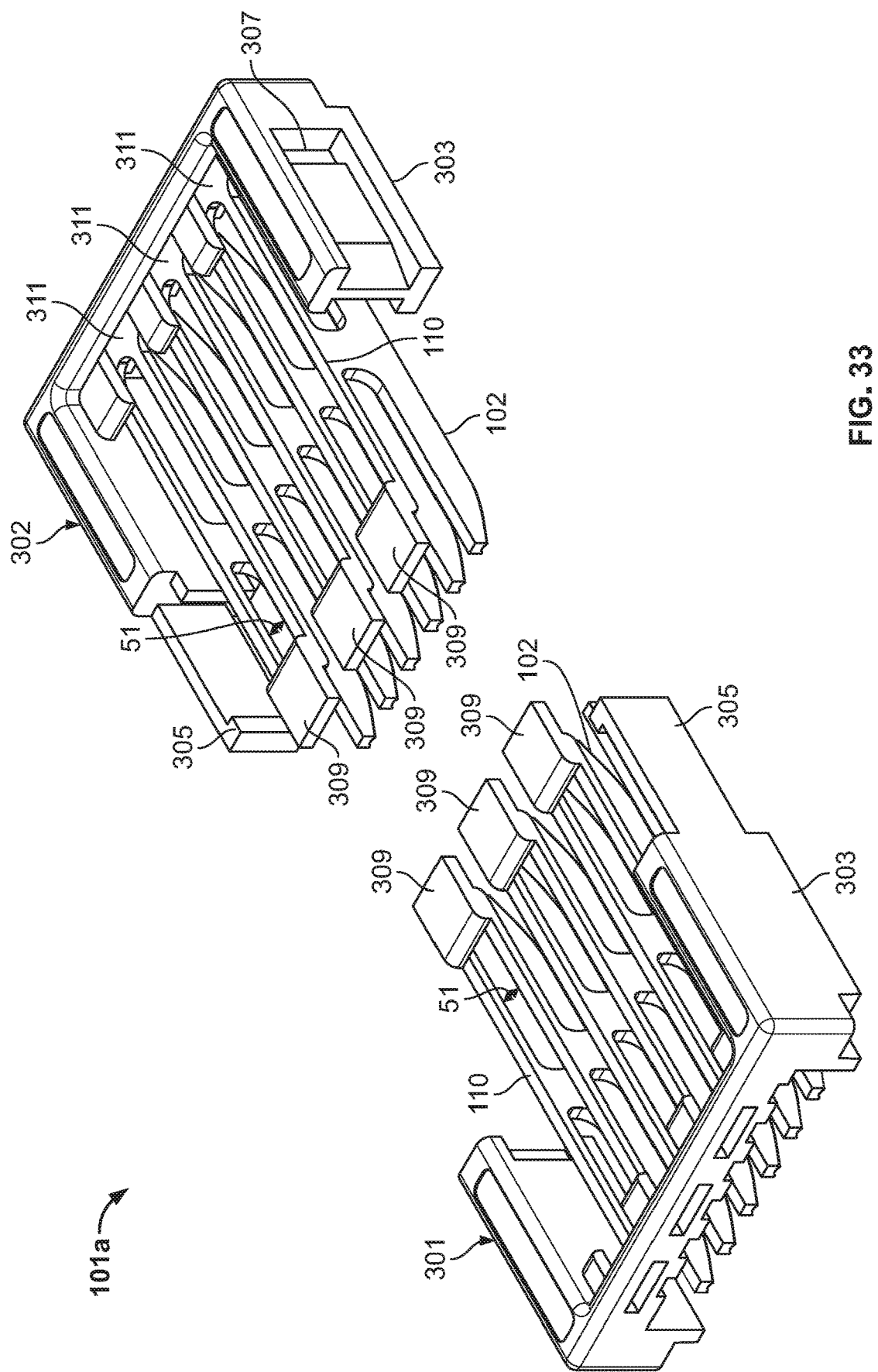
FIG. 33 is an exploded view of the pressing structure of FIG. 32.
Figure 34:
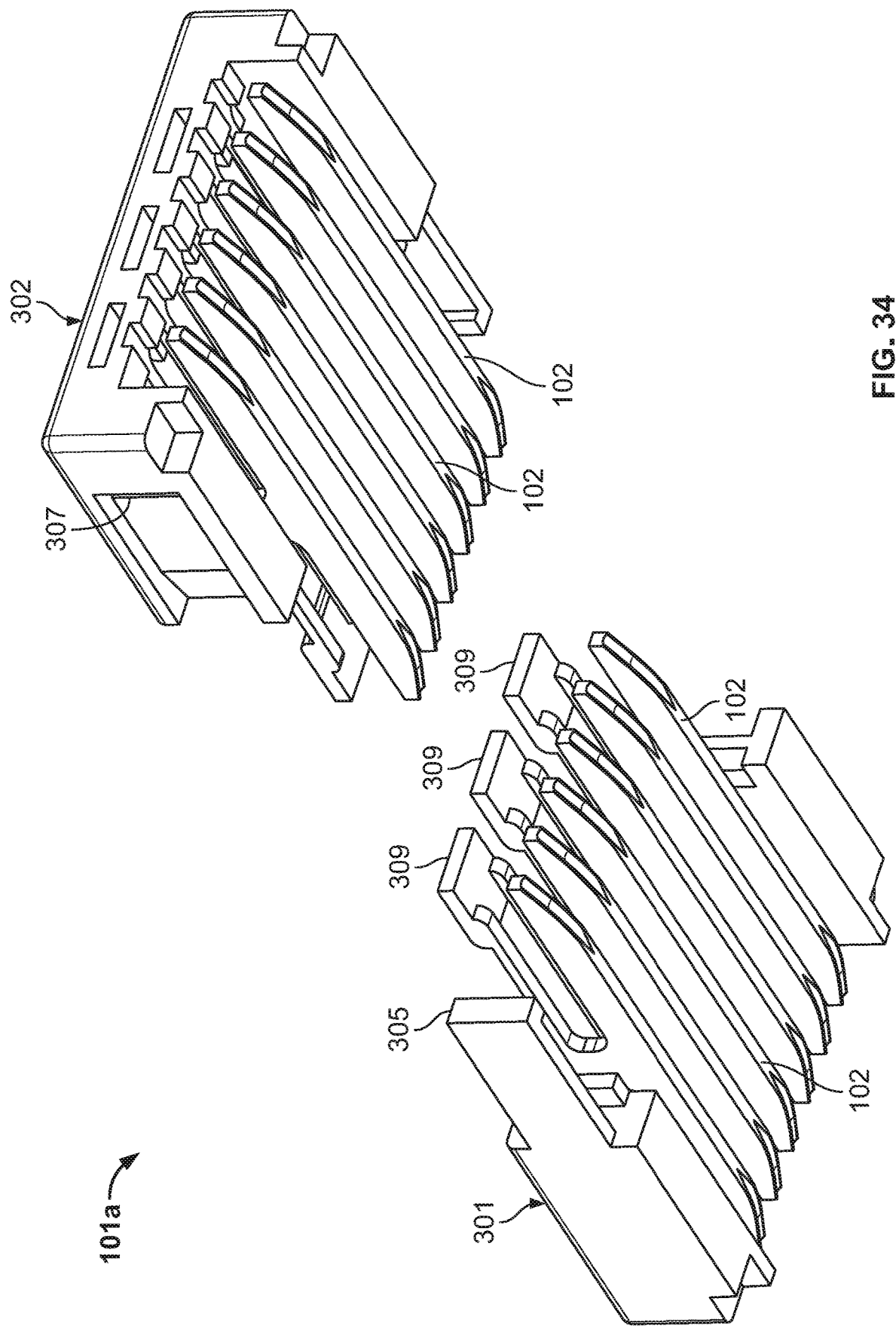
FIG. 34 is another exploded view of the pressing structure of FIG. 32.
Figure 37:
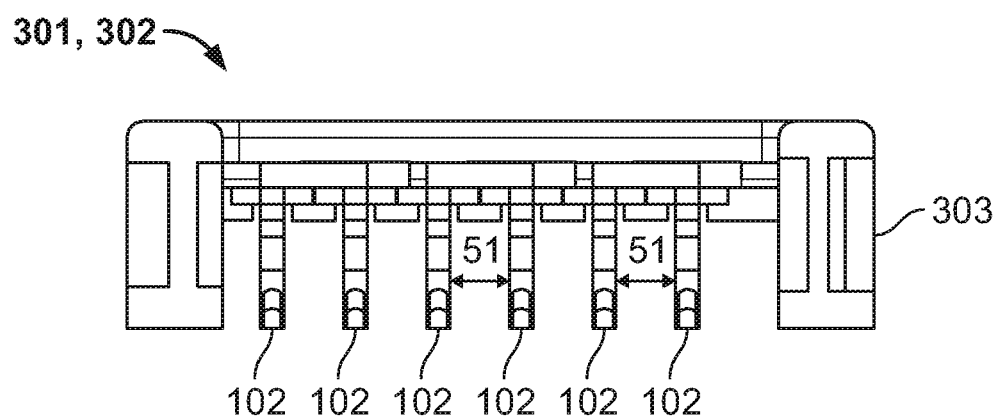
FIG. 37 is an end view of a first end of one of the half-pieces of the pressing structure of FIG. 32.
Figure 38:
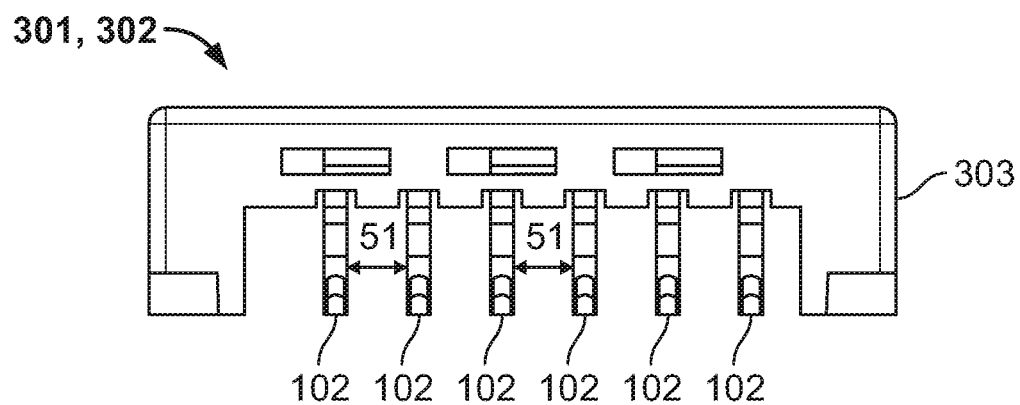
FIG. 38 in an end view of an opposite second end of one of the half-pieces of the pressing structure of FIG. 32.
Figure 39:
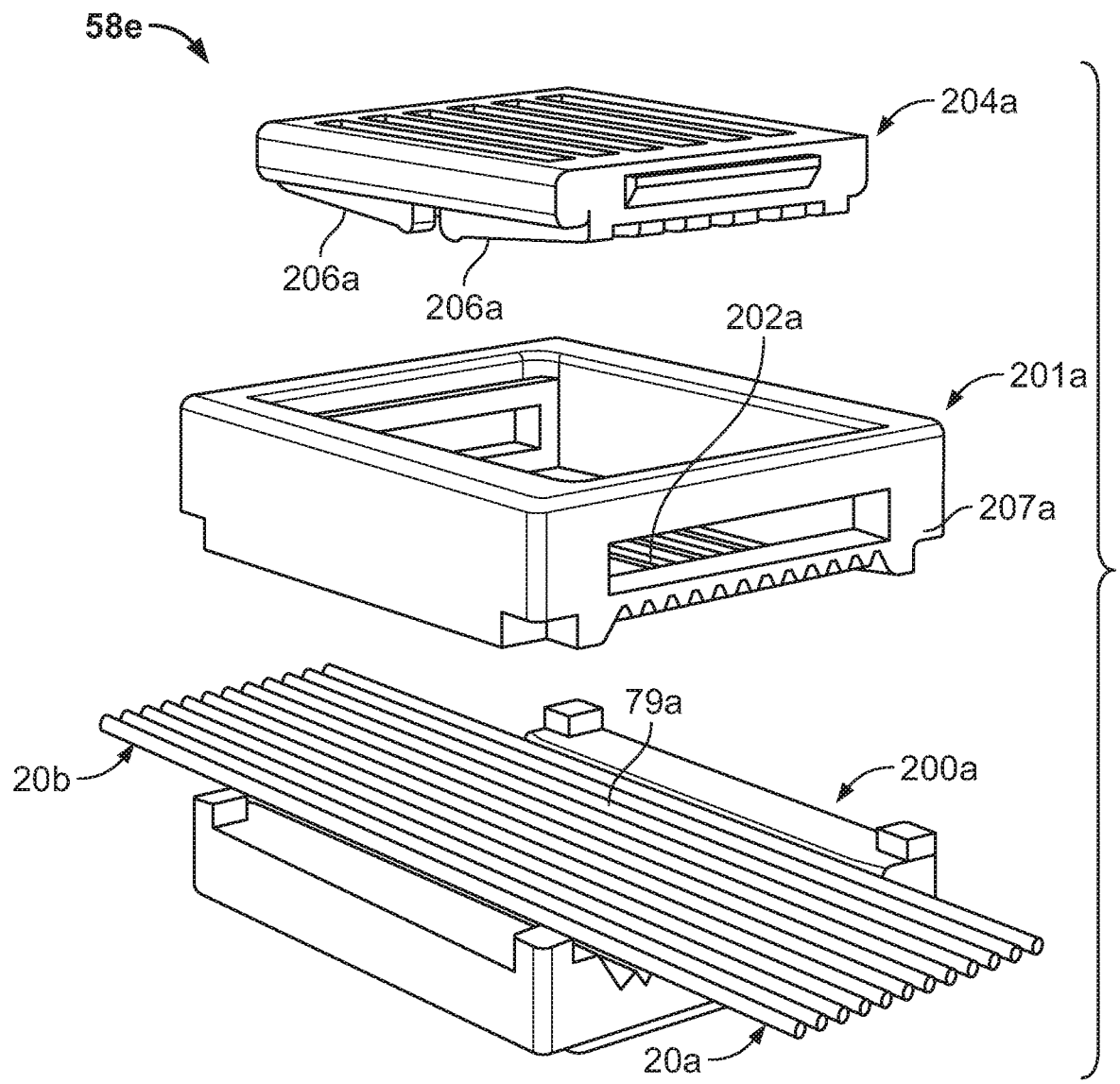
FIG. 39 is an exploded view depicting a further optical fiber alignment device in accordance with the present disclosure, two groups of optical fibers are shown inserted into the optical fiber alignment device.
Figure 40:
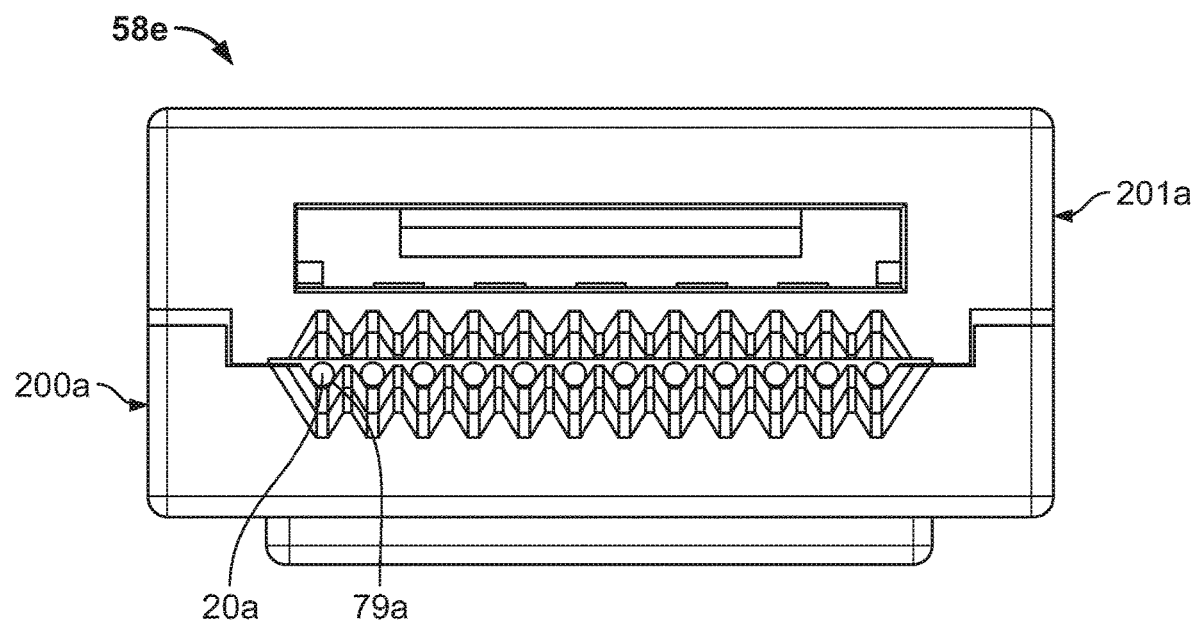
FIG. 40 is an end view of the optical fiber alignment device of FIG. 39.
Figure 41:
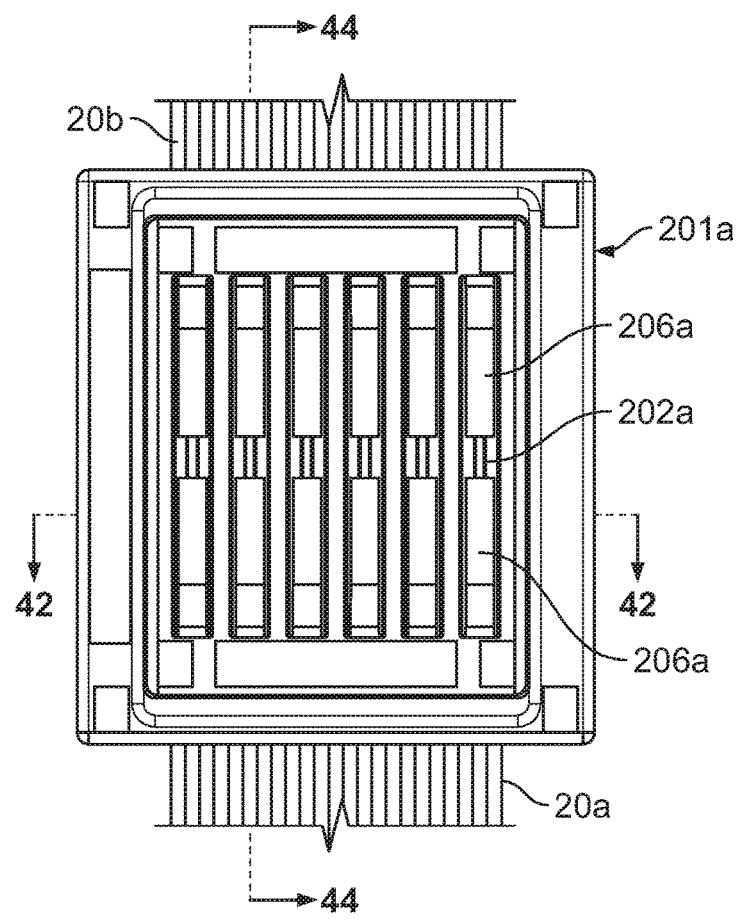
FIG. 41 is a top view of the optical fiber alignment device of FIG. 40.
Figure 43:
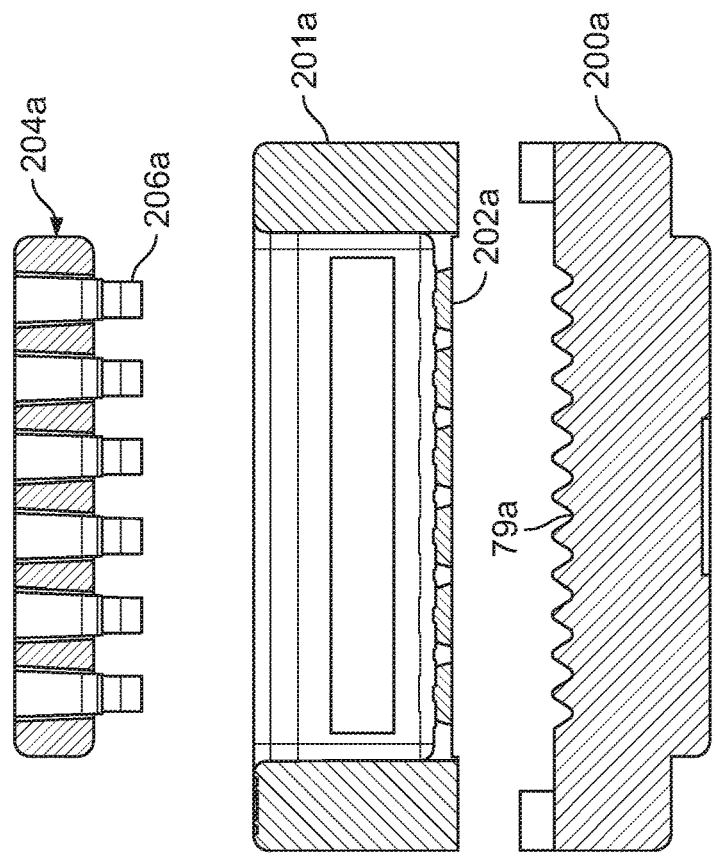
FIG. 43 is an exploded view of the cross-section of FIG. 42.
Figure 42:
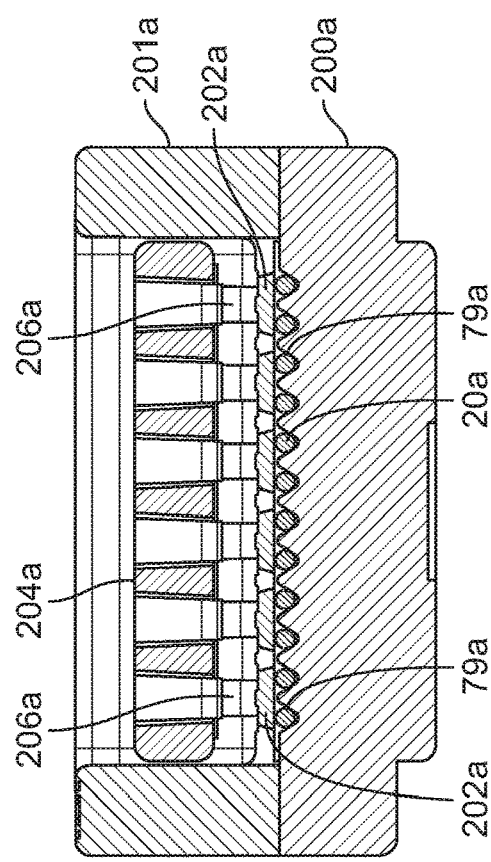
FIG. 42 is a cross-sectional view taken along section line 42-42 of FIG. 41.
Figure 44:
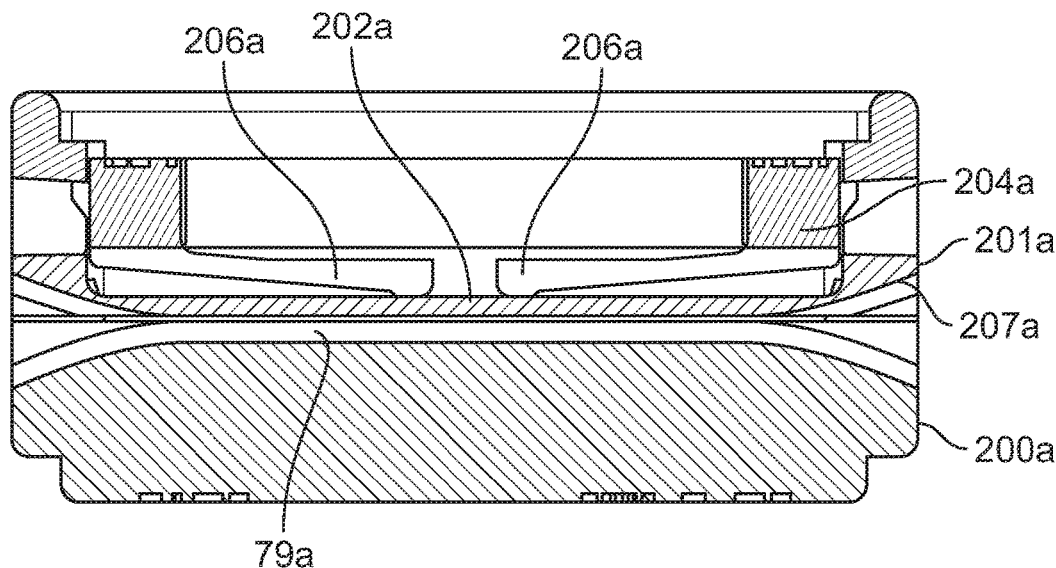
FIG. 44 is a cross-sectional view taken along section line 44-44 of FIG. 41.
Figure 45:
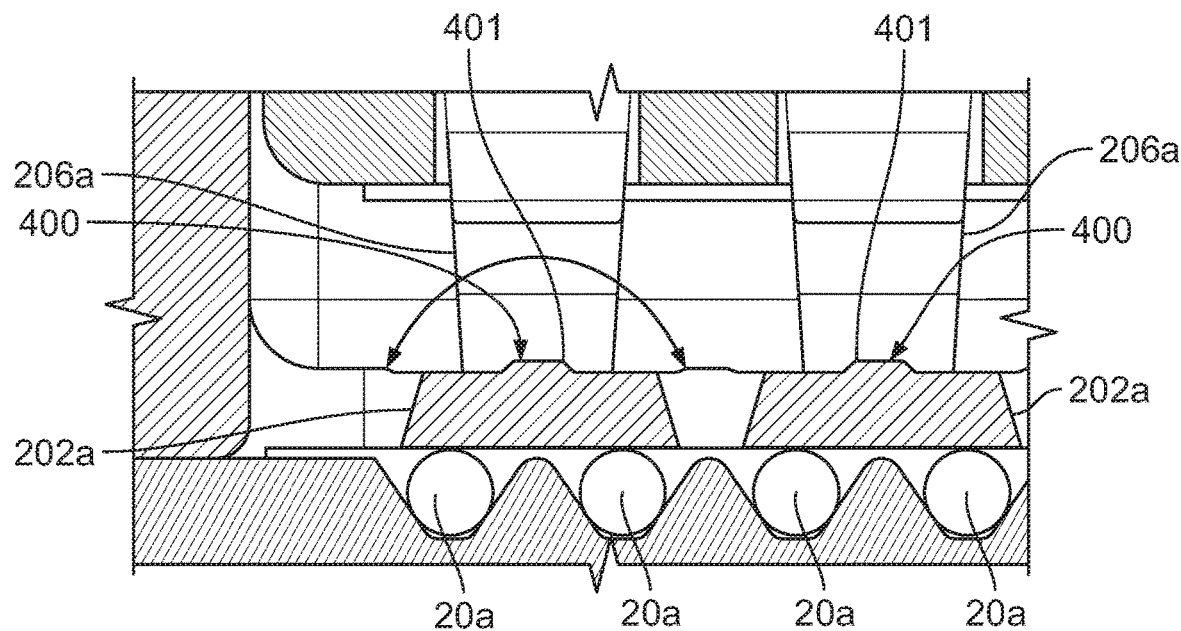
FIG. 45 is an enlarged view of a portion of FIG. 42.
Figure 46:
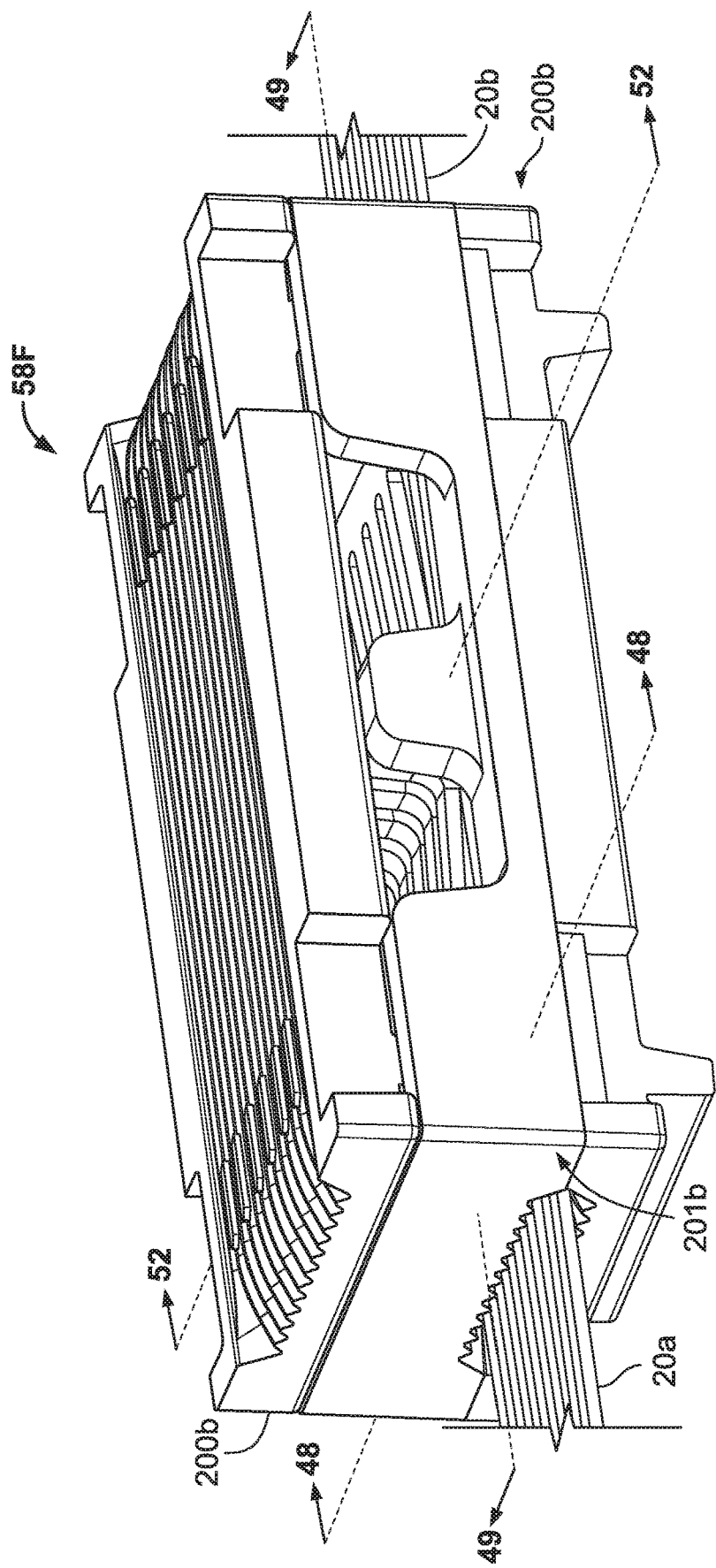
FIG. 46 is a perspective view depicting another optical fiber alignment device in accordance with the principles of the disclosure, two groups of optical fibers are shown inserted into the optical fiber alignment device.
Figure 47:
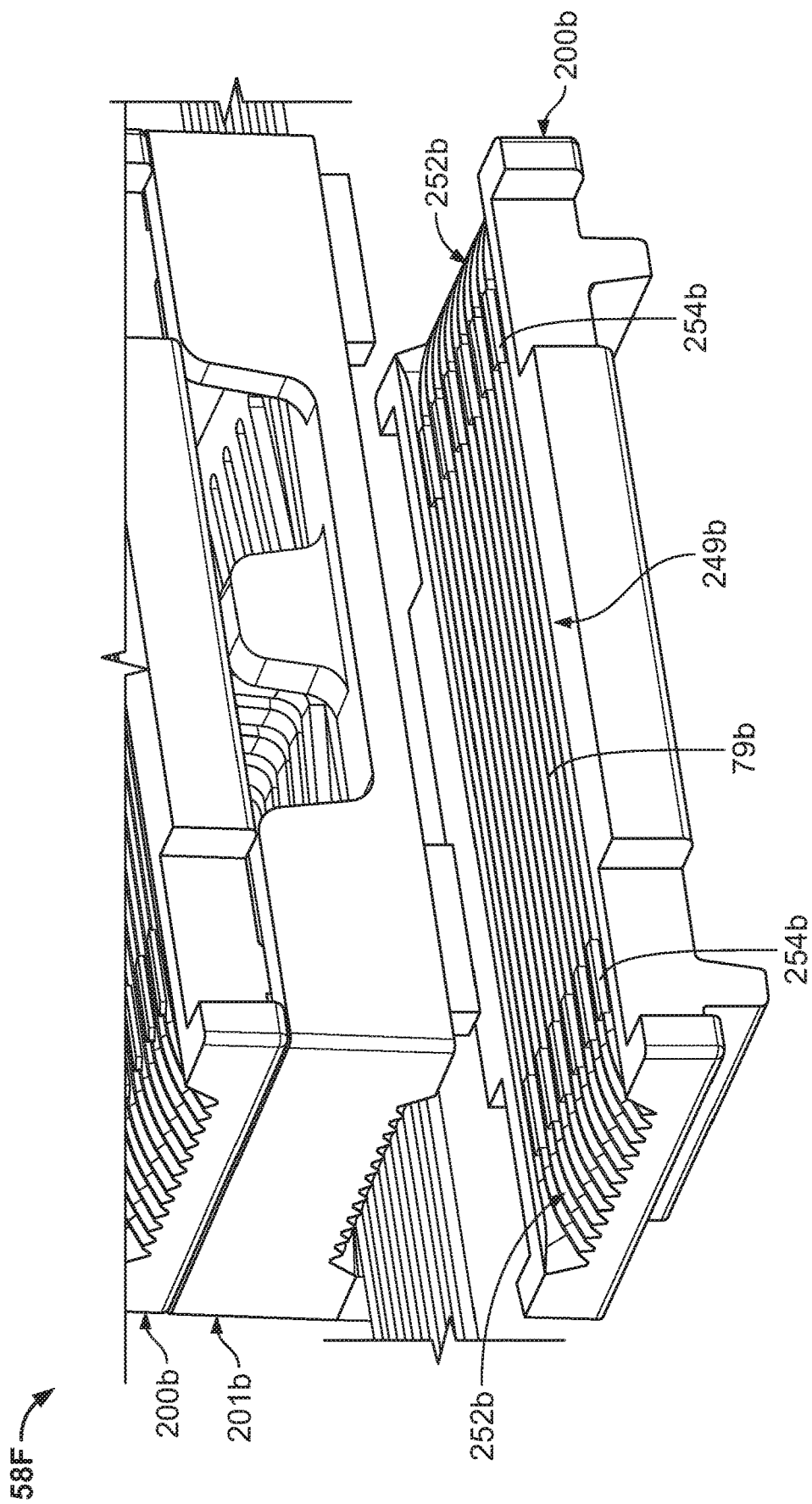
FIG. 47 is a partially exploded view of the optical fiber alignment device of FIG. 46.
Figure 48:
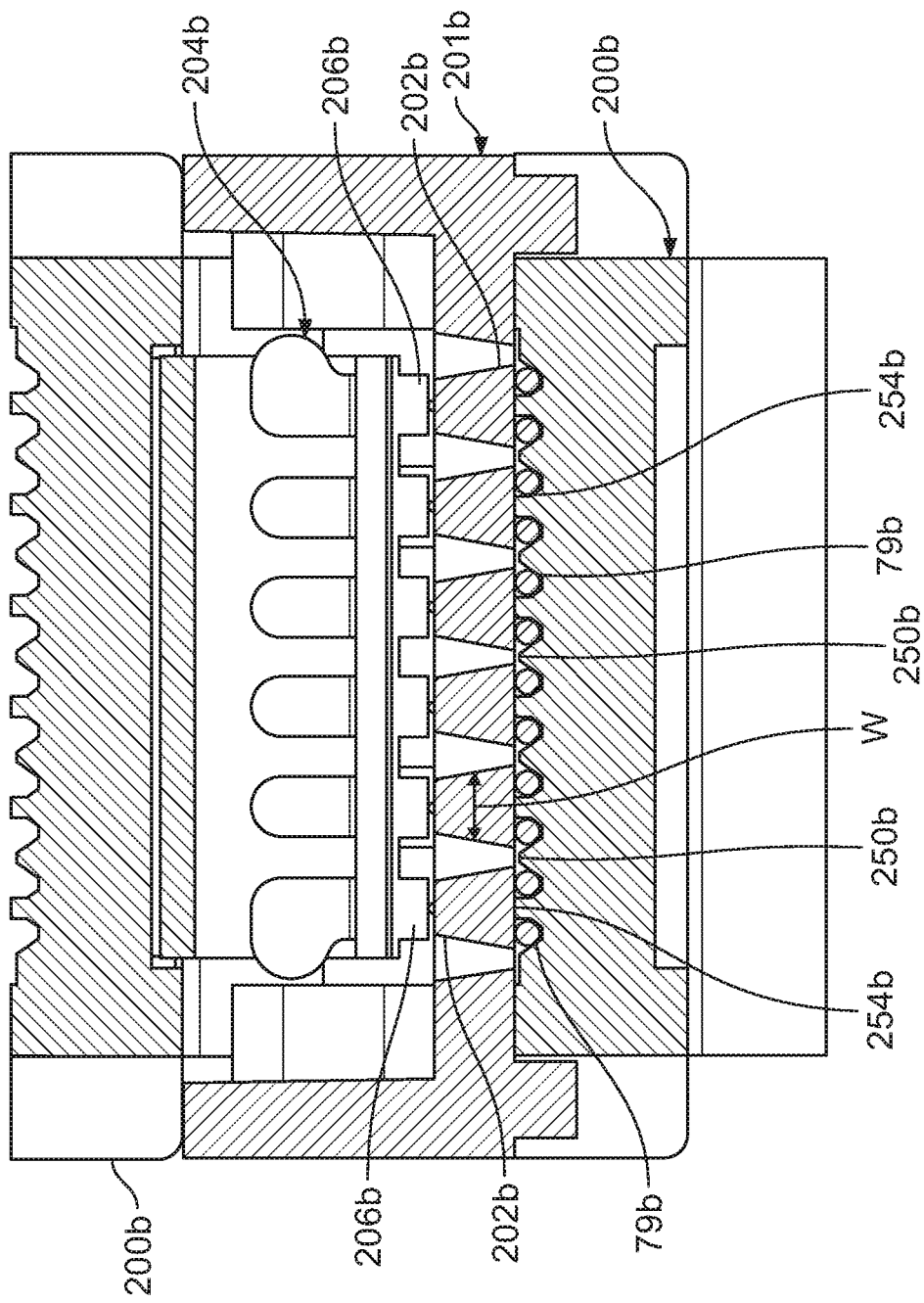
FIG. 48 is a cross-sectional view taken along section line 48-48 of FIG. 46.
Figure 49:
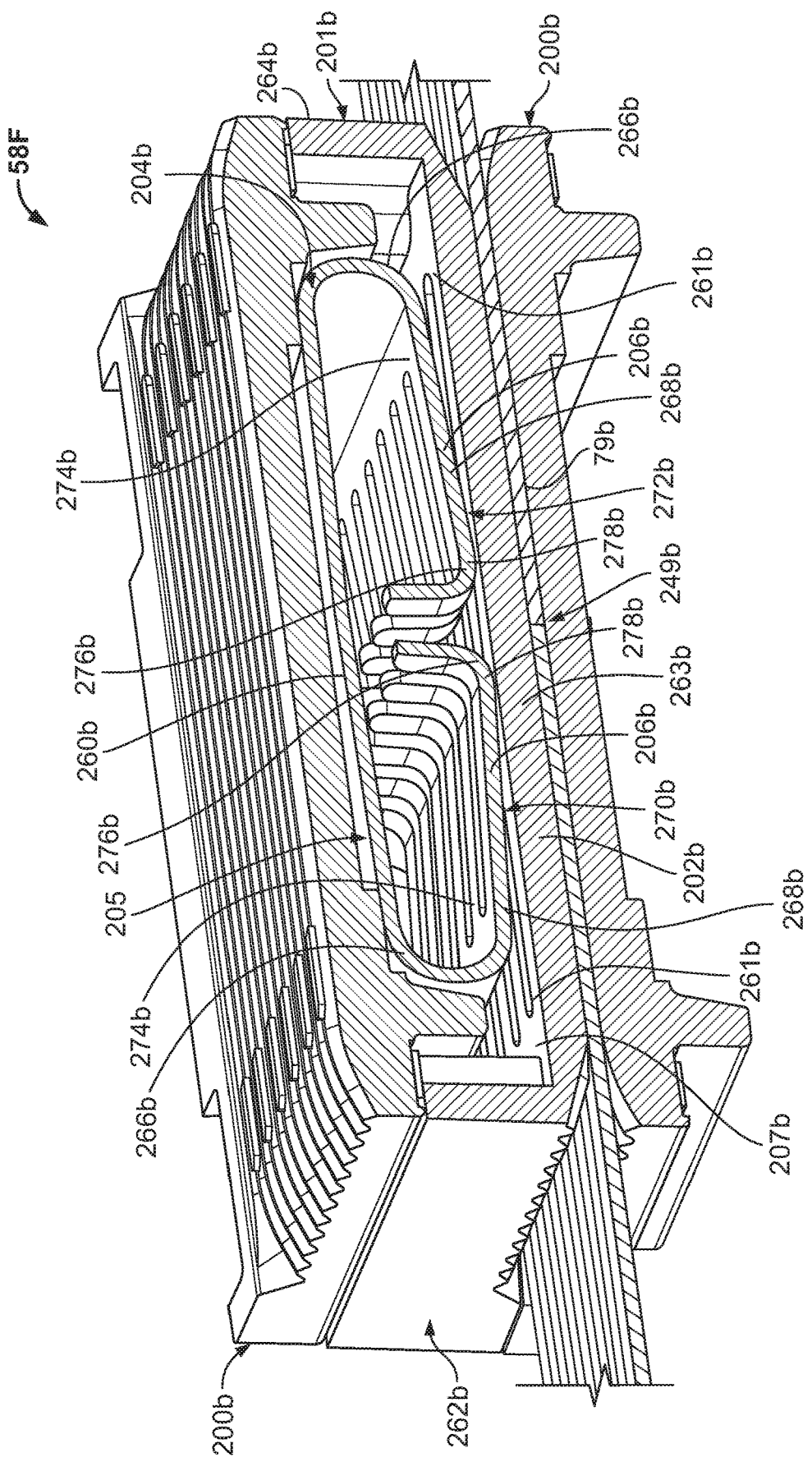
FIG. 49 is a cross-sectional view taken along section line 49-40 of FIG. 46.
Figure 52:
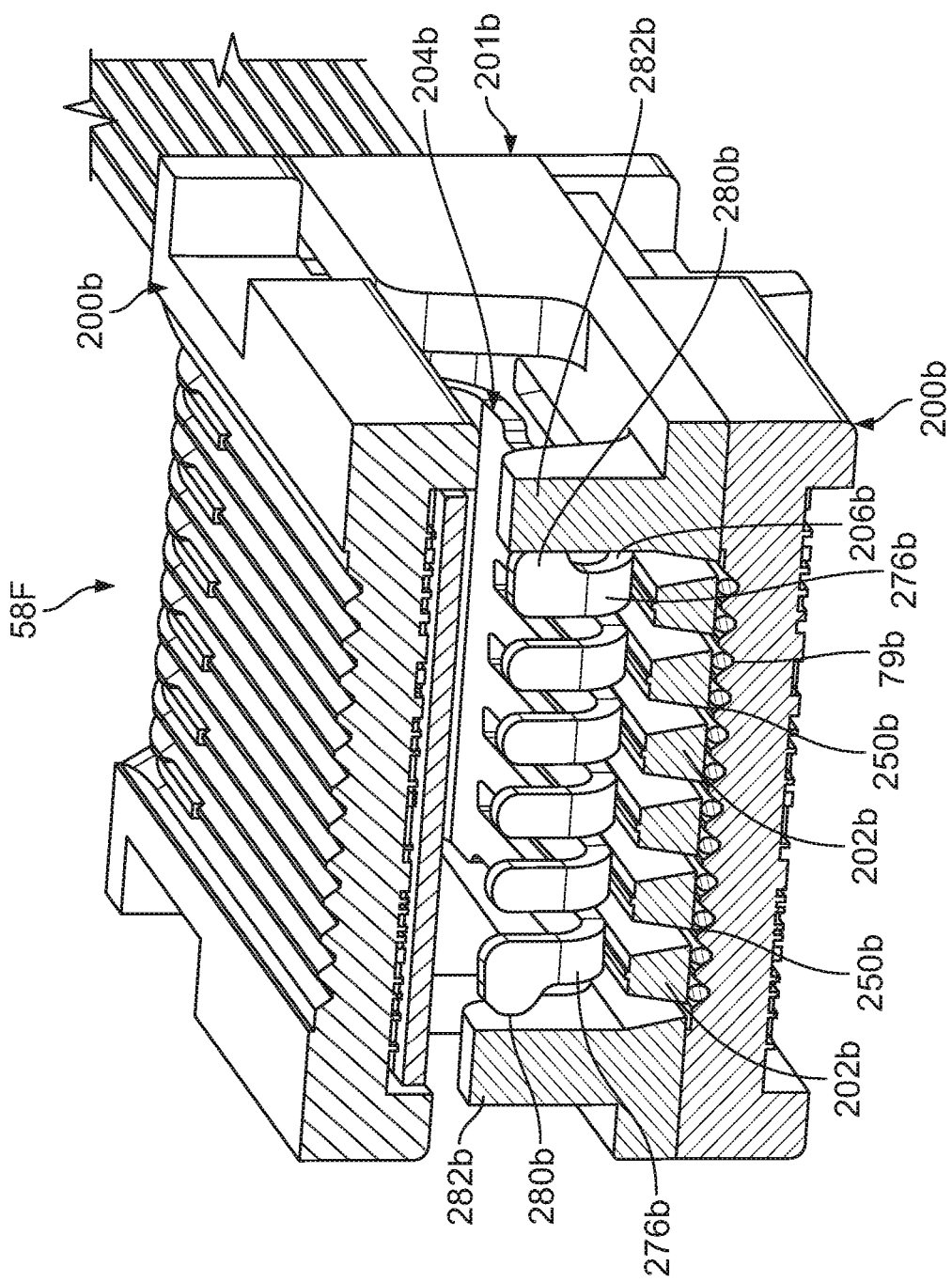
FIG. 52 is a cross-sectional view taken along section line 52-52 of FIG. 46.

FIGS. 29-31 depict another example fiber alignment structure 58d in accordance with the principles of the present disclosure. The fiber alignment structure 58d includes a groove-defining component 260 defining a plurality of fiber alignment grooves 79, a fiber engagement component 261 including a plurality of independently moveable fiber engagement elements 262 each configured for pressing a pair of optical fibers desired to be optically coupled together into a corresponding one of the fiber alignment grooves 79, and a fiber biasing component 264 including a plurality of spring biasing elements 266 for applying spring load to the fiber engagement elements 262 which is transferred through the fiber engagement elements to the optical fibers. It will be appreciated that the fiber alignment structure 58d has the same construction as the fiber alignment structure 58c, except the groove-defining component 260 and the fiber engaging component 261 are configured to be coupled together by a snap-fit interface (e.g., see snap-latches 263 and receptacles 265).

In the above examples, the alignment structures are configured with a single fiber engagement component corresponding to each of the fiber alignment grooves. Alternative configurations of any of the above examples, can include fiber engagement components such as beams that correspond to more than one of the fiber alignment grooves. For example, the fiber engagement components can be enlarged in width to oppose more than one of the fiber alignment grooves. For example, each fiber engagement component can oppose the open sides of two fiber alignment grooves. In certain examples, by making the fiber engagement components larger, the molding process can be facilitated and the parts FIGS. 39-45 depict another example fiber alignment structure 58e in accordance with the principles of the present disclosure. Similar to the previous embodiments, the fiber alignment structure can be mounted in a fiber optic adapter. In the depicted example of FIG. 39, the fiber alignment structure 58e is adapted to optically connect two groups of optical fibers 20a, 20b. The optical fibers 20a, 20b can be integrated with ferrule-less (i.e., bare fiber) multi-fiber optical connectors 10a, 10b that can be inserted into connector ports of the fiber optic adapter to optically connect the optical fibers 20a, 20b together.

The fiber alignment structure 58e includes a groove-defining component 200a defining a plurality of fiber alignment grooves 79a, a fiber engagement component 201a including a plurality of independently moveable fiber engagement elements 202a each configured for pressing two pairs of first and second optical fibers desired to be optically coupled together into a corresponding pair of the fiber alignment grooves 79a, and a fiber biasing component 204a including a plurality of spring biasing elements 206a for applying spring load to the fiber engagement elements 202a which is transferred through the fiber engagement elements 202a to the optical fibers.

In one example, the fiber engagement elements 202a are formed by beams separated by slots. In a preferred example, the beams have opposite ends that are fixed relative to a frame 207a of the fiber engagement component 201a. In a preferred example, each beam opposes open sides and extends along lengths of a corresponding pair of the fiber alignment grooves 79a. In a preferred example, the beams extend across optical interface locations where the ends of fibers 20a, 20b intended to be coupled together oppose one another. In a preferred example, the beams flex or otherwise move to accommodate insertion of optical fibers 20a, 20b into the fiber alignment grooves 79a.

In one example, the spring biasing elements 206a of the fiber biasing component 204a include at least one separate and independently moveable spring for each of the fiber engagement elements 202a. In one example, the spring biasing elements 206a of the fiber biasing component 204a include at least two separate and independently moveable springs for each of the fiber engagement elements 202a. In one example, the spring biasing elements 206a of the fiber biasing component 204a include at least two separate and independently moveable springs for each of the fiber engagement elements 202a, wherein a first of the springs is positioned on a first side of the optical connection interface location and a second of the springs is positioned on an opposite second side of the optical connection interface location. In one example, each of the springs has a cantilevered beam configuration including a base end integrated with a frame 205a of the fiber biasing component 204a and a free end that engages and applies spring bias against a corresponding one of the fiber engagement elements 202a at least when an optical fiber is inserted into an alignment groove corresponding to the fiber engagement element 202a.

In certain examples, the optical fibers positioned within a given pair of fiber alignment grooves 79a corresponding to one of the engagement elements 202a may have different diameters or the depths of the grooves 79a of a given pair of grooves 79a may have different depts. In these types of situations, the tops of the sets of optical fibers may not be aligned along a horizontal plane and instead could be vertically offset from one another. To address this situation and to insure contact with all the optical fibers despite variances in size, the engagement elements 202a can be configured to tilt about pivot locations corresponding to pivot axes 400 that are parallel to the grooves 79a. The pivot locations can be located at mid-locations of the widths of the engagement elements 202a and can be defined at pivot projections 401 defined by the engagement elements 202a or the spring biasing elements 206a. The pivot projections 401 can be located at a mechanical interface between the engagement elements 202a and the spring biasing elements 206a. The projections 401 can also be adapted to centralize the spring forces transferred from the spring biasing elements 206a to the engagement elements 202a. This is beneficial to allow for more tolerance particularly for cases in which the spring biasing elements 206a may be slightly misaligned in a lateral orientation relative to the engagement elements 202a.

FIGS. 46-52 depict another example fiber alignment structure 58f in accordance with the principles of the present disclosure. Similar to the previous embodiments, the fiber alignment structure can be mounted in a fiber optic adapter. In the depicted example of FIG. 46, the fiber alignment structure 58f is adapted to optically connect two groups of optical fibers 20a, 20b. The optical fibers 20a, 20b can be integrated with ferrule-less (i.e., bare fiber) multi-fiber optical connectors 10a, 10b that can be inserted into connector ports of the fiber optic adapter to optically connect the optical fibers 20a, 20b together.

The fiber alignment structure 58f includes a groove-defining component 200b defining a plurality of fiber alignment grooves 79b, a fiber engagement component 201b including a plurality of independently moveable fiber engagement elements 202b each configured for pressing two pairs of first and second optical fibers desired to be optically coupled together into a corresponding pair of the fiber alignment grooves 79b, and a biasing component 204b including a plurality of spring biasing elements 206b for applying spring load to the fiber engagement elements 202b which is transferred through the fiber engagement elements 202b to the optical fibers. The optical fibers 20a, 20b are adapted to meet at an optical connection interface location 249b (see FIG. 49).

The groove-defining component 200b includes parallel ridges 250b between which the fiber alignment grooves 79b are defined. Fiber insertion locations 252b (see FIG. 47) are located at opposite ends of the groove-defining component 200b. The fiber alignment grooves 79b and the ridges 250b extend between the fiber insertion locations 252b and through the optical connection interface location 249b. The groove-defining component 200b includes spacers 254b (see FIGS. 47 and 48) positioned adjacent the fiber insertion locations 252b. The spacers 254b project upwardly from the ridges 250b and are positioned between alternating ones of the alignment grooves 79b. The spacers 253b do not extend along the entire lengths of the ridges 250b and do not extend through the optical connection interface location 249b. The spacers 254b are configured to oppose and support corresponding ones of the fiber engagement elements 202b adjacent the fiber insertion locations 252b to ensure that a sufficient spacing exists between the surfaces defining the grooves 79b and the fiber engagement elements 202b for optical fibers to be inserted into the alignment grooves 79b with minimal resistance.

In certain examples, the spacers 254b are centered relative to the width w of each fiber engagement element 202b. In certain examples, the spacers 254b support opposite ends of each of the fiber engagement elements 202b to retain the opposite ends at a fixed first spacing relative to the alignment grooves 79b, but allow the fiber engagement elements 202b to flex or bow toward the alignment grooves 79b under spring pressure from the biasing elements 206b to press the optical fibers 20a, 20b within the grooves 79b in the region between the supported opposite ends of the fiber engagement elements 202b. The, in certain examples, the central portions of the fiber engagement elements 202b can move, due to spring pressure from the biasing elements 206b, to a position in which a second spacing smaller than the first spacing is defined between the central portions and the alignment grooves 79b. In other examples, spacers providing the same function can be provided on the fiber engagement component 201b or can be provided by another type of positive stop interface between the fiber engagement component 201b and the groove-defining component 200b that maintains a fixed spacing between the grooves 79b and the ends of the fiber engagement elements 202b, but does not maintain a fixed spacing between the grooves 79b and the fiber engagement elements 202b along the regions of the fiber engagement components 201b between the supported ends to allow such regions to be able to flex or bow toward the fiber alignment grooves 79b to press against the optical fibers 20a, 20b supported therein.

In one example, the fiber engagement elements 202b are formed by beams separated by slots. In a preferred example, the beams have opposite ends that are each fixed relative to a frame 207b of the fiber engagement component 201b. In a preferred example, each beam opposes open sides and extends along lengths of a corresponding pair of the fiber alignment grooves 79b. In a preferred example, the beams extend across optical interface locations 249b where the ends of fibers 20a, 20b intended to be coupled together oppose one another. In a preferred example, the beams flex or otherwise move along their lengths to accommodate insertion of optical fibers 20a, 20b into the fiber alignment grooves 79b. In certain examples, the beams are spring biased toward the grooves 79b by the biasing component 204b and bow toward the grooves 79b in the region between the fixed ends of the beams. When optical fibers are inserted in the grooves 79b, the beams can move slightly away from the grooves 79b under the bias of the biasing component 204b to accommodate insertion of the fibers 20a, 20b while maintaining contact with the fibers 20a, 20b.

Figure 53:
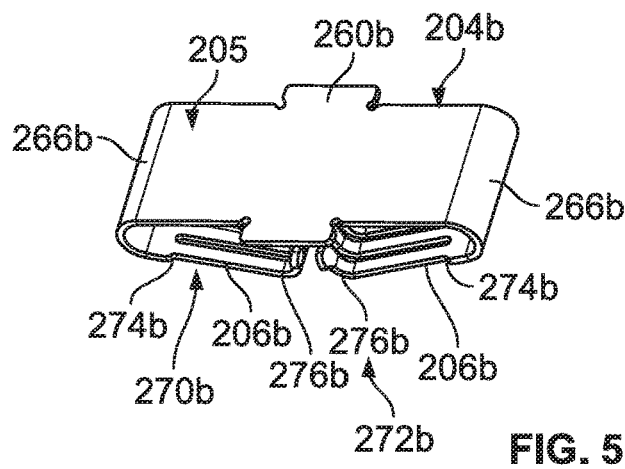
FIG. 53 is a perspective view of a spring arrangement used within the optical fiber alignment device of FIG. 46.
Figure 54:
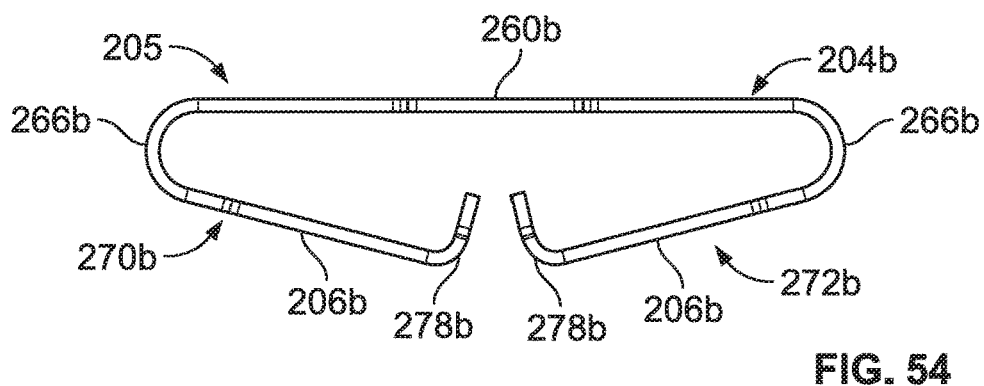
FIG. 54 is a side view of the spring arrangement of FIG. 53.
Figure 55:
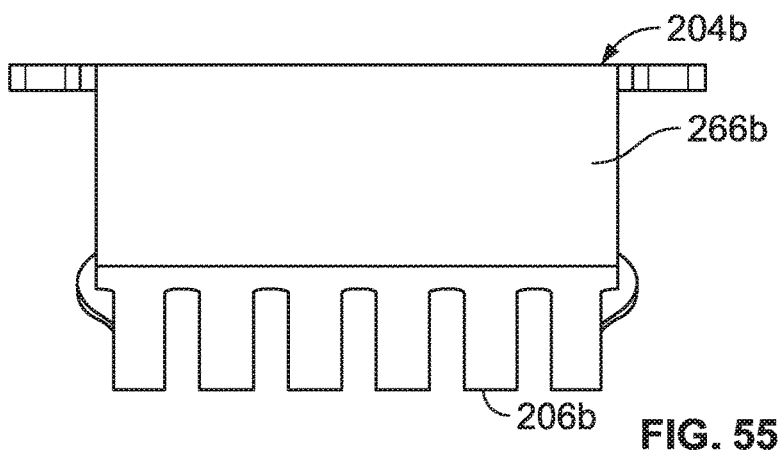
FIG. 55 is an end view of the spring arrangement of FIG. 53.
Figure 56:
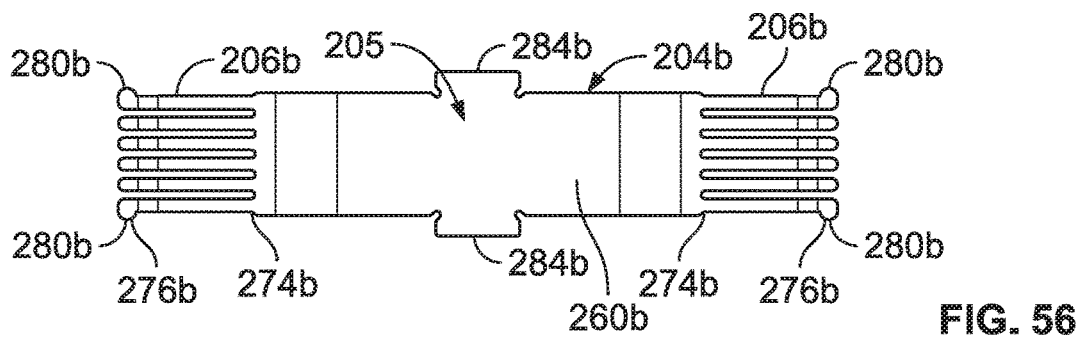
FIG. 56 is a plan view showing the spring arrangement of FIG. 53 in a laid-flat configuration prior to the spring arrangement being bent into the configuration of FIGS. 53-55.

In one example, the spring biasing elements 206b of the biasing component 204b include at least one separate and independently moveable spring for each of the fiber engagement elements 202b. In one example, the spring biasing elements 206b of the biasing component 204b include at least two separate and independently moveable springs for each of the fiber engagement elements 202b. In one example, the spring biasing elements 206b of the biasing component 204b include at least two separate and independently moveable springs for each of the fiber engagement elements 202b, wherein a first of the springs is positioned on a first side of the optical connection interface location and a second of the springs is positioned on an opposite second side of the optical connection interface location. In one example, each of the springs has a cantilevered beam configuration including a base end integrated with a frame 205b of the biasing component 204b and a free end that engages and applies spring bias against a corresponding one of the fiber engagement elements 202b at least when an optical fiber is inserted into an alignment groove corresponding to the fiber engagement element 202b. In one example, the biasing component 204b can have a one-piece unitary construction. In one example, the biasing component 204b can be made of sheet metal which starts in a flat sheet-like configuration (e.g., stamped sheet metal, see FIG. 56) and is manufactured by bending the flat sheet-like configuration to the desired shape (see FIGS. 53-55).

The frame 205b of the biasing component 204b includes a bridge portion 260b adapted to extend over and across the optical connection interface location 249b between opposite first and second ends 262b, 264b of the fiber alignment structure 54f. The frame 205b also includes primary curved ends 266b that extend generally from the bridge portion 260b to the spring biasing elements 206b. In certain examples, the primary curved ends 266b transition at least 120° between the bridge portion 260b and the spring biasing elements 206b. In certain examples, the primary curved ends 266b are located generally adjacent to fixed ends 261b of the beams 263b that form the fiber engagement elements 202b. The spring biasing elements 206b include cantilever springs 268b arranged in first and second spring sets 270b, 272b. The spring sets 270b, 272b are positioned on opposite sides of the optical connection interface location 249b.

The cantilever springs 268b each include a base end 274b integral with the frame 205b adjacent one of the primary curved portions 266b, and free end portions 276b positioned near the optical connection interface location 249b. The free end portions 276b bend upwardly in a direction that curves away from the fiber engagement elements 202b such that the free end portions 276b include curved contact sections 278b adapted to engage the fiber engagement elements 202b on the sides of the fiber engagement elements 202b that face away from the alignment grooves 79b. The outermost cantilever springs 268b of each of the spring sets 270b, 272b include centering tabs 280b located at the free end portions 276b. The centering tabs 280b project outwardly in a lateral direction from the spring sets 270b, 272b and are adapted to engage spring centering walls 282b provided at the sides of the fiber engagement component 202b. Contact between the centering tabs 280b and the spring centering walls 282b helps maintain registration between the springs 268b and their corresponding fiber engagement elements 202b. As indicated previously, two of the cantilever springs 262b are provided for each of the fiber engagement elements 202b, with the cantilever springs 268b corresponding to a given one of the fiber engagement elements 202b being positioned on opposite sides of the optical connection interface location 249b. The bridge portion 260b can also include ears 284b that fit within corresponding receptacles defined by the underside of the groove-defining component 200b which is stacked upon the fiber engagement component 201b against which the spring biasing elements 206b of the biasing component 204b are biased.

It will be appreciated that the fiber alignment structure 58f is adapted to include multiple parallel rows of fiber alignment grooves 79b by stacking multiple sets of the groove-defining component 200b, the fiber engagement component 201b and the biasing component 204b together. It will be appreciated that the stacked configuration of the fiber alignment structure 58f is configured for providing a precise amount of flexation (e.g., deformation, bending, etc.) of the spring biasing elements 206b of the biasing component 204b when the fiber alignment structure 58f is assembled. For example, the biasing component 204b can be compressed between the top side of one of the fiber engagement components 201b and the bottom side of an upwardly adjacent groove-defining component 200b. A positive stop configuration between the underside of the groove-defining component 200b and the top side of the fiber engagement component 201b ensures that the biasing component 204b is compressed a predetermined amount when the fiber alignment structure 50f is assembled.

FIG. 50 shows the fiber alignment structure 58f in the process of being assembled where the biasing component 204b is positioned between the top side of the fiber engagement component 201b and the bottom side of an upper groove-defining component 200b. The upper groove-defining component 200b includes spring contact surfaces 286b at its underside that are adapted to contact the bridge portion 260b of the biasing component 204b at locations adjacent the primary curved portions 266b. When the upper groove-defining component 200b is inserted into the top side of the fiber engagement component 201b, the cantilever springs 268b engage their corresponding fiber engagement elements 202b and are caused to move relative to the bridge portion 260b which results in increasing the degree of curvature of the primary curved portions 266b. Thus, the curved portions 266b flex with the springs 268b to accommodate movement of the springs 268b and to provide a portion of the spring load applied to the fiber engagement elements 202b. As shown at FIG. 50, prior to compression, the cantilever members 260b are oriented at a first angle A1 relative to the bridge portion 60b, while after assembly the biasing component 204b has flexed to an orientation in which the cantilever springs 268b define an angle A2 relative to the bridge portion 260b that is smaller than the angle A1.

Figure 57:
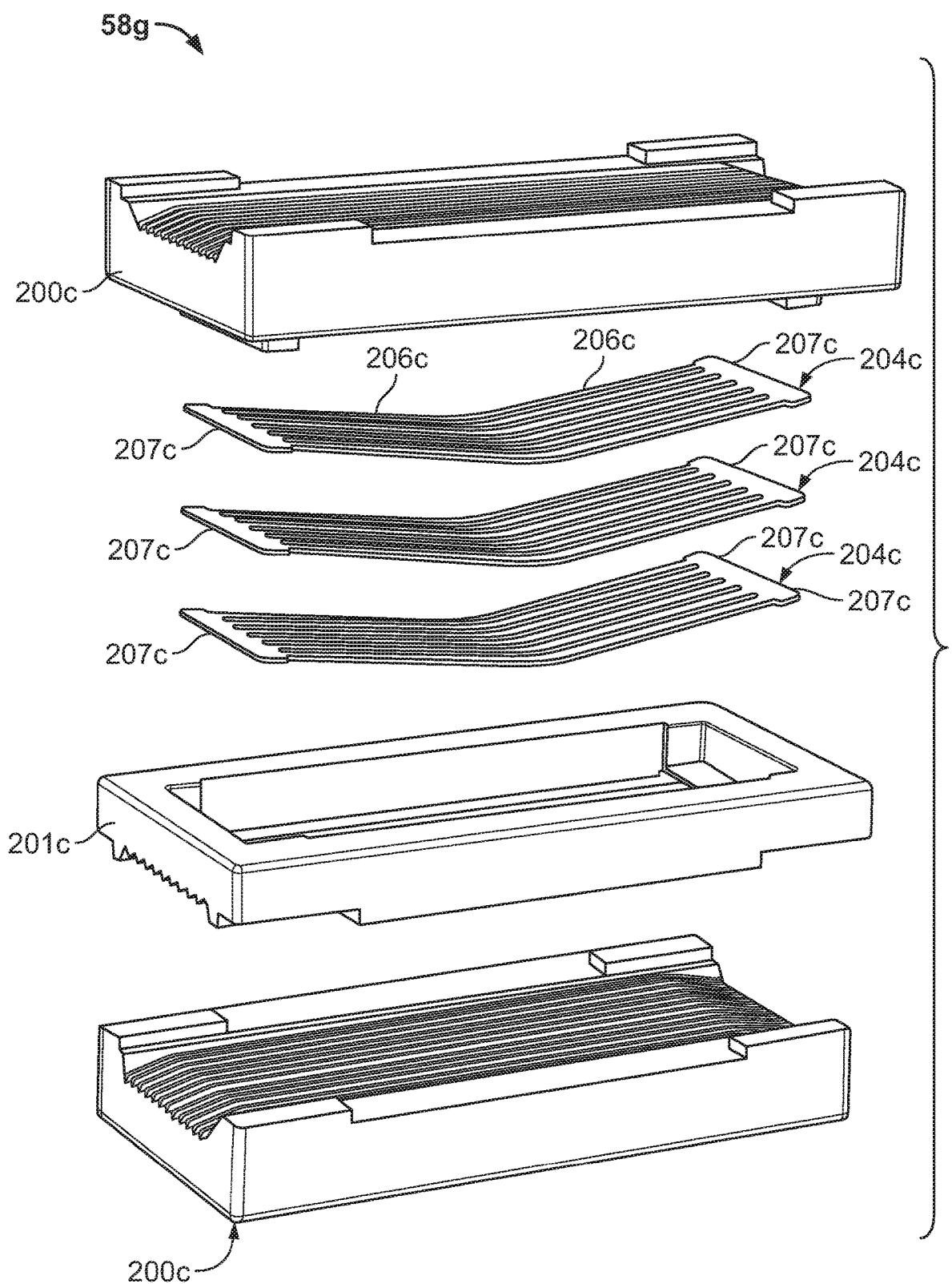
FIG. 57 is an exploded view depicting a further optical fiber alignment device in accordance with the principles of the present disclosure.
Figure 58:
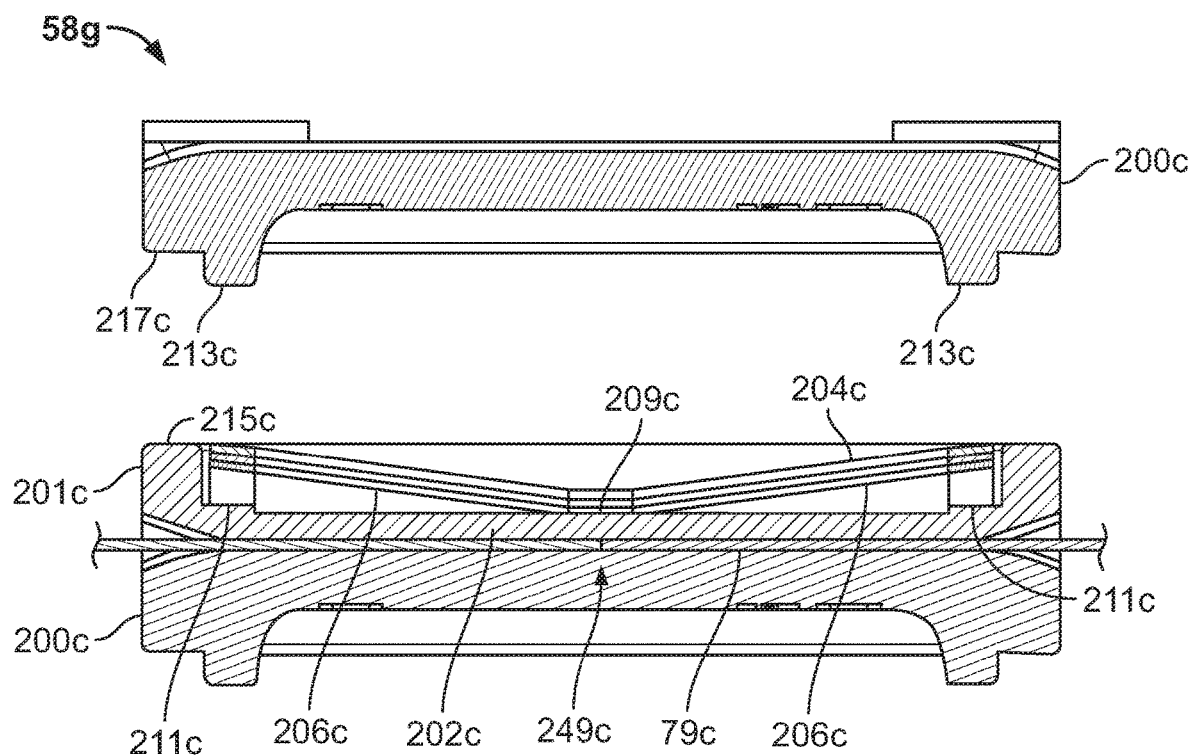
FIG. 58 is cross-sectional view taken lengthwise through the optical fiber alignment device of FIG. 57 with the optical fiber alignment device being partially assembled.
Figure 59:
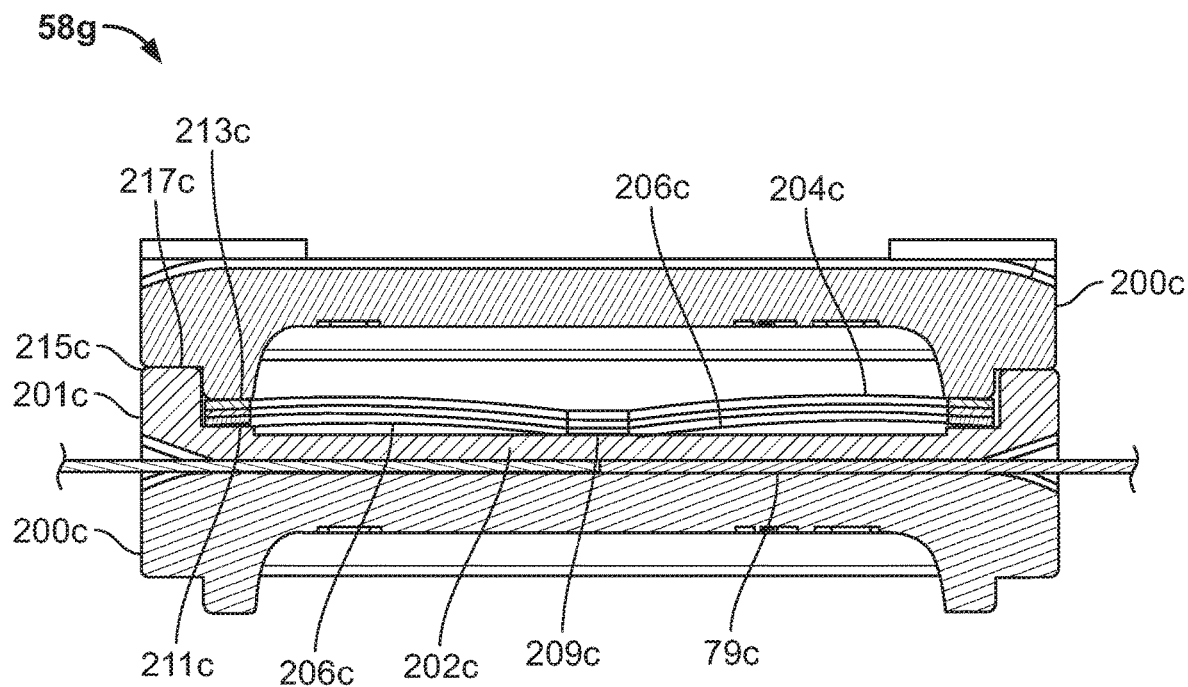
FIG. 59 is a cross-sectional view taken lengthwise through the optical fiber alignment device of FIG. 57 with the optical fiber device being fully assembled.

FIGS. 57-59 depict another example of fiber alignment structure 58g in accordance with the principles of the present disclosure. Similar to the previous embodiments, the fiber alignment structure 58g can be mounted in a fiber optic adapter. The fiber alignment structure 58g is adapted to optically connect two groups of optical fibers. The optical fibers can be integrated with ferrule-less (i.e., bare fiber) multi fiber optical connectors 10a, 10b that can be inserted into connector ports of the fiber optic adapter to optically connect the optical fibers together.

The fiber alignment structure 58g includes a groove-defining component 200c defining a plurality of fiber alignment grooves 79c, a fiber engagement component 201c including a plurality of independently movable fiber engagement elements 202c adapted to press at least one pair of optical fibers desired to be optically coupled together into a corresponding one of the alignment grooves 79c, and a plurality of biasing components 204c for applying spring load to the fiber engagement elements 202c which is transferred through the fiber engagement elements 202c to the optical fibers. The biasing components 204b preferably are arranged in a stacked relationship and are adapted to cooperate to apply spring load to the fiber engagement elements 202c.

Each of the biasing components 204c includes a plurality of spring biasing elements 206c depicted as beams separated by slots. The ends of the individual spring biasing elements 206c are coupled together by end connecting members 207c. The end connecting members 207c are positioned at opposite ends of each biasing component 204c such that first ends of the spring biasing elements 206c are connected by one of the end connecting members 207c and second ends of the spring biasing elements 206c are coupled together by the other of the end connecting members 207c. The biasing components 204c each have a pre-defined bend that is established in the biasing components 204c prior to installing the biasing components 204c within the fiber alignment structure 58g. As depicted, the biasing components 204c are configured such that mid-regions 209c of the spring biasing elements 206c are adapted to contact the fiber engagement elements 202c when the fiber alignment structure 58g is assembled together.

As shown at FIGS. 58 and 59, the biasing components 204c deform from a more bent configuration (see FIG. 58) to a more flattened configuration (see FIG. 59) when installed within the fiber alignment structure 58g. The mid regions 209c of the spring biasing elements 206c are adapted to engage the fiber engagement elements 202c at a location directly above the optical connection interface location 249c where optical fibers desired to be optically coupled together contact one another. The mid-regions 209c can have a generally flat configuration and can be configured to extend across the optical connection interface location 249c. In the depicted example, the biasing components 204c have a metal construction and are constructed of sheet metal such as stamp sheet metal.

Referring to FIGS. 58 and 59, the biasing components 204c are stacked within the fiber alignment structure 58g and opposite ends of the biasing components 204c are clamped between clamp surfaces 211c provided at the top side of the fiber engagement component 201b and clamp surfaces 213c provided on downward projections integrated with the bottom side of the groove-defining component 200c that is stacked on the fiber engagement component 201c. The clamp surfaces 211c, 213c position the ends of the biasing components 204b at a predetermined location relative to the top sides of the fiber engagement elements 202c such that upon assembly, the biasing components 204c are deflected a predetermined and controlled amount. In certain examples, stop surfaces 215c, 217c can also be provided between the underside of each groove-defining component 200c and the top side of its mating fiber engagement component 201c.

Figure 60:
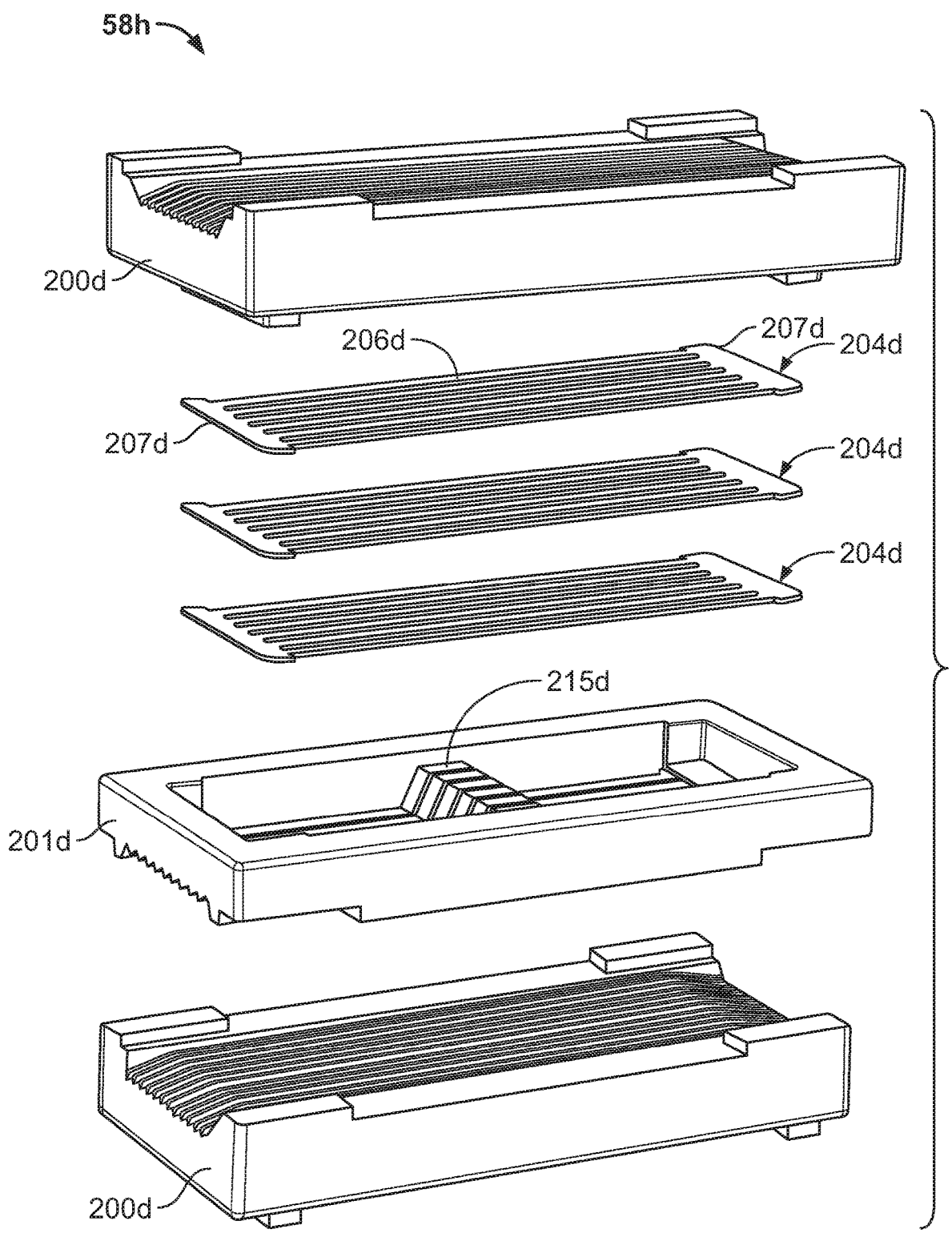
FIG. 60 is an exploded view of still another optical fiber alignment device in accordance with the principles of the present disclosure.
Figure 61:
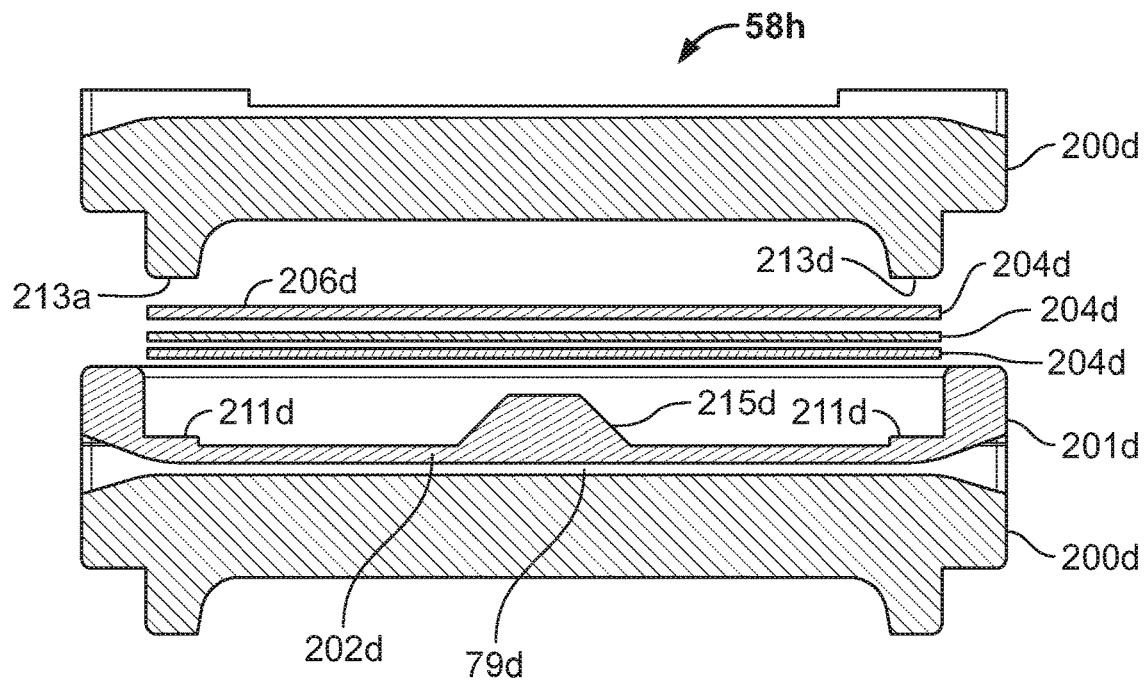
FIG. 61 is a cross-sectional view taken lengthwise through the optical fiber alignment device of FIG. 60 with the optical fiber device being partially assembled.
Figure 62:
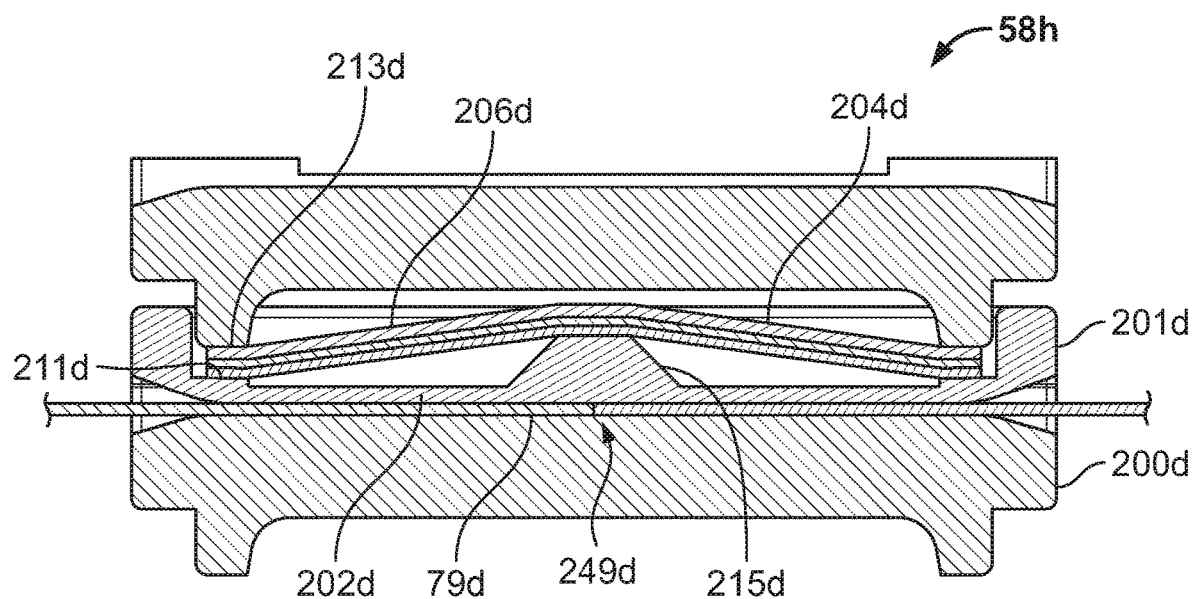
FIG. 62 is a cross-sectional view taken lengthwise through the optical fiber alignment device of FIG. 60 with the optical fiber device being fully assembled.
Figure 63:
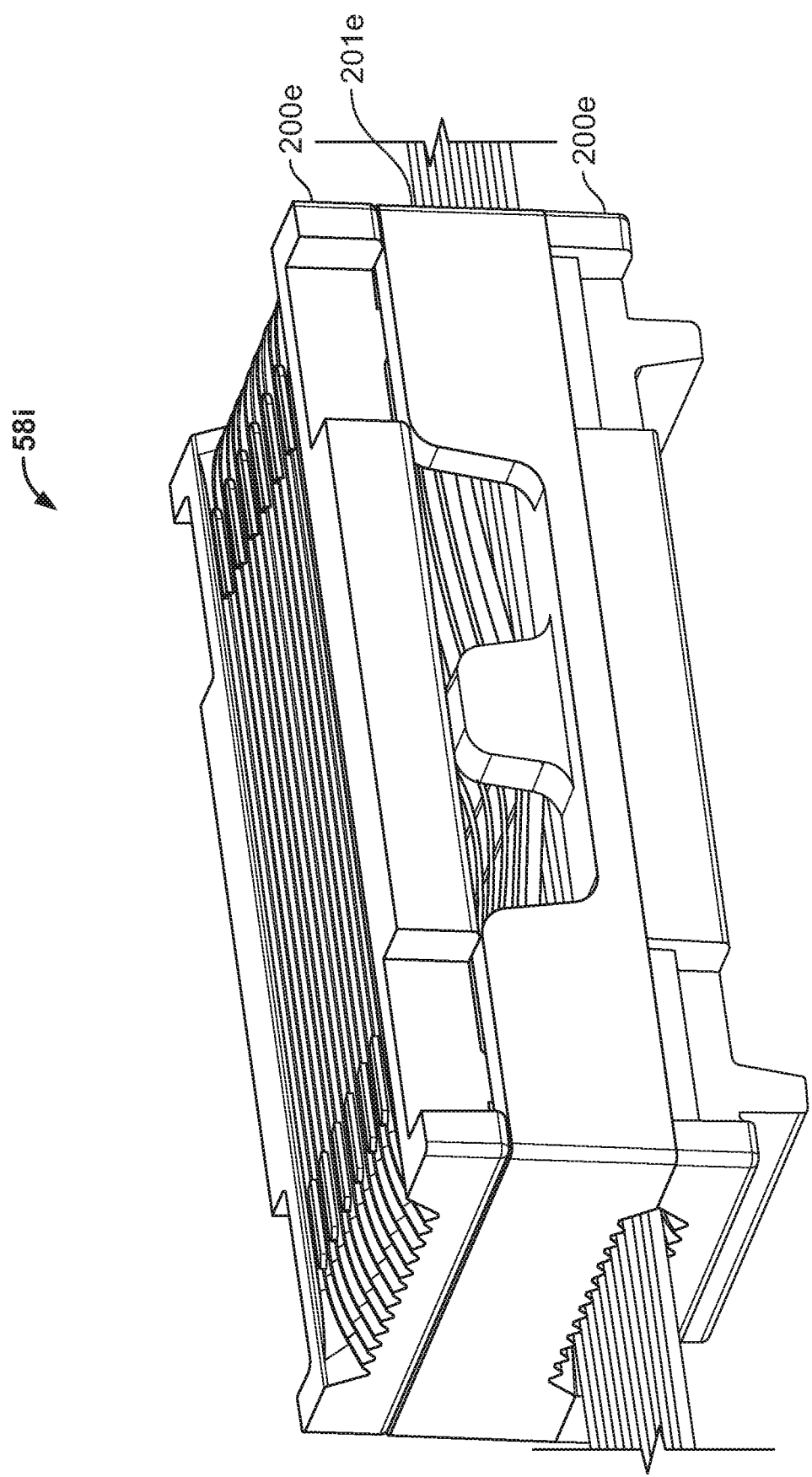
FIG. 63 is a perspective view depicting still another optical fiber alignment device in accordance with the principles of the present disclosure, two groups of optical fibers are shown inserted into the optical fiber device.
Figure 67:
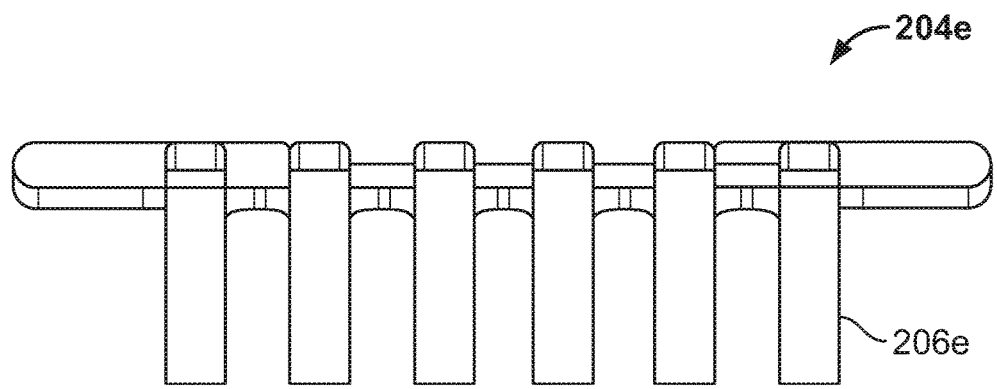
FIG. 67 is a right end view of the spring set of FIG. 64.

FIGS. 60-62 depict another example fiber alignment structure 58h in accordance with the principles of the present disclosure. Similar to the previous embodiments, the fiber alignment structure can be mounted in a fiber optic adapter. The fiber alignment structure 58h is adapted to optically connect two groups of optical fibers together. The optical fibers can be integrated with ferrule-less (i.e. bare fiber) multi-fiber optical connectors 10a, 10b that can be inserted into connector ports of the fiber optic adapter to optically connect the optical fibers together. In certain examples, the fiber alignment structure 58h can include multiple components arranged in a stacked configuration to accommodate multiple parallel rows of optical fibers.

The fiber alignment structure 58h includes a groove-defining component 200d defining a plurality of fiber alignment grooves 79d, a fiber engagement component 201d including a plurality of independently movable fiber engagement elements 202d each configured for pressing at least one pair of optical fibers desired to be optically coupled together into a corresponding fiber alignment groove 79d, and a plurality of biasing components 204d each including a plurality of spring biasing elements 206d for applying spring load to the fiber engagement element 202d which is transferred through the fiber engagement elements 202d to the optical fibers desired to be coupled together. The optical fibers are adapted to meet at an optical connection interface location 249d (see FIG. 62).

The spring biasing elements 206d of the biasing components 204d have a flat configuration prior to being installed within the fiber alignment structure 58h. In the depicted example, the biasing components 204d have a metal construction and are constructed of sheet metal such as stamp sheet metal. In certain examples, the spring biasing elements 206d each include a beam. The beams are generally parallel to one another and are separated by slots. Opposite ends of the beams are coupled by end connecting members 207d. The fiber engagement elements 202d include central projections 215d that project upwardly from the fiber engagement elements 202d at a location above the optical connection interface location 259d. When the fiber alignment structure 58h is assembled, mid regions of the spring biasing elements 206d contact the projecting elements 215d. During assembly, the spring biasing elements 206d engage the projecting elements 215d at mid-regions of the spring biasing elements 206d and flex about the projection elements 215d from the flat configuration to a more flexed or bent configuration. In the more flexed configuration, the spring biasing elements 206d are adapted to apply spring biasing force downwardly against the projection elements 215d which is transferred to the fiber engagement elements 202d to cause the fiber engagement elements 202d to flex or be biased toward the fiber alignment grooves 79d. As shown at FIGS. 61 and 62, opposite ends of the biasing components 204d are clamped between clamp surfaces 211d provided on the stop side of the fiber engagement component 201d and clamp surfaces 213d provided on projections that project downwardly from an underside of the groove-defining component 200d that mates with the top side of the fiber engagement component 201d.

FIGS. 63-69 depict still another fiber alignment structure 58i in accordance with the principles of the present disclosure. Similar to the previous embodiments, the fiber alignment structure 58i can be mounted within a fiber optic adapter. The fiber alignment structure 58i is adapted to optically connect two groups of optical fibers together. The number of rows of optical fibers that can be accommodated can be increased by stacking multiple sets of the components of the fiber alignment structure 58i together. The optical fibers that are inserted into the fiber alignment structure 58i can be integrated with a ferrule-less (i.e. bare fiber) multi-fiber optical connector (e.g. see connectors 10a, 10b) that can be inserted into connector ports of the fiber optic adapter to optically connect the optical fibers together.

The fiber alignment structure 58i includes a groove defining component 200e defining a plurality of fiber alignment grooves 79e, a fiber engagement component 201e including a plurality of independently movable fiber engagement elements 202e each configured from pressing at least one pair of optical fibers desired to be optically coupled together into a corresponding alignment groove 79e, and a biasing component 204e including a plurality of spring biasing elements 206e for applying spring load to the fiber engagement elements 202e which is transferred through the fiber engagement elements 202e to the optical fibers desired to be optically coupled together. The optical fibers are adapted to meet at an optical connection interface location 249e (see FIG. 69).

It will be appreciated that the fiber alignment structure 58i has the same general configuration as the fiber alignment structure 58g, except the spring biasing elements 206e of the stack of biasing components 204e have first ends that are coupled together by an end connecting member 207e, and have second ends that are not coupled together. It will be appreciated that the spring biasing elements 206e are depicted as individual beams separated by slots. The Individual beams have pre-defined bends which form mid-regions 209e adapted to contact the fiber engagement elements 202e directly above the optical connection interface location 249e. Preferably, the mid-regions 209e are long enough to extend completely across the optical connection interface location 249e. Because the second ends of the beam-style spring biasing elements 206e are not mechanically coupled together by an end connection member, the individual spring biasing elements 206e are capable of providing more independent movement with respect to one another. It will be appreciated that the biasing components 204e can have a metal construction and in certain examples can be formed from a material such as sheet metal.

Figure 68:
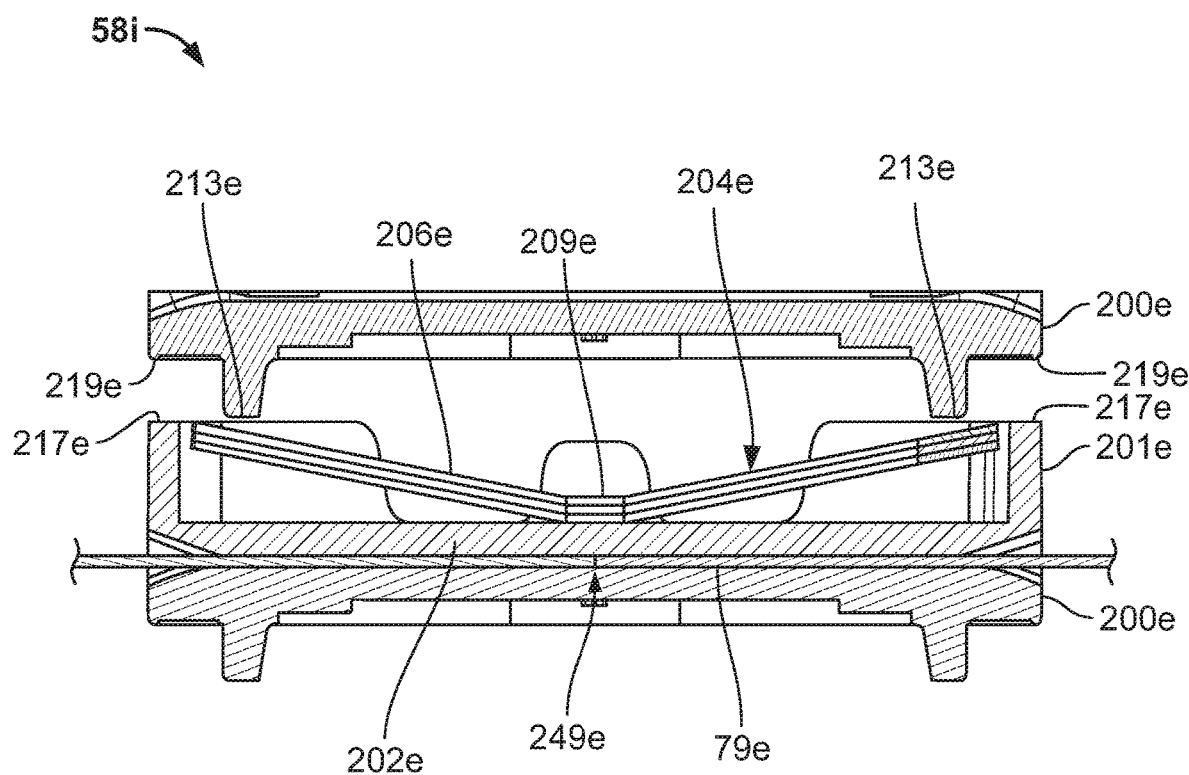
FIG. 68 is a cross-sectional view taken lengthwise through the optical fiber alignment device of FIG. 63 with the optical fiber device partially assembled.
Figure 69:
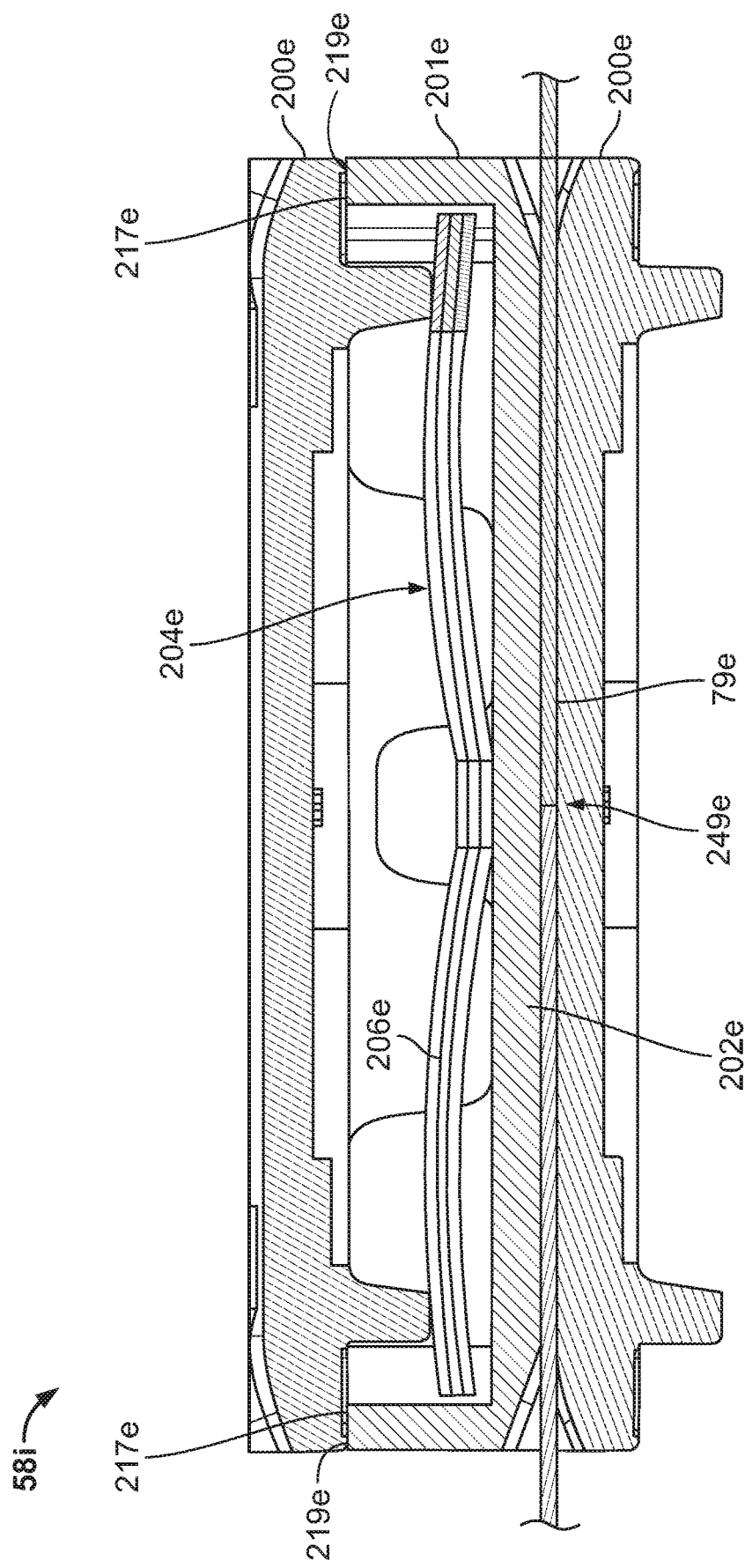
FIG. 69 is a cross-sectional view taken lengthwise through the optical fiber alignment device of FIG. 63 with the optical fiber alignment device fully assembled.

When the fiber alignment structure 58i is assembled together, downward projections 213e provided at the underside of the groove-defining component 200e adapted to mate with the top side of the fiber engagement component 201e engage the first and second ends of the spring biasing elements 206e to deform the spring biasing elements 206e from a more bent configuration to a more flattened configuration. By deforming the spring biasing elements 206e, spring load is applied from the spring biasing elements 206e through the mid regions 209e to the fiber engagement elements 202e to bias the fiber engagement elements 202e toward their corresponding fiber alignment grooves 79e. In the example of FIGS. 68 and 69, the ends of the spring biasing elements 206e are not clamped between two surfaces. Instead, the amount of deflection of the biasing components 204e is controlled by contact with the downward projections 213e and by contact between positive stop surfaces 217e, 219e provided at the top side of the fiber engagement component 201e and at the underside of the groove-defining component 200e that mates with the top side of the fiber engagement component 201e.

It will be appreciated that embodiments of the disclosure can be built to accommodate a variety of different fiber counts. In certain examples, fiber alignment structures in accordance with the principles of the present disclosure can include multiple components that can be assembled together to build a fiber alignment structure that is capable of accommodating a different numbers of fiber counts. Basic components that can be stacked together can include groove-defining components, fiber engagement components, and biasing components. Generally, the components are stacked together in a repeating pattern to build a fiber alignment structure. Typically, a groove-defining component defines a base of the structure. A fiber engagement component can then be mated with the top side of the base-level groove-defining component. A biasing component can then be mounted within the fiber engagement component, and a subsequent groove-defining component can be mated with the top side of the fiber engagement component to provide controlled deflection of the biasing components and to provide a new set of fiber alignment grooves for accommodating more optical fibers. If desired, another fiber engagement component can be mounted on top of the second groove-defining component to provide a second row of usable fiber alignment grooves accommodating a second row of optical fibers desired to be mated together. Thereafter, another biasing component can be mounted on the second fiber engagement component and another groove-defining component can be mated with the top side of the second fiber engagement component. This process can be repeated to progressively increase the capacity of the fiber alignment device.

Figure 70:
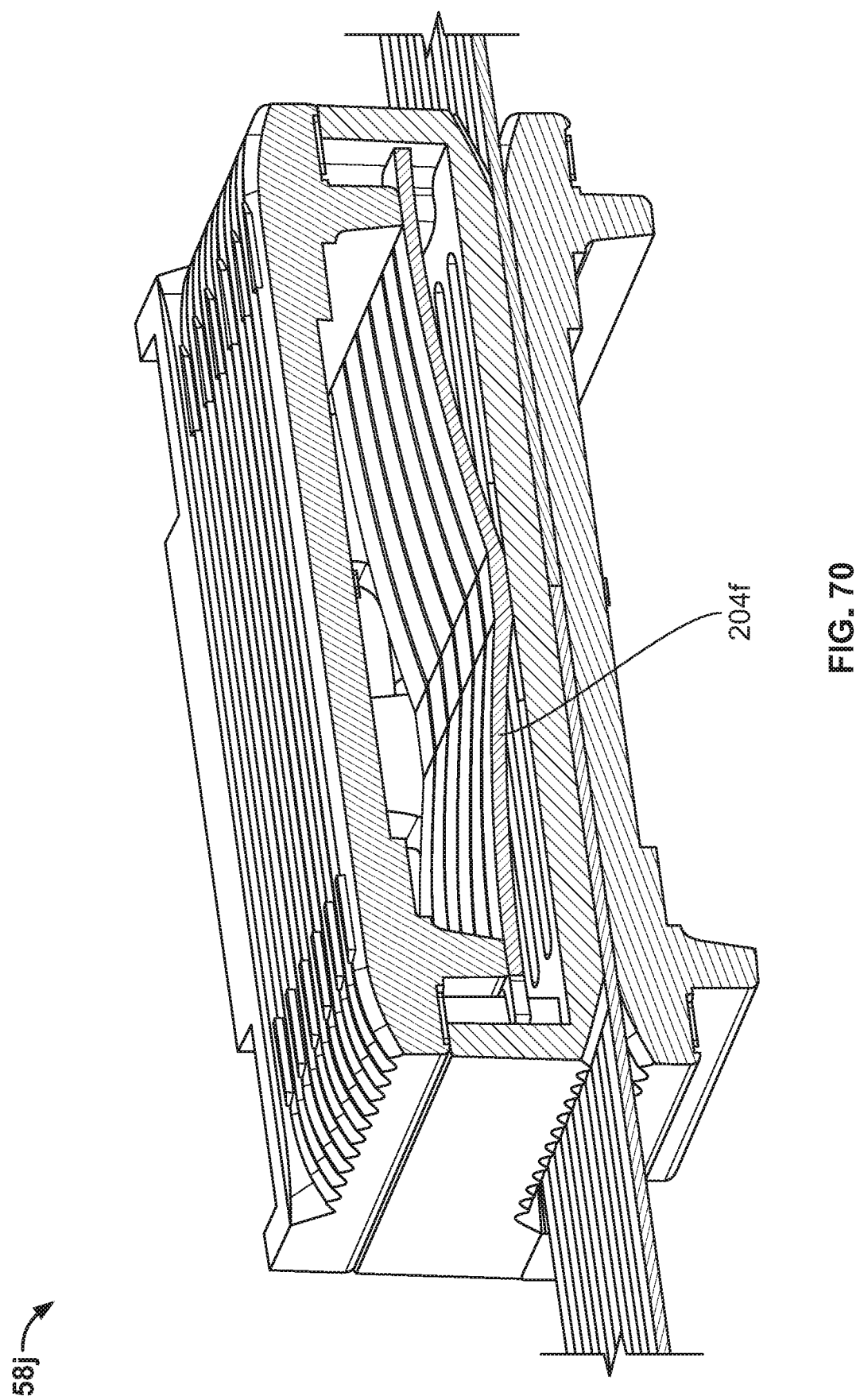
FIG. 70 is a cross-sectional view of another fiber optic alignment device in accordance with the principles of the present disclosure, two groups of optical fibers are shown inserted into the optical fiber alignment device.
Figure 71:
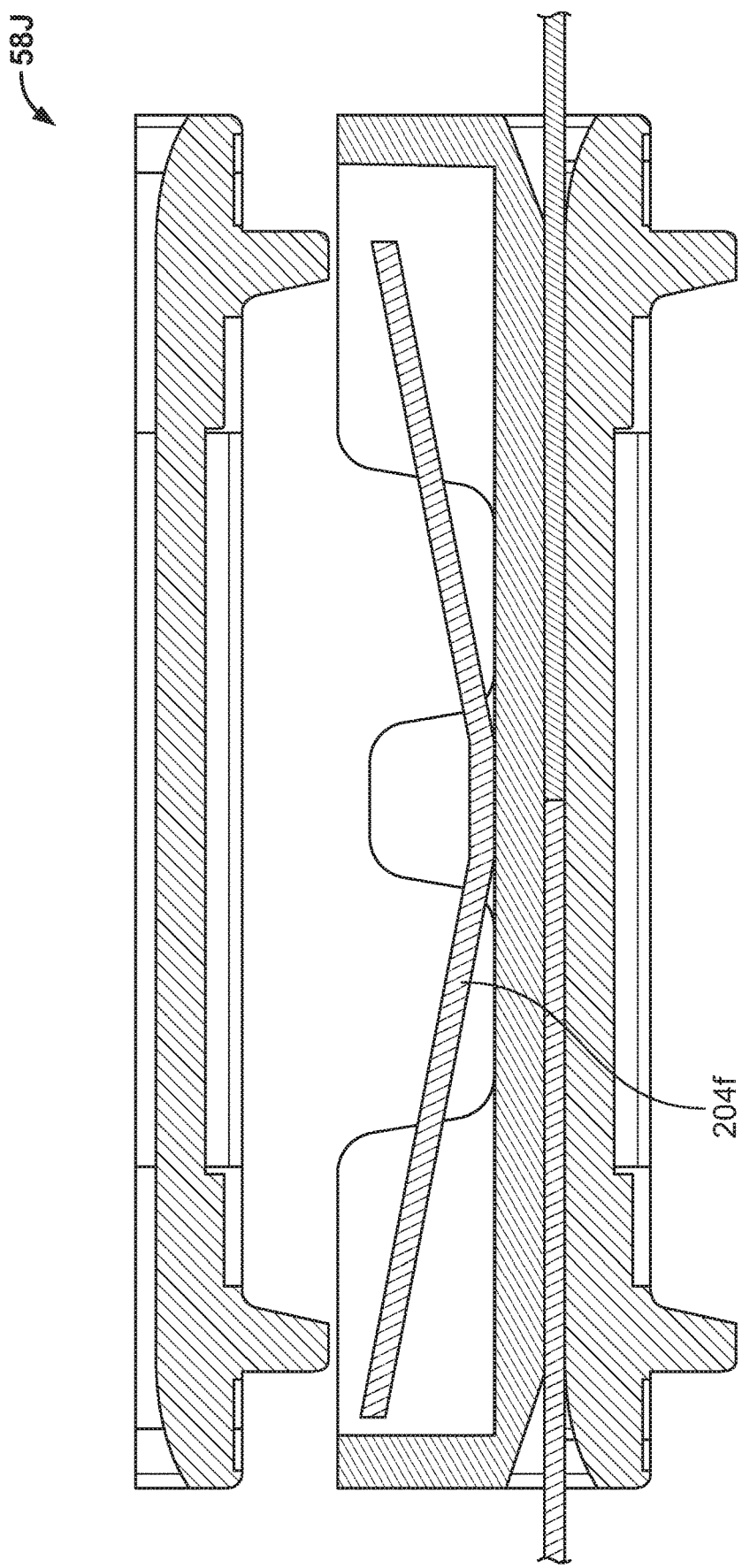
FIG. 71 is another cross-sectional view of the optical fiber alignment device of FIG. 70, the optical fiber device is shown partially assembled.
Figure 72:
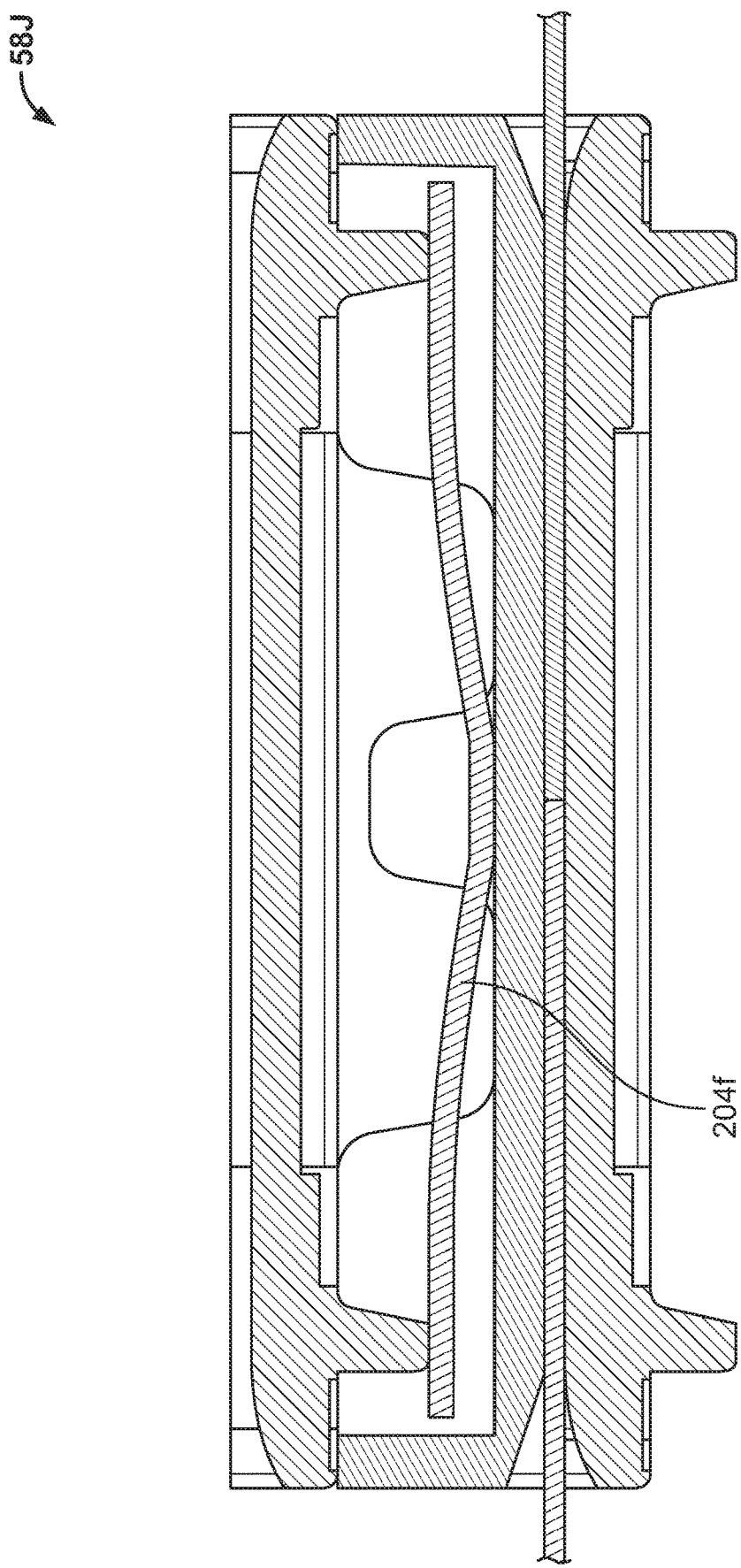
FIG. 72 is a further cross-sectional view of the optical fiber alignment device of FIG. 70 with the optical fiber alignment device being fully assembled.

FIGS. 70-72 depict another example fiber alignment structure 58j in accordance with the principles of the present disclosure. The fiber alignment structure 58j has the same configuration as the fiber alignment structure 58i, except the fiber alignment structure 58j includes only one biasing component 204f rather than a stack of biasing components.

In certain examples, optical fibers include a core, a cladding layer surrounding the core, one or more coating layers surrounding the cladding layer, and a buffer layer surrounding the one or more coating layers. In certain examples, the core can have an outer diameter in the range of 8-12 microns, the cladding can have an outer diameter in the range of 120-130 microns, the one or more coatings can have an outer diameter in the range of 240-260 microns, and the outer buffer layer can have an outer diameter in the range of 800-1,000 microns. In certain examples, the outer buffer layer can be a loose or tight buffer tube having an outer diameter of about 900 microns. In certain examples, only the core and the cladding of the optical fibers are supported within the alignment structure.

It will also be appreciated that the core and the cladding can be constructed of a material suitable for conveying an optical signal such as glass (e.g., a silica-based material). The cladding layer can have an index of refraction that is less than the index of refraction of the core. This difference between the index of refraction of the cladding layer and the index of refraction of the core allows an optical signal that is transmitted through the optical fiber to be confined to the core. The one or more coating layers typically have a polymeric construction such as acrylate.

Example Aspects of the Present Disclosure

Aspect 1: Aspect 1 relates to an optical fiber alignment device for optically coupling first and second optical fibers by axially aligning the optical fibers with end faces of the first and second optical fibers opposing one another at an optical interface location.

Aspect 2: Aspect 2 includes Aspect 1 and further includes the first and second optical fibers being bare fibers.

Aspect 3: Aspect 3 includes any of Aspects 1 and 2 and further includes a fiber pressing element that is moveable when the first and second optical fibers are inserted into the fiber alignment device and that is adapted to engage both the first and second optical fibers.

Aspect 4: Aspect 4 includes any of Aspects 1-3 and further includes the fiber pressing element being a single element configured to engage both the first and second optical fibers and to traverse (e.g., bridge, extend across, etc.) the optical interface location.

Aspect 5: Aspect 5 includes any of Aspects 1-4 and further includes the fiber pressing element being configured to flex or pivot to accommodate insertion of the first and second optical fibers into the fiber alignment device.

Aspect 6: Aspect 6 includes any of Aspects 1-5 and further includes the fiber pressing element being a beam having opposite ends that are fixed or a beam having opposite ends that are free.

Aspect 7: Aspect 7 includes any of Aspects 1-6 and further includes an alignment groove for receiving the first and second optical fibers and wherein the fiber pressing element is adapted to press the first and second element into the groove.

Aspect 8: Aspect 8 includes any of Aspects 1-7 and wherein extending in a single direction along the fiber pressing element the fiber pressing element includes a first pressing portion for pressing the first optical fiber into the fiber alignment followed by a second pressing portion for pressing the second optical fiber into the fiber alignment groove, and wherein the fiber pressing element traverses the optical coupling location directly between the first and second pressing portions.

Aspect 9: Aspect 9 includes any of Aspects 1-8, and wherein the fiber pressing element is aligned with the fiber alignment groove and opposes an open side of the fiber alignment groove, and wherein the fiber pressing element has a length that extends along a corresponding length of the fiber alignment groove.

Aspect 10: Aspect 10 includes any of Aspects 1-9, and wherein the fiber pressing device is configured to spring bias the first and second optical fibers into the fiber alignment groove by spring force derived inherently from the resiliency of the fiber pressing device, or by spring force derived from the resiliency of an additional spring biasing element that applies the spring force to and through the fiber pressing device to the first and second springs, or by spring force derived from both.

Aspect 11: Aspect 11 includes any of Aspects 1-10, and further includes one or more spring biasing elements for applying spring load though the fiber pressing element to the first and second optical fibers to bias the optical fibers into the fiber alignment groove.

Aspect 12: Aspect 12 includes any of Aspects 1-11, and wherein the spring biasing element includes a spring member formed by a beam having fixed opposite ends or by a beam having a cantilevered configuration with one fixed end and an opposite free end that engages the fiber pressing element.

Aspect 13: Aspect 13 includes any of Aspects 1-12, and wherein the spring biasing element is integrally connected to the fiber pressing element at an intermediate location along a length of the fiber pressing element.

Aspect 14: Aspect 14 includes any of aspects 1-13, and wherein a plurality of spring biasing elements engage the fiber pressing element to transfer spring load there-through to the first and second optical fibers, and wherein the spring biasing elements optionally include first and second spring biasing elements that engage the fiber pressing element on opposite sides of the optical connection interface location.

Aspect 15: Aspect 15 includes any of aspects 1-14, and wherein the spring biasing element and/or the fiber pressing element have a construction that includes ceramic, metal or plastic.

Aspect 16: Aspect 16 includes any of Aspects 1-15, and wherein the fiber alignment device is configured to align a plurality of pairs of first and second optical fibers, and wherein separate fiber alignment grooves and corresponding independently moveable fiber pressing element are provided for each pair of optical fibers.

Aspect 17: Aspect 17 includes any of Aspects 1-16, and further includes at least one spring biasing element corresponding to each of the fiber pressing elements, and wherein the spring biasing elements are independently moveable relative to each other.

Aspect 18: Aspect 18 includes any of Aspects 1-17, and wherein the independently moveably fiber pressing elements are integrated as part of a unitary fiber pressing component.

Aspect 19: Aspect 19 includes any of Aspects 1-18, and wherein the independently moveable spring biasing elements are integrated as part of a unitary spring biasing component that mounts to the unitary fiber pressing component.

Aspect 20: Aspect 20 includes any of Aspects 1-19, and wherein the fiber alignment device includes a plurality of fiber alignment grooves each configured for receiving a pair of the first and second optical fibers, wherein the fiber alignment device includes a plurality of fiber pressing members each corresponding to one of the fiber alignment grooves and each configured as an independently moveable beam having fixed opposite ends, and where the fiber alignment device includes a spring biasing structure for transferring spring biasing force through the beams to the pairs of optical fibers.

Aspect 21: Aspect 21 includes any of Aspects 1-20, wherein the spring biasing structure includes independently moveable spring biasing structures corresponding to each of the fiber pressing members.

Aspect 22: Aspect 22 includes any of Aspects 1-21, and wherein the optical fiber alignment device includes an intermediate engagement element that engages the first and second optical fibers and traverses the optical interface location, and at least one spring that applies a biasing force through the intermediate engagement element to the first and second optical fibers.

Aspect 23: Aspect 23 includes any of Aspects 1-22, and wherein the intermediate engagement element is a beam having fixed opposite ends.

Aspect 24: Aspect 24 includes any of Aspects 1-23, and wherein the at least one spring that applies biasing force through the intermediate engagement element is a cantilever spring having a fixed end and also including a free end for applying the biasing force through the intermediate engagement element.

Aspect 25: Aspect 25 includes any of Aspects 1-24, and wherein the at least one spring includes first and second springs on opposite sides of the optical interface location and that apply spring force through the intermediate engagement element to the first and second optical fibers.

Aspect 26: Aspect 26 includes any of Aspects 1-25, and wherein the spring force transferred through the intermediate engagement element to the first and second optical fibers biases the first and second optical fibers into an alignment structure such as a groove.

Aspect 27: Aspect 27 relates to apparatus for co-axially aligning first and second optical fibers to provide an optical coupling between the first and second optical fibers, the apparatus comprising:

structure defining a fiber alignment groove for receiving the first and second optical fibers, the fiber alignment groove defining a fiber insertion axis along which the first and second fibers are moved when inserted into the fiber alignment groove, the apparatus including an optical coupling reference location at which end faces of the first and second optical fibers will oppose one another when the first and second optical fibers are optically coupled together, the optical coupling reference location being positioned along the fiber alignment groove; and a pressing member having a fiber contact side that opposes an open side of the fiber alignment groove and extends across the optical coupling reference location such that the fiber contact side is adapted to engage both the first and second optical fibers when the first and second optical fibers are optically coupled together in the fiber alignment groove, and where the pressing member applies a spring force to each of the first and second optical fibers to press the first and second optical fibers into the fiber alignment groove when the first and second optical fibers are optically coupled together within the fiber alignment groove.

Aspect 28: Aspect 28 includes Aspect 27, and wherein the pressing member is flexible.

Aspect 29: Aspect 29 incudes Aspect 27, and wherein the pressing member is an intermediate force transfer member configured for transferring the spring force from one or more springs to each of the first and second optical fibers.

Aspect 30: Aspect 30 includes Aspect 29, and wherein the pressing member includes a spring contact side positioned opposite from the fiber contact side.

Aspect 31: Aspect 31 includes Aspect 30, and wherein the spring or springs apply the spring force to the spring contact side, wherein the spring force is transferred through the pressing member from the spring contact side to the fiber contact side, and wherein the spring force is transferred from the fiber contact side to each of the first and second optical fibers.

Aspect 32: Aspect 32 includes Aspect 27, and wherein the pressing member is a single beam, wherein the spring force is provided by a spring, and wherein the spring force is transferred through the single beam to the first and second optical fibers to spring bias the first and second optical fibers into the alignment groove.

Aspect 33: Aspect 33 includes Aspect 32, and wherein the single beam is integrated as part of a metal, ceramic, or plastic component.

Aspect 34: Aspect 34 includes Aspect 32, and wherein the single beam has opposite ends that are fixed.

Aspect 35: Aspect 35 includes Aspect 32, and wherein the single beam has opposite ends that are free.

Aspect 36: Aspect 36 includes Aspect 32, and wherein the spring engages the single beam at a spring engagement side positioned opposite from the fiber contact side.

Aspect 37: Aspect 37 includes Aspect 36, and wherein the spring is a first spring positioned on one side of the optical coupling reference location, and wherein the apparatus further includes a second spring positioned on an opposite side of the optical coupling reference location.

Aspect 38: Aspect 38 includes Aspect 32, and wherein the single beam is mechanically coupled to the spring at a coupling location coincident with the optical coupling reference location.

Aspect 39: Aspect 39 includes Aspect 37, and wherein the pressing member engages both the first and second optical fibers directly at tips of the first and second optical fibers.

Aspect 40: Aspect 40 relates to an apparatus for co-axially aligning first and second optical fibers to provide an optical coupling between the first and second optical fibers, the apparatus comprising:

structure defining a fiber alignment groove for receiving the first and second optical fibers, the fiber alignment groove defining a fiber insertion axis along which the first and second optical fibers are moved when inserted into the fiber alignment groove, the apparatus including an optical coupling reference location at which end faces of the first and second optical fibers will oppose one another when the first and second optical fibers are optically coupled together, the optical coupling reference location being positioned along the fiber alignment groove; and a single beam having a fiber contact side that opposes an open side of the fiber alignment groove and extends across the optical coupling reference location such that the fiber contact side is adapted to engage both the first and second optical fibers when the first and second optical fibers are optically coupled together in the fiber alignment groove, and where the single beam flexes when the first and second optical fibers are inserted into the fiber alignment groove.

Aspect 41: Aspect 41 includes Aspect 40, and wherein spring force is provided by a spring, and wherein the spring force is transferred through the single beam to the first and second optical fibers to spring bias the first and second optical fibers into the fiber alignment groove.

Aspect 42: Aspect 42 includes Aspect 40, and wherein the single beam is integrated as part of a metal, ceramic, or plastic component.

Aspect 43: Aspect 43 includes aspect 40, and wherein the single beam has opposite ends that are fixed.

Aspect 44: Aspect 44 includes Aspect 40, and wherein the single beam has opposite ends that are free.

Aspect 45: Aspect 45 includes Aspect 40, and further comprises one or more springs for applying spring load to the single beam when the single beam flexes to accommodate insertion of the first and second optical fibers, and wherein the spring load is transferred through the single beam and applied to the first and second optical fibers to bias the first and second optical fibers into the fiber alignment groove as the first and second optical fiber are inserted into the fiber alignment groove along the insertion axis.

Aspect 46: Aspect 46 includes Aspect 45, and wherein the one or more springs include a first spring positioned on one side of the optical coupling reference location, and wherein the one or more springs further includes a second spring positioned on an opposite side of the optical coupling reference location.

Aspect 47: Aspect 47 includes Aspect 41, wherein the single beam is mechanically coupled to the spring at a coupling location coincident with the optical coupling reference location.

Aspect 48: Aspect 48 includes Aspect 40, and wherein the single beam engages both the first and second optical fibers directly at tips of the first and second optical fibers.

Aspect 49: Aspect 49 relates to a fiber alignment system comprising:
- a base member including a first end and an opposite, second end, the base member defining a groove-type alignment structure that extends along a fiber insertion axis between the first and second ends, the groove-type alignment structure being configured to receive a first optical fiber at the first end and a second optical fiber at the second end such that fiber tip ends of respective first and second optical fibers meet at an optical mating plane in the base member;
- a fiber engagement member that corresponds with the groove-type alignment structure, the fiber engagement member being configured to extend along a first length of the first optical fiber and along a second length of the second optical fiber when the first and second optical fibers are inserted in the groove-type alignment structure, the fiber engagement member further extending across the optical mating plane; and
- a deflection member adapted to spring bias the fiber engagement member in a downward direction toward the fiber tip ends of the respective first and second optical fibers into the groove-type alignment structure when the first and second optical fibers are inserted in the groove-type alignment structure.

Aspect 50: Aspect 50 includes Aspect 49, and wherein the fiber engagement member engages the first and second optical fibers within the groove-type alignment structure to prevent the fiber tip ends of the respective first and second optical fibers from flexing in an upwardly direction.

Aspect 51: Aspect 51 includes Aspect 49, and further comprises a holding member for housing the base member, the fiber engagement member and the deflection member together therein.

Aspect 52: Aspect 52 includes Aspect 49, and wherein the deflection member includes a metal, ceramic, or plastic spring.

Aspect 53: Aspect 53 includes Aspect 49, and wherein the fiber engagement member is formed with a first material and the base member is formed with a second material.

Aspect 54: Aspect 54 includes Aspect 53, and wherein the first material is a metal and the second material is a hot melt, thermoplastic.

Aspect 55: Aspect 55 includes Aspect 49, and wherein the fiber engagement member is formed with a ceramic material.

Aspect 56: Aspect 56 includes Aspect 49, and wherein the fiber engagement member and the deflection member are secured together by a snap-fit connection interface.

Aspect 57: Aspect 57 includes Aspect 49, and wherein the base member and the fiber engagement member are secured together by a snap-fit connection interface.

Aspect 58: Aspect 58 includes Aspect 49, and wherein the fiber engagement member is integrally made with the deflection member.

Aspect 59: Aspect 59 relates to a fiber alignment device for optically coupling first and second optical fibers, the fiber alignment device having a first end, an opposite second end, and an optical mating plane located between the first and second ends, the fiber alignment device comprising:
- a first piece defining a groove-type alignment structure, the groove-type alignment structure extending along a fiber insertion axis between the first and second ends, the groove-type alignment structure being configured to receive the first optical fiber at the first end and the second optical fiber at the second end; and
- a second piece including a pressure member, the pressure member extending above the groove-type alignment structure, the pressure member being spring biased by a cantilevered beam such that the pressure member directly engages optical fiber ends of the first and second optical fibers to press the optical fiber ends within the groove-type alignment structure to improve mating contact of the optical fiber ends positioned at the optical mating plane of the fiber alignment device.

Aspect 60: Aspect 60 includes Aspect 59, and wherein the pressure member extends across the optical mating plane.

Aspect 61: Aspect 61 includes Aspect 59, and further comprises a holding member for housing the first and second pieces.

Aspect 62: Aspect 62 includes Aspect 59, and wherein the cantilevered beam is formed with a hot melt, thermoplastic material.

Aspect 63: Aspect 63 includes Aspect 59, and wherein the first piece and the second piece are formed with a first material and the cantilevered beam is formed with a second material.

Aspect 64: Aspect 64 includes Aspect 63, and wherein the first material is a hot melt, thermoplastic and the second material is a metal.

Aspect 65: Aspect 65 includes Aspect 59, and wherein the first and second pieces are secured together by a snap-fit connection interface.

Aspect 66: Aspect 66 includes Aspect 59, and wherein the cantilevered beam is integrally formed with the second piece.

Example Methods of the Present Disclosure

Method 1: Method 1 relates to a method for co-axially aligning first and second optical fibers to provide an optical coupling between the first and second optical fibers, the method comprising:
positioning the first and second optical fibers in an alignment groove with end faces of the first and second optical fibers opposing each other at an optical interface; and
spring biasing the first and second optical fibers into the alignment groove via a pressing member including a first portion that engages the first optical fiber, a second portion that engages the second optical fiber, and a third portion that extends across the optical interface and is located directly between the first and second portions.

Method 2: Method 2 includes the method of Method 1, and wherein the first and second optical fibers are bare fibers.

Method 3: Method 3 includes any of Methods 1 and 2, and wherein the pressing member is a single beam having a fiber contact surface that opposes an open side of the alignment groove, wherein the first, second and third portions are located at the fiber contact surface, and wherein a spring force from a spring is transferred through the single beam to spring bias the first and second optical fibers into the alignment groove.

Method 4: Method 4 includes any of Methods 1-3, and wherein the single beam is integrated as part of a metal, ceramic, polymer, plastic, or glass component.

Method 5: Method 5 includes any of Methods 1-4, and wherein the single beam has opposite ends that are fixed or the single beam has opposite ends that are free.

Method 6: Method 6 includes any of Methods 1-5, and wherein a plurality of springs engage the single beam at a spring engagement surface positioned opposite from the fiber contact surface.

Method 7: Method 7 includes any of Methods 1-6, and wherein the plurality of springs include a first spring positioned on one side of the optical interface and a second spring positioned on an opposite side of the optical interface.

Method 8: Method 8 includes any of Methods 1-7, and wherein the first and second optical fibers are inserted into the alignment groove along a fiber insertion axis, and wherein the first and second optical fibers are spring biased into the groove in an orientation transverse with respect to the fiber insertion axis.

Method 9: Method 9 includes any of Methods 1-8, and wherein the single beam is mechanically coupled to the spring at a coupling location aligned with the optical interface.

Method 10: Method 10 includes any of Methods 1-9, and wherein the pressing member engages both the first and second optical fibers directly at tips of the first and second optical fibers.

The various examples described above are provided by way of illustration only and should not be construed to limit the scope of the present disclosure. Those skilled in the art will readily recognize various modifications and changes that may be made with respect to the examples and applications illustrated and described herein without departing from the true spirit and scope of the present disclosure.

What is claimed is:

1. An apparatus for co-axially aligning groups of first and second optical fibers to provide an optical coupling between the groups of first and second optical fibers, the apparatus comprising:
    structure defining a plurality of parallel fiber alignment grooves each configured for receiving one pair of the first and second optical fibers, the fiber alignment grooves defining fiber insertion axes along which the first and second fibers are moved when inserted into the fiber alignment grooves, the apparatus being configured such that the end faces of a given one of the pairs of the first and second optical fibers will oppose one another when the first and second optical fibers are optically coupled together; and
    a plurality of independently moveable beams each having a fiber contact side that opposes an open side of no more than two of the fiber alignment grooves and that is adapted to engage both the first and second optical fibers of at least one of the pairs of first and second optical fibers when the first and second optical fibers are optically coupled together by the apparatus.

2. The apparatus of claim 1, further comprising one or more springs corresponding to each of the beams for applying spring load to the beams, and wherein the spring load is transferred through the beams and applied to the first and second optical fibers to bias the first and second optical fibers into the alignment grooves.

3. The apparatus of claim 1, wherein the beams each include first and second opposite ends that are fixed.

4. The apparatus of claim 3, wherein the first and second opposite ends are fixed to a frame and the beams are integrally formed with the frame.

5. The apparatus of claim 4, wherein the one or more springs corresponding to each of the beams includes one or more cantilever members having free ends that engage the beams.

6. The apparatus of claim 1, wherein the beams include first and second free ends.

7. The apparatus of claim 6, wherein springs attach to the beams at mid-locations between the first and second free ends.

8. The apparatus of claim 7, wherein the springs are defined by beams having fixed ends.

9. The apparatus of claim 1, further comprising a stack of metal spring biasing components for applying spring load to the beams.

10. The apparatus of claim 1, wherein at least two spring structures apply spring load to each of the beams.

11. The apparatus of claim 1, wherein the beams are part of a fiber engagement component having a frame, wherein the beams each have first and second ends fixed relative to the frame, wherein apparatus includes a spacing arrangement that maintains end portions of the beams at a fixed first spacing with respect to the fiber alignment grooves while allowing mid regions of the beams to flex toward the fiber alignment grooves to a second spacing that is less than the first spacing.

12. The apparatus of claim 1, wherein the beams include projections at mid-regions between first and second ends of the beams, and wherein the apparatus includes a biasing component having spring biasing elements that extend along lengths of the beams and flex about the projections to apply spring load to the beams.

13. The apparatus of claim 1, wherein the beams include mid-regions between first and second ends of the beams, wherein the apparatus includes a biasing component having spring biasing elements that: a) extend along lengths of the beams; b) are pre-bent to engage the mid-regions of the beams; and c) are flattened when installed in apparatus to apply spring load to the mid-regions of the beams.

14. The apparatus of claim 1, wherein the beams have load centering bumps centered with respect to widths of the beams, and wherein the apparatus includes a biasing component having spring elements that apply spring load to the beams through the load centering bumps.

15. The apparatus of claim 1, wherein the beams include mid-points between first and second ends of the beams, wherein the apparatus includes a metal biasing component including a frame having a bridge portion that extends across the mid-points between two primary curved portions that curve at least 120 degrees, wherein the metal biasing component also includes two sets of cantilever springs having base ends that attach to the frame adjacent the primary curved portions and that have free ends that apply spring biasing force to the beams on opposite sides of the mid-points.

16. The apparatus of claim 1, wherein the fiber contact sides of the independently moveable beams each oppose the open sides of two of the fiber alignment grooves and are adapted to press two pairs of first and second optical fibers into their respective fiber alignment grooves.

17. The apparatus of claim 16, wherein the springs engage the independently moveable beams at pivot locations that allow the independently moveable beams to tilt about axes parallel to the fiber alignment grooves.

18. An apparatus for co-axially aligning sets of first and second optical fibers to provide an optical coupling between the sets of first and second optical fibers, the apparatus comprising:
   structure defining a plurality of parallel fiber alignment grooves each configured for receiving one of the sets of the first and second optical fibers, the fiber alignment grooves defining fiber insertion axes along which the first and second fibers are moved when inserted into the fiber alignment grooves, the apparatus including an optical coupling reference location at which end faces of the first and second optical fibers will oppose one another when the first and second optical fibers are optically coupled together; and
   a plurality of independently moveable beams each having a fiber contact side that opposes an open side of at least one of the fiber alignment grooves and that extends across the optical coupling reference location such that the fiber contact side is adapted to engage both the first and second optical fibers when the first and second optical fibers are optically coupled together in the fiber alignment groove, and where the beams independently flex when the first and second optical fibers are inserted into their respective fiber alignment grooves.

19. The apparatus of claim 18, further comprising one or more springs corresponding to each of the beams for applying spring load to the beams when the beams flex to accommodate insertion of the first and second optical fibers, and wherein the spring load is transferred through the beams and applied to the first and second optical fibers to bias the first and second optical fibers into the alignment grooves as the first and second optical fibers are inserted into the fiber alignment grooves along the insertion axes.

20. The apparatus of claim 18, wherein the beams are part of a pressing unit having a first molded part coupled to a second molded part, wherein a first plurality of the beams is integrated with the first molded part and a second plurality of the beams is integrated with the second molded part.

21. The apparatus of claim 20, wherein the beams of the first and second pluralities of beams interdigitate when the first and second molded parts are coupled to form the pressing unit.

22. The apparatus of claim 20, wherein the first and second molded parts are identical half-pieces of the pressing unit.

23. The apparatus of claim 22, wherein the half-pieces each include a half-frame which support the beams via intermediate springs having first ends integral with the half frames.

24. The apparatus of claim 23, wherein the springs include second ends coupled to support tabs that seat on support surfaces the opposite half-frame when the first and second molded parts are coupled to each other.

25. The apparatus of claim 20, wherein the first and second molded parts interconnect by a snap-fit connection.

26. The apparatus of claim 18, wherein the beams are part of a pressing unit having a first molded part coupled to a second molded part, wherein a first plurality of the beams is integrated with the first molded part and a second plurality of the beams is integrated with the second molded part.

27. The apparatus of claim 26, wherein the beams of the first and second pluralities of beams interdigitate when the first and second molded parts are coupled to form the pressing unit.

28. The apparatus of claim 26, wherein the first and second molded parts are identical half-pieces of the pressing unit.

29. The apparatus of claim 28, wherein the half-pieces each include a half-frame which support the beams via intermediate springs having first ends integral with the half frames.

30. The apparatus of claim 29, wherein the springs include second ends coupled to support tabs that seat on support surfaces the opposite half-frame when the first and second molded parts are coupled to each other.

31. The apparatus of claim 26, wherein the first and second molded parts interconnect by a snap-fit connection.

* * * * *